(12) United States Patent
Ofuji et al.

(10) Patent No.: US 8,400,909 B2
(45) Date of Patent: Mar. 19, 2013

(54) TRANSMISSION APPARATUS, RECEPTION APPARATUS, MOBILE COMMUNICATIONS SYSTEM AND TRANSMISSION CONTROL METHOD

(75) Inventors: Yoshiaki Ofuji, Yokosuka (JP); Hiroyuki Atarashi, Yokohama (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 337 days.

(21) Appl. No.: 12/948,522

(22) Filed: Nov. 17, 2010

(65) Prior Publication Data

US 2011/0064044 A1     Mar. 17, 2011

Related U.S. Application Data

(63) Continuation of application No. 11/909,711, filed as application No. PCT/JP2006/305835 on Mar. 23, 2006.

(30) Foreign Application Priority Data

| Mar. 31, 2005 | (JP) | 2005-105492 |
| Jun. 14, 2005 | (JP) | 2005-174394 |
| Aug. 23, 2005 | (JP) | 2005-241899 |
| Oct. 31, 2005 | (JP) | 2005-317567 |
| Feb. 8, 2006 | (JP) | 2006-031749 |

(51) Int. Cl.
*H04J 11/00* (2006.01)

(52) U.S. Cl. ........ 370/210; 370/320; 370/335; 370/342; 370/441; 375/260

(58) Field of Classification Search .................. 370/203, 370/208–210, 320, 335, 342, 441; 375/260
See application file for complete search history.

(56) References Cited

U.S. PATENT DOCUMENTS

| 5,867,478 | A | 2/1999 | Baum et al. |
| 6,351,459 | B1 | 2/2002 | Kondo |
| 2003/0021245 | A1 | 1/2003 | Haumonte et al. |
| 2004/0066839 | A1 | 4/2004 | Choi et al. |
| 2004/0156386 | A1 | 8/2004 | Atarashi et al. |
| 2004/0176033 | A1 | 9/2004 | Tamaki et al. |
| 2006/0088134 | A1 | 4/2006 | Gilhousen et al. |
| 2006/0172704 | A1 | 8/2006 | Nishio et al. |
| 2006/0234738 | A1 | 10/2006 | Costa et al. |
| 2010/0041355 | A1* | 2/2010 | Laroia et al. .................. 455/129 |

FOREIGN PATENT DOCUMENTS

| EP | 1168638 A2 | 1/2002 |
| GB | 2391137 A | 1/2004 |
| JP | 9-70064 A | 3/1997 |
| JP | 2003-174426 A | 6/2003 |

(Continued)

OTHER PUBLICATIONS

Office Action for European Application No. 12173546.8 dated Sep. 25, 2012 (6 pages).

(Continued)

*Primary Examiner* — Pao Sinkantarakorn
(74) *Attorney, Agent, or Firm* — Osha Liang LLP

(57) ABSTRACT

A disclosed transmission apparatus comprises a switching portion that switches radio access methods; a frequency domain signal generation portion that allocates a radio resource to a spread chip sequence on which one of a fast Fourier transformation and a series/parallel conversion is performed in accordance with the switched radio accessed method, so as to generate a signal in a frequency domain; and a transmission signal generation portion that performs a fast inverse Fourier transformation on the signal in the frequency domain so as to generate a transmission signal.

16 Claims, 50 Drawing Sheets

FOREIGN PATENT DOCUMENTS

| | | |
|---|---|---|
| JP | 2004-266585 A | 9/2004 |
| JP | 2004-297756 A | 10/2004 |
| JP | 2005-020599 A | 1/2005 |
| JP | 2007525045 | 8/2007 |
| RU | 2242091 C2 | 12/2004 |
| TW | I224934 | 12/2004 |
| WO | 0126269 A1 | 4/2001 |
| WO | 03/028329 A2 | 4/2003 |
| WO | 2004/077728 A2 | 9/2004 |
| WO | 2005015777 A1 | 2/2005 |
| WO | 2005015797 A1 | 2/2005 |

OTHER PUBLICATIONS

Patent Abstract for PCT Publication No. WO2005/015797 published Feb. 17, 2005 (2 pages).

International Search Report issued for PCT/JP2006/305835 dated May 23, 2006, with English translation, 5 pages.

Y. Goto, et al., "Variable Spreading and Chip Repetition Factors (VSCRF)-CDMA in Reverse Link for Broadband Wireless Access," IEICE Technical Report, vol. 103, No. 128, Jun. 20, 2003, pp. 91-98, 8 pages.

Y. Goto, et al. "Variable Spreading and Chip Repetition Factors (VSCRF)-CDMA in Reverse Link for Broadband Wireless Access," The 14th IEEE 2003 International Symposium on Personal, Indoor and Mobile Radio Communication Proceedings, vol. 1, Sep. 2003, pp. 254-259, 8 pages.

M. Schnell, et al., "A Promising New Wideband Multiple-Access Scheme for Future Mobile Communications Systems," European Trans. on Telecommun. (ETT), vol. 10, No. 4, pp. 417-427, Jul./Aug. 1999, 16 pages.

R. Dinis, et al., "A Multiple Access S cheme for the Uplink of Broadband Wireless Systems," IEEE Communications Society, Globecom 2004, Dec. 2004, 5 pages.

esp@cenet Patent Abstract for Russian Publication No. 2242091, publication date Dec. 10, 2004. (1 page).

Russian Office Action for Application No. 2007136021/09, mailed on Aug. 27, 2009 (19 pages).

J. Proakis, "Digital Communications", Moscow. Radio i Svyaz Publishers, 2000, pp. 592-595.

Japanese Office Action for Application No. 2006-031749, mailed on Jan. 12, 2010 (4 pages).

Office Action issued in related Taiwanese Patent Application No. 95110534; Dated May 10, 2010 (5 pages).

Patent Abstract for TW I224934, issued Dec. 1, 2004 (1 page).

US Office Action issued in U.S. Appl. No. 11/909,711, mailed Aug. 27, 2010, 13 pages.

Office Action issued in related U.S. Appl. No. 11/909,711; dated Feb. 18, 2011 (10 pages).

Office Action issued in related U.S. Appl. No. 11/909,711; dated May 6, 2011 (9 pages).

\* cited by examiner

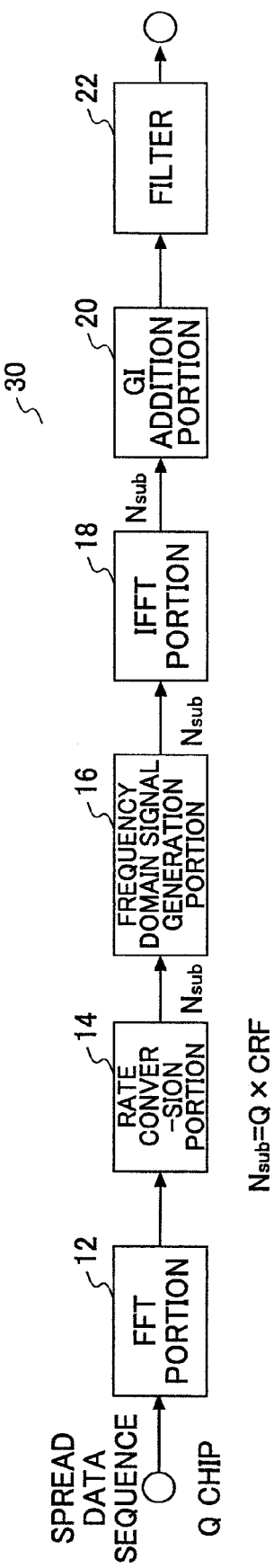

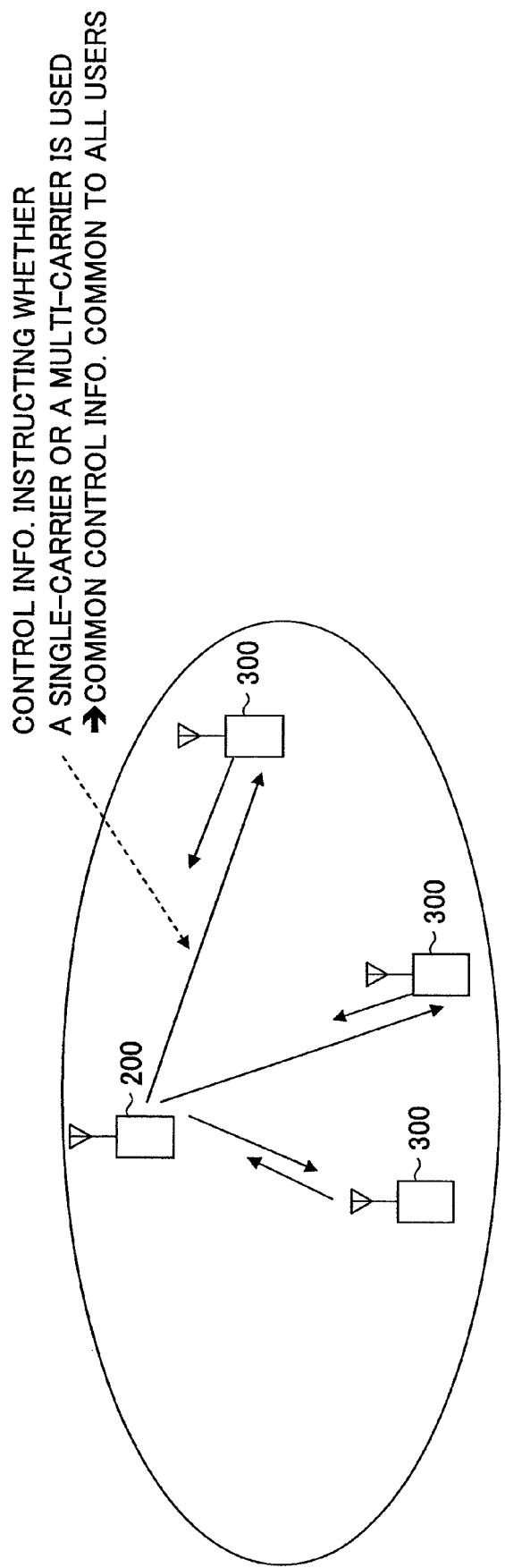

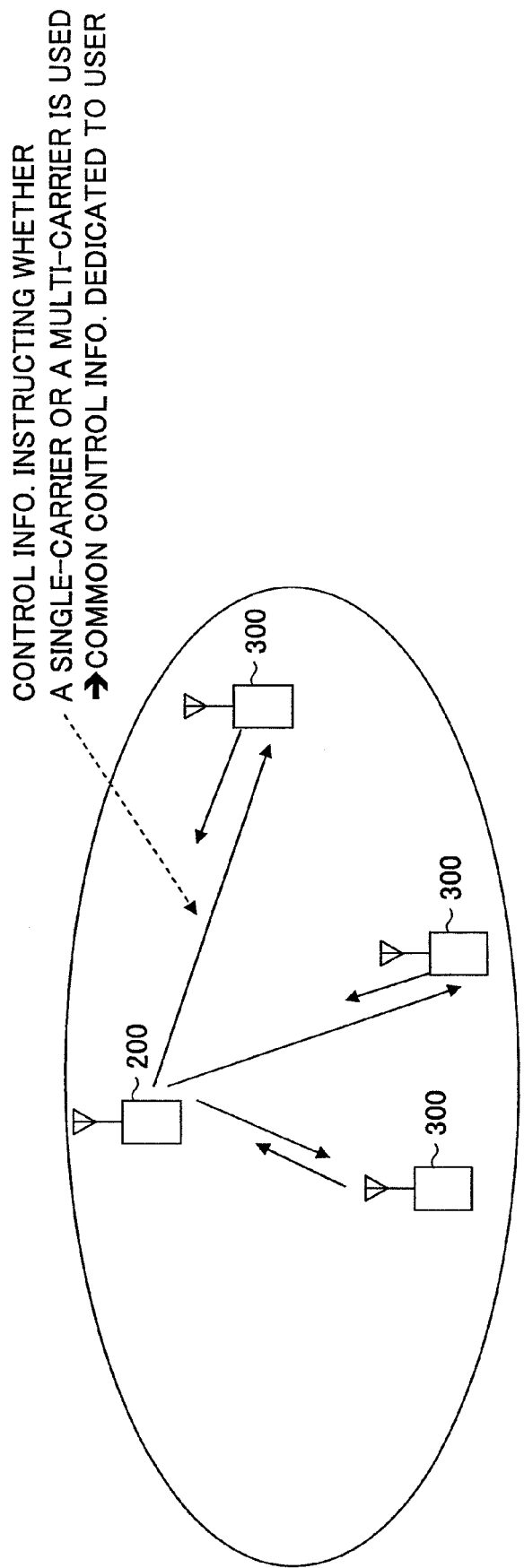

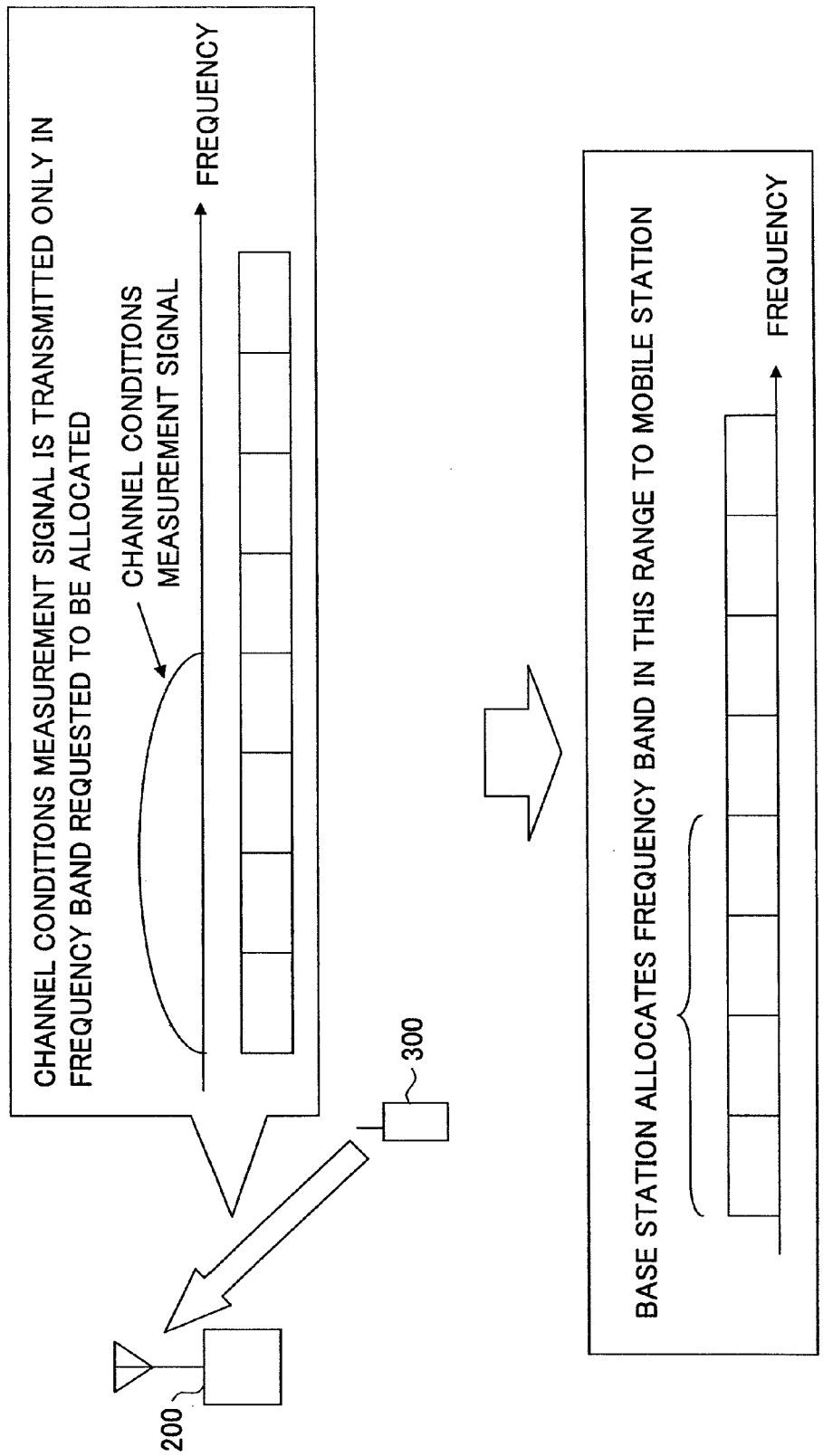

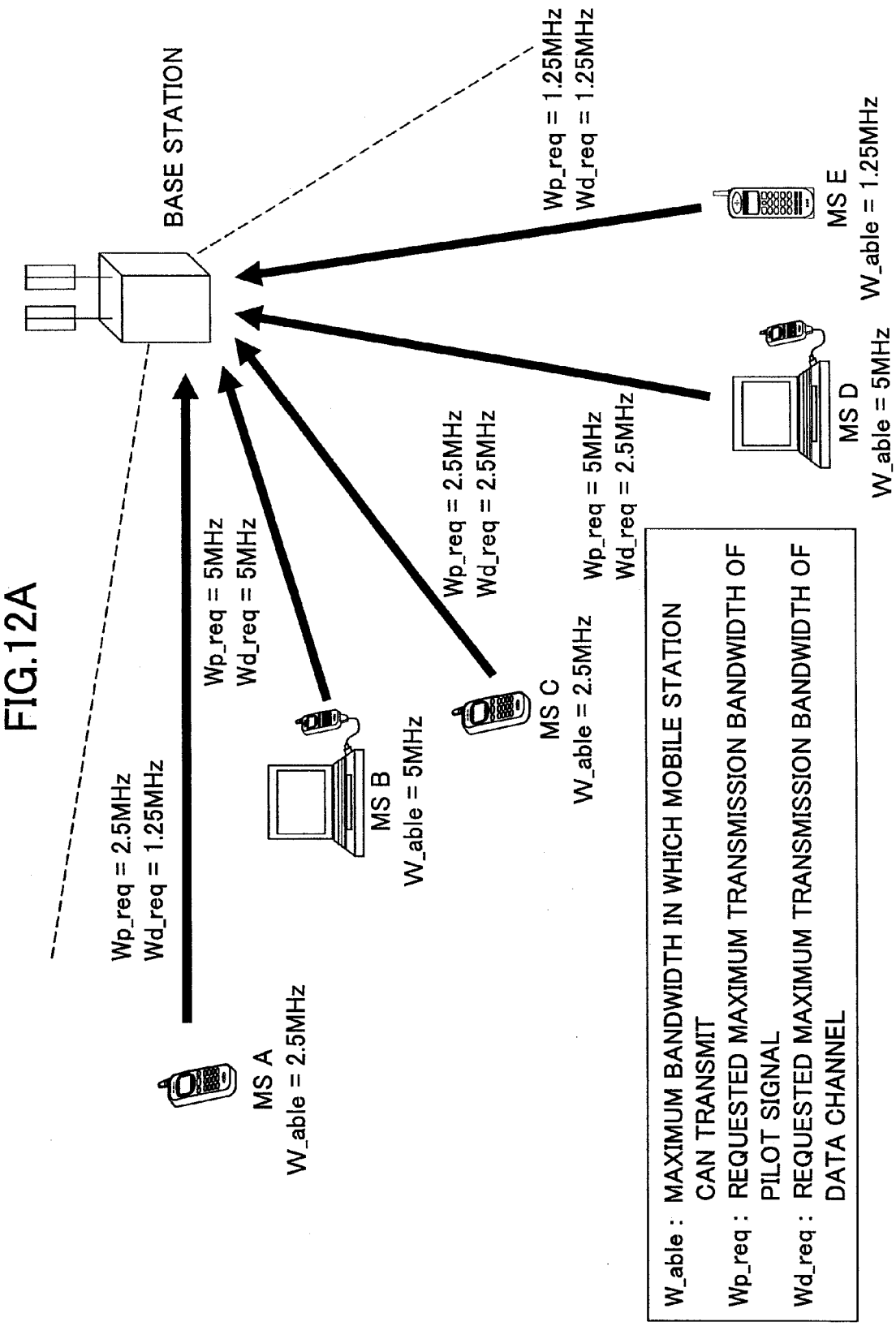

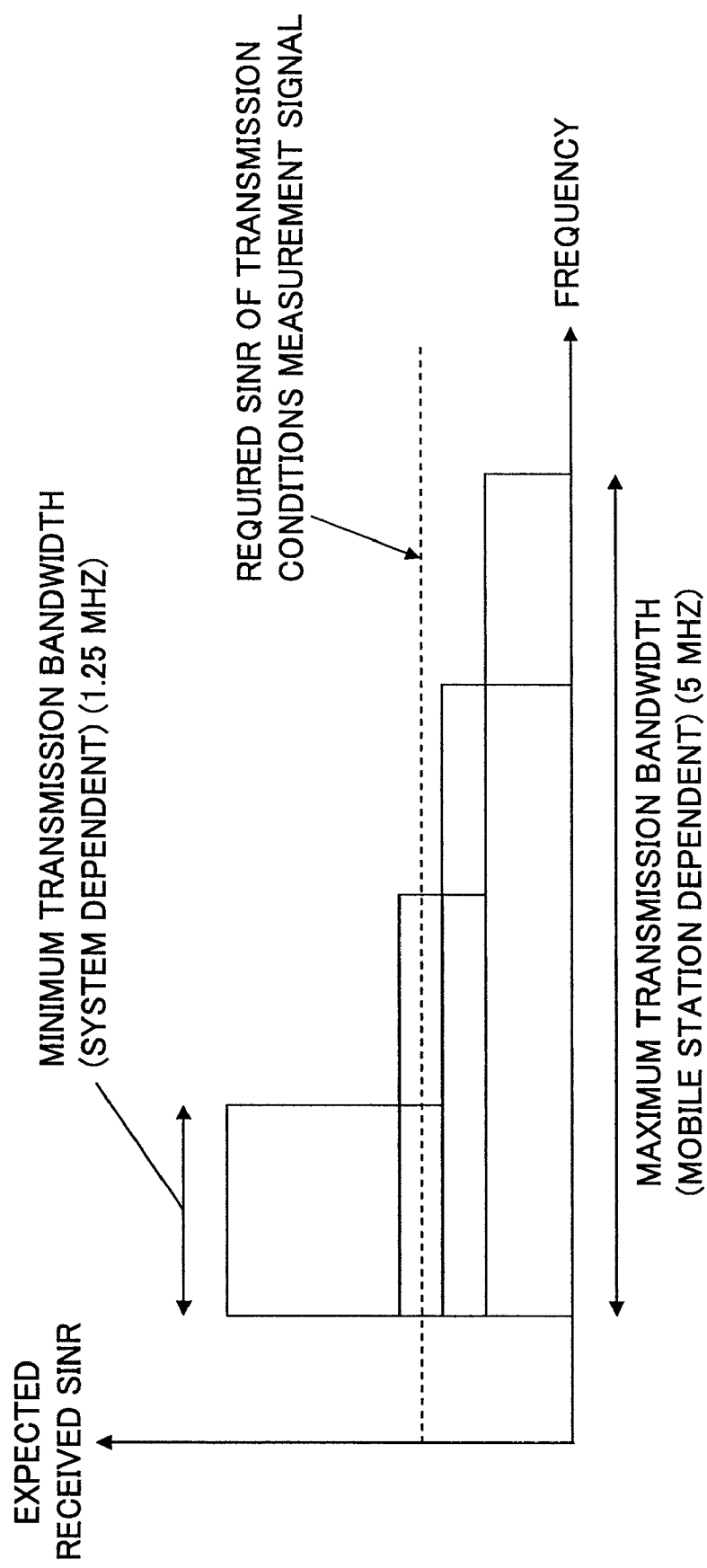

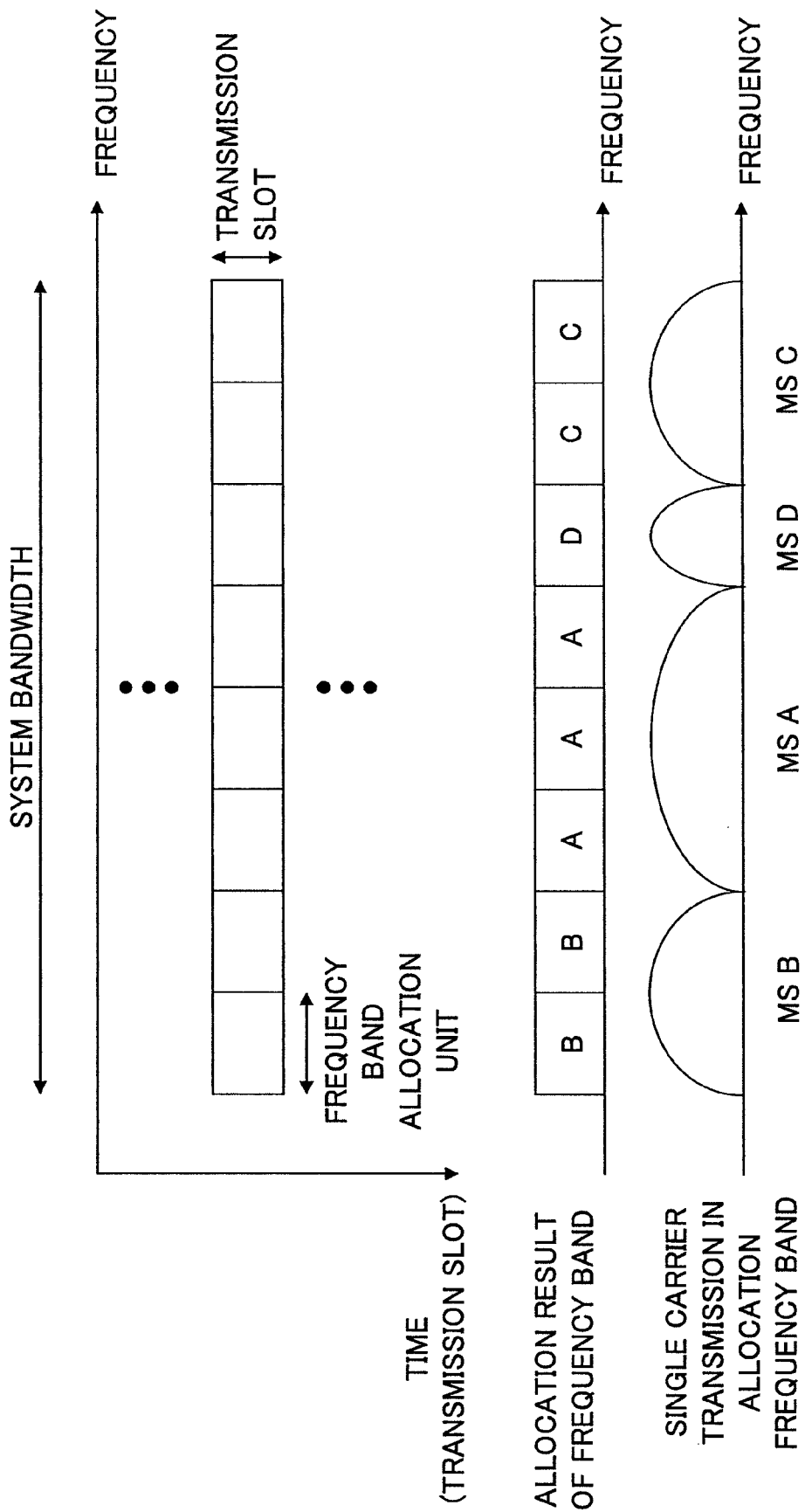

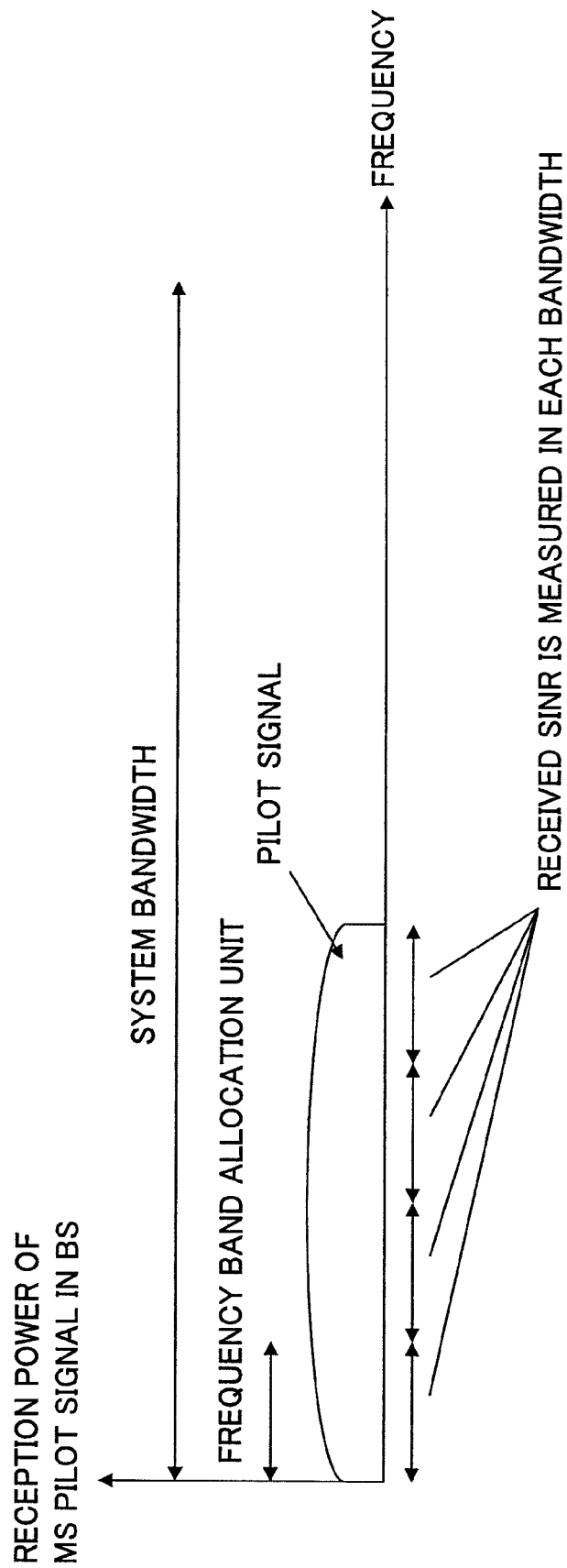

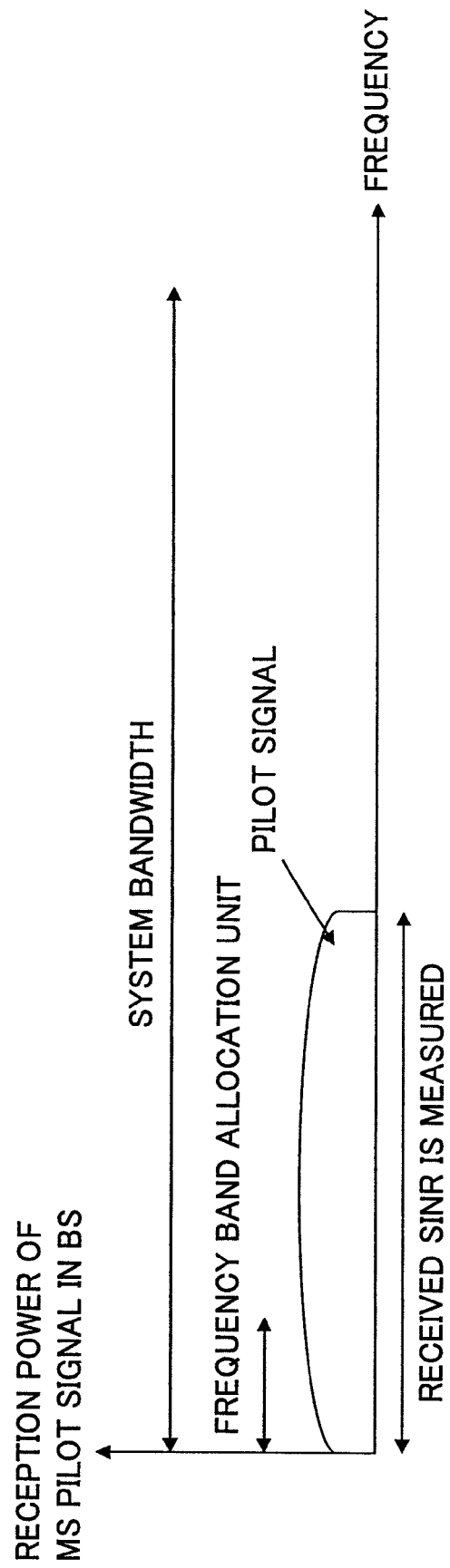

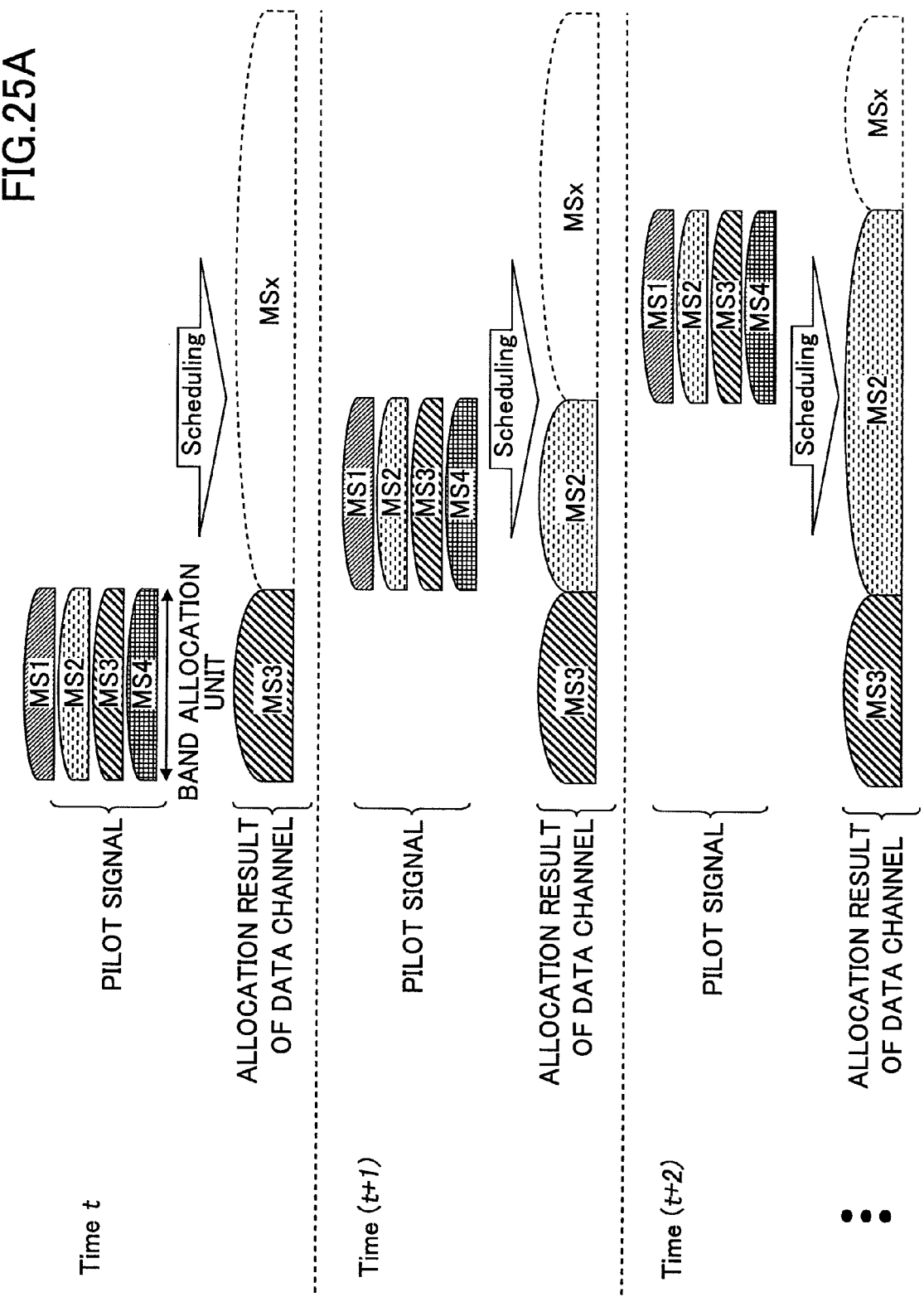

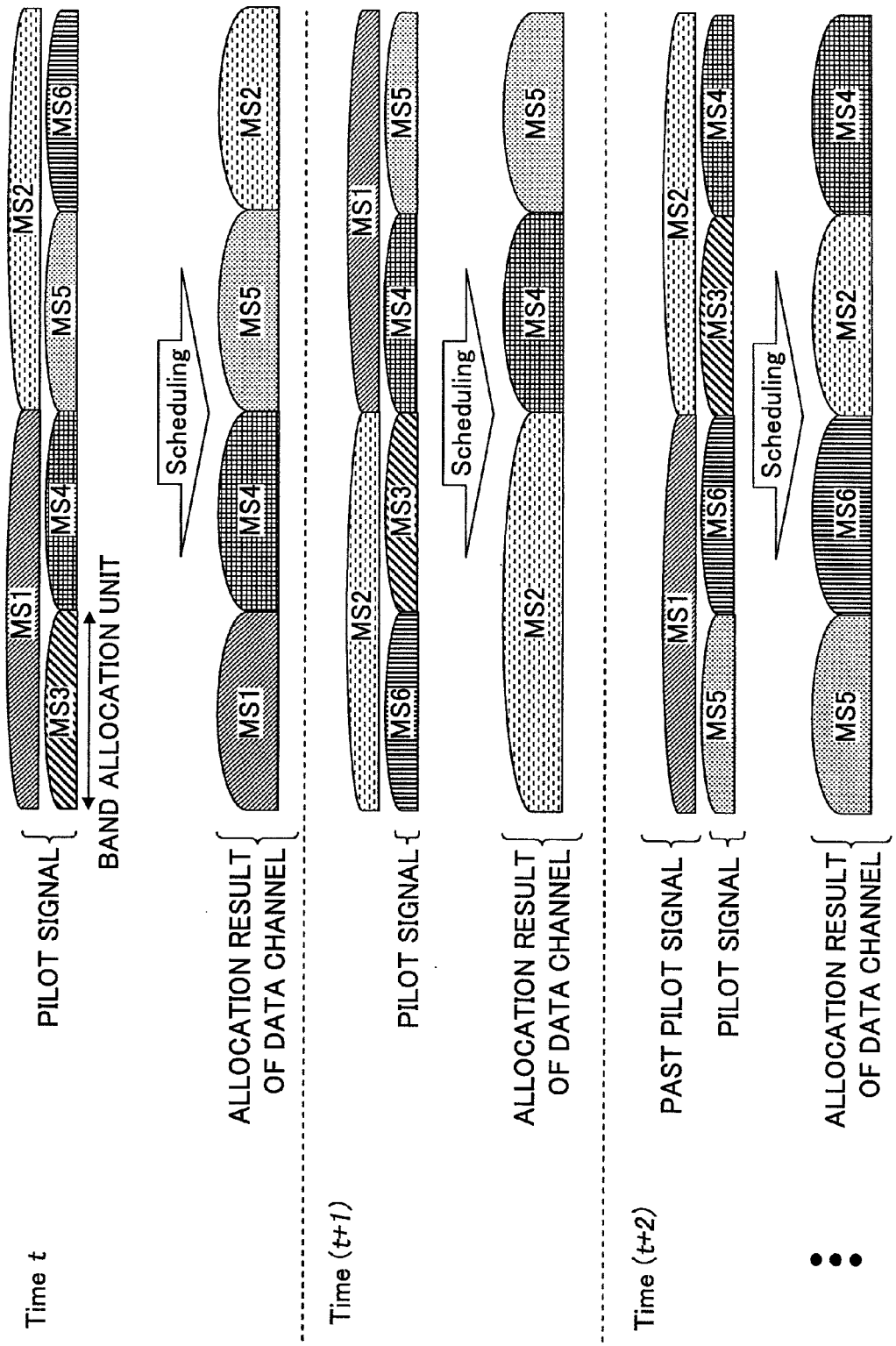

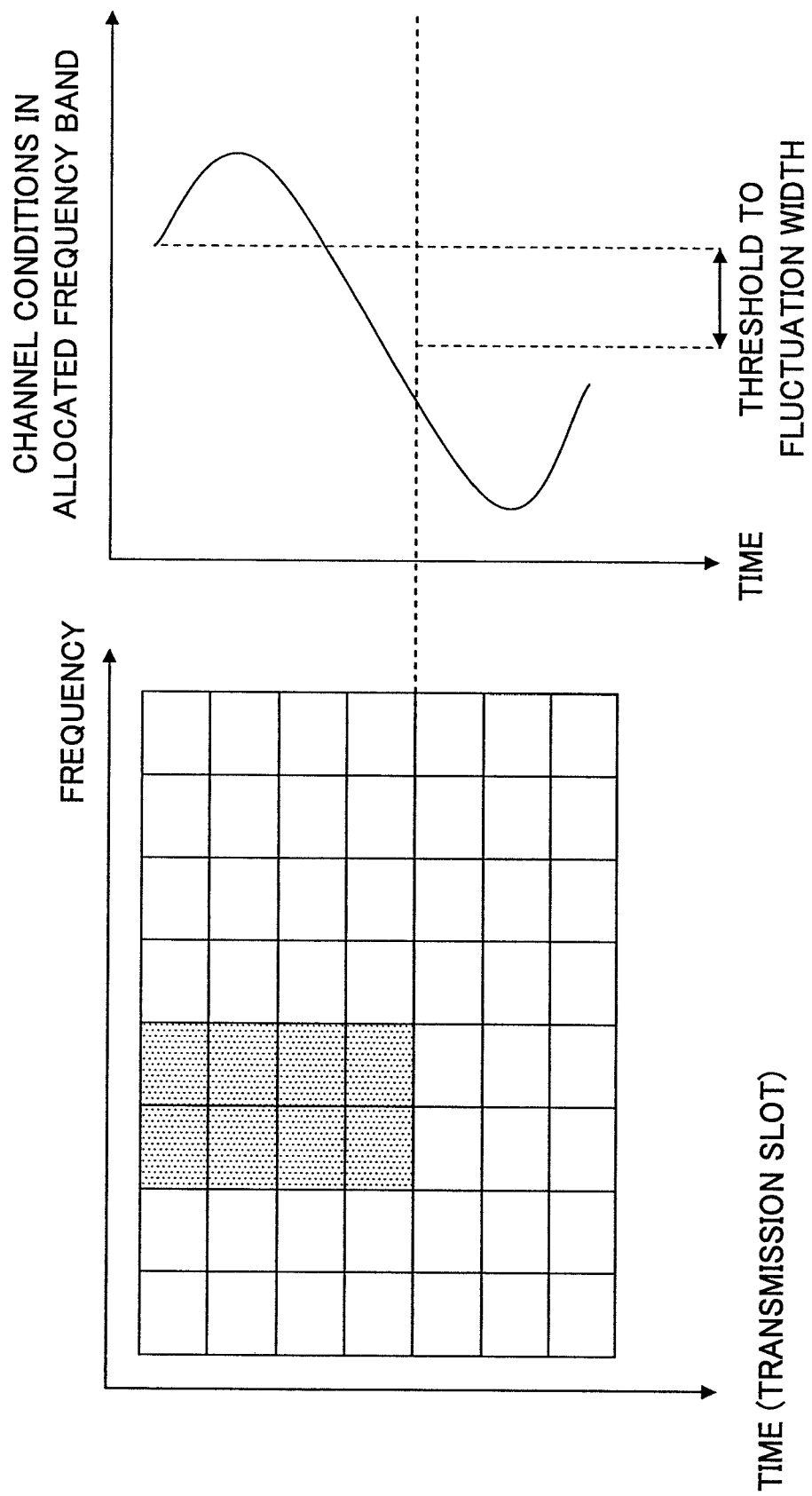

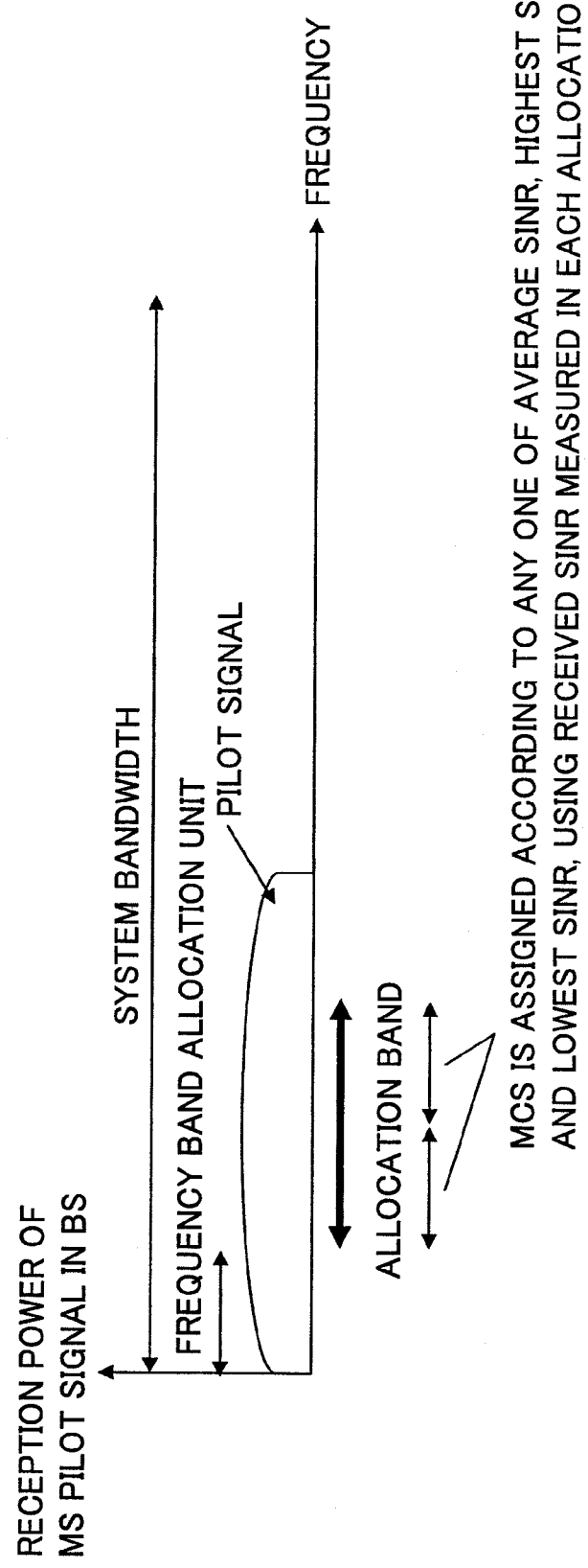

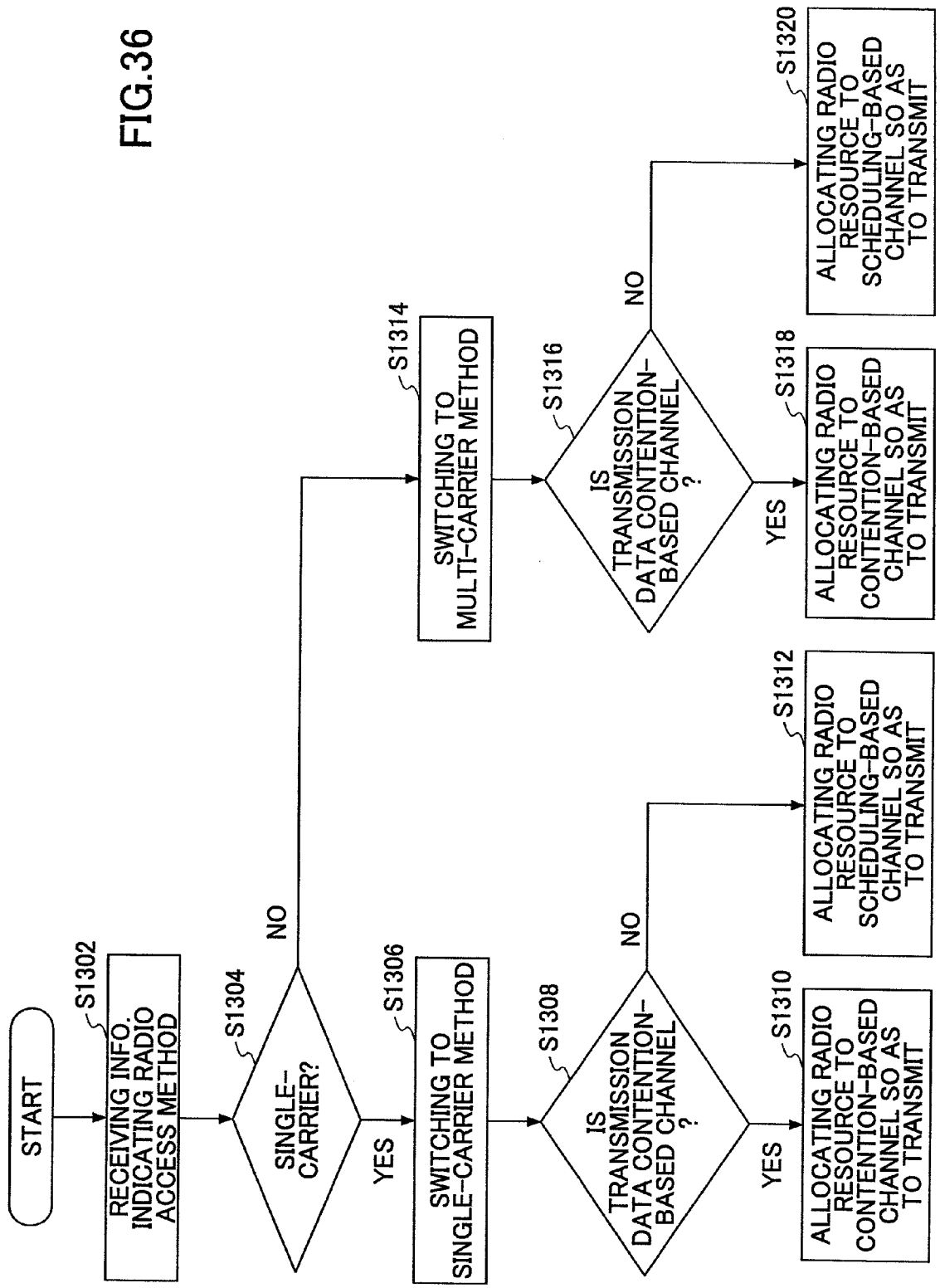

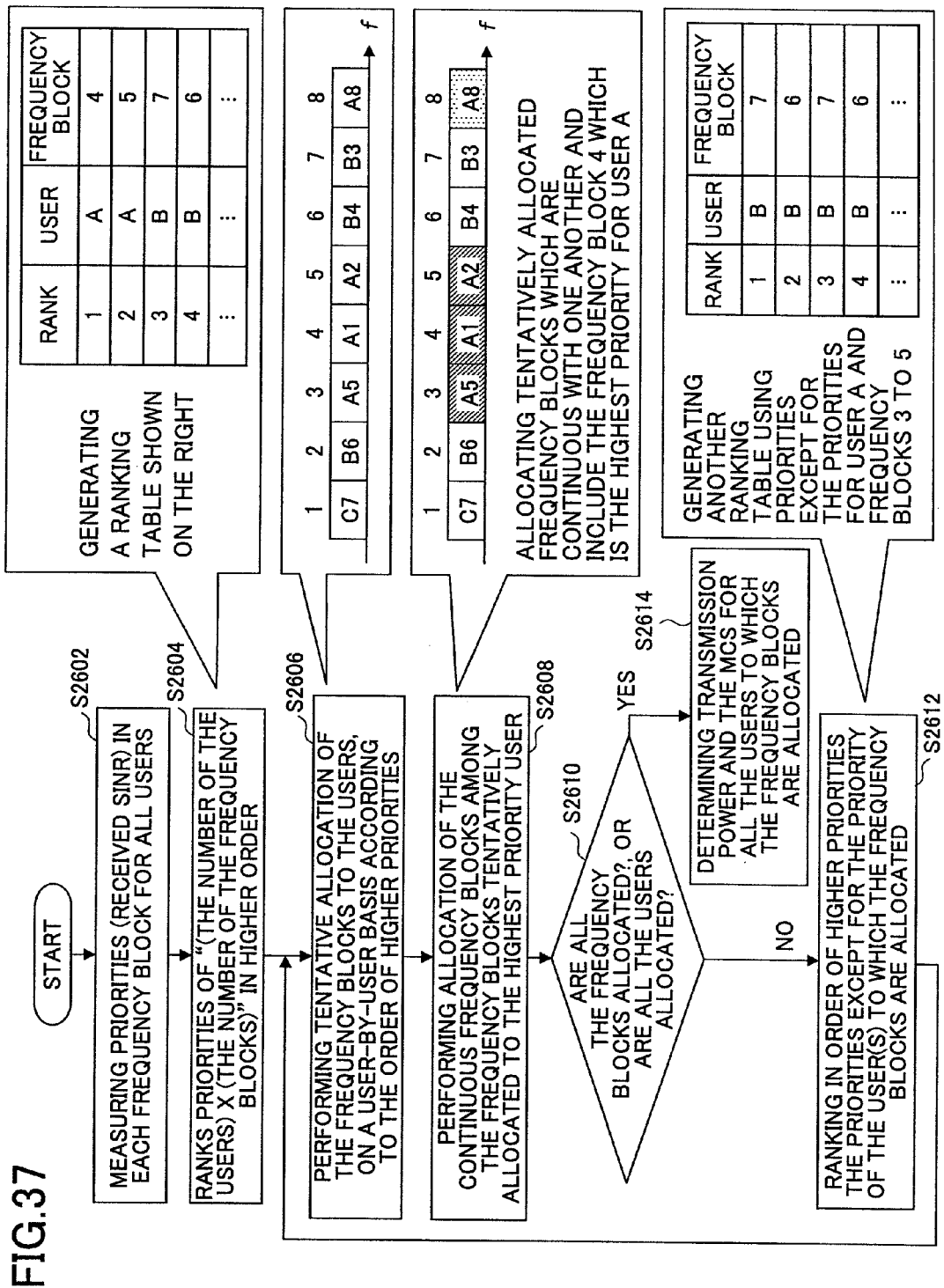

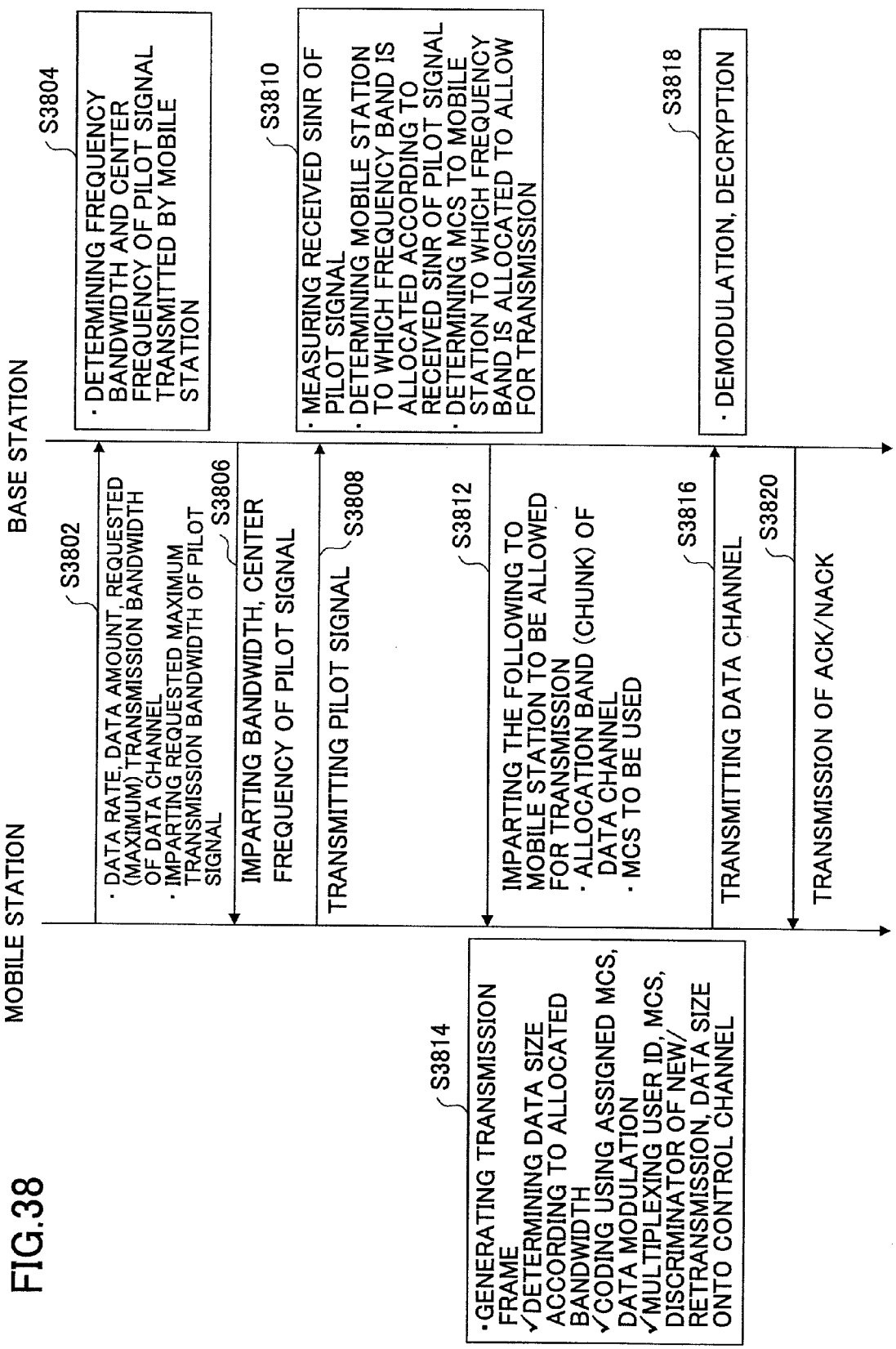

TRANSMISSION APPARATUS, RECEPTION APPARATUS, MOBILE COMMUNICATIONS SYSTEM AND TRANSMISSION CONTROL METHOD

CROSS-REFERENCE TO RELATED APPLICATIONS

This is a continuation application of U.S. patent application Ser. No. 11/909,711 filed Sep. 25, 2007, which is a national stage application of PCT/JP2006/305835.

TECHNICAL FIELD

The present invention relates to a transmission apparatus, a reception apparatus, a communications system and a transmission control method.

BACKGROUND ART

A fourth generation (4G) mobile communications method which is the next generation of IMT-2000 (International Mobile Telecommunications 2000) is under development. The fourth generation (4G) method is expected to flexibly support various environments from a multi-cell environment including a cellular system to an isolated cell environment such as a hotspot area and an indoors area, and increase frequency utilization efficiencies in both cell environments.

In the fourth generation communications method, the following radio access methods have been proposed for a link from a mobile station to a base station (referred to as an up-link, hereinafter). As single-carrier transmission methods, a DS-CDMA (Direct Sequence Code Division Multiple Access) method, an IFDMA (Interleaved Frequency Division Multiple Access) method, and a VSCRF-CDMA (Variable Spreading and Chip Repetition Factors-CDMA) method have been proposed, for example. As multi-carrier methods, an OFDM (Orthogonal Frequency Division Multiplexing) method, a Spread OFDM method, an MC-CDMA (Multi-Carrier Code Division Multiple Access) method, and a VSF-Spread OFDM (Variable Spreading Factor Spread OFDM) method have been proposed.

The single-carrier method provides high power efficiency because peak power is lower in terms of consumption power in a terminal, which reduces back-off of a transmission power amplifier.

As an example of the single-carrier methods, the VSCRF-CDMA method is explained with reference to FIG. 1 (See patent-related document 1).

A spreading portion 1 includes a code multiplication portion 2, a repetitive synthesis portion 8 connected to the code multiplication portion 2, and a phase shift portion 10 connected to the repetitive synthesis portion 8.

The code multiplication portion 2 multiplies a transmission signal by a spreading code. For example, a multiplier 4 multiplies the transmission signal by a channelization code defined under a predetermined code spreading ratio SF. In addition, a multiplier 6 multiplies the transmission signal by a scramble code.

The repetitive synthesis portion 8 compresses the spread transmission signal in a time-wise manner and performs chip repetition a predetermined number of times (CRF times). The transmission signal to which the repetition has been applied presents a comb-shaped frequency spectrum. When the repetition number CFR is equal to one, the repetitive synthesis portion 8 has the same configuration and operations in the usual DS-CDMA method.

The phase shift portion 10 deviates (or shifts) a phase of the transmission signal by a predetermined frequency established specifically for each mobile station.

In the VSCRF-CDMA method, when the CRF is greater than 1, for example, equal to 4, a comb-shaped frequency spectrum utilized by each user is arranged in a distributed manner over the entire band, as shown in FIG. 2A. In this case, a user-specific frequency offset is smaller than an allocated bandwidth.

On the other hand, when CRF is equal to 1, the spectrum utilized by each user is arranged over a block, as shown in FIG. 2B. In this case, the user-specific frequency offset is greater than the allocated bandwidth.

In addition, there has been proposed a radio access method where a comb-shaped frequency spectrum in the frequency domain is obtained (See non-patent documents 1, 2).

A transmission apparatus 30 to which the radio access method is applied includes a FFT portion 12 to which a spread data sequence is input, a rate conversion portion 14 connected to the FFT portion 12, a frequency domain signal generation portion 16 connected to the rate conversion portion 14, an IFFT portion 18 connected to the frequency domain signal generation portion 16, a GI addition portion 20 connected to the IFFT portion 18, and a filter 22 connected to the GI addition portion 20, as shown in FIG. 3.

The fast Fourier transformation (FFT) portion 12 divides the spread data sequence every Q chips into blocks and performs a fast Fourier transformation, thereby transforming the blocks into the frequency domain. As a result, Q single-carrier signals are obtained in the frequency domain. By the way, the spread data sequence corresponds to an output signal of the multiplier 6 in the spreading portion 1 explained with reference to FIG. 1.

The rate conversion portion 14 repeats a predetermined number of times, for example, CRF times the Q counts of the single-carrier signals. As a result, the number of the single-carrier signals generated is $$N_{sub} = Q \times CRF.$$

The frequency domain signal generation portion 16 shifts each single-carrier signal on the frequency axis so that the spectrum becomes comb-shaped. For example, when a process corresponding to CRF=4 is carried out, three zeros are arranged between every single-carrier signal. As a result, the comb-shaped frequency spectra explained with reference to FIGS. 2A and 2B are formed.

The IFFT portion 18 performs a fast inverse Fourier transformation on the comb-shaped spectra obtained by shifting each single-carrier signal on the frequency axis.

The guard interval addition portion 20 adds guard intervals to a signal to be transmitted. The guard intervals are obtained by replicating a portion of the top or end of a symbol to be transmitted. The filter 22 performs a band limitation on the transmission signal.

On the other hand, the multi-carrier method, which has a long symbol, can provide an improved reception quality in a multi path environment by providing the guard intervals.

As an example, the OFDM method is explained with reference to FIG. 4.

FIG. 4 is a block diagram of a transmission portion used in a transmission apparatus of the OFDM method.

The transmission portion 40 includes a series/parallel (S/P) conversion portion 32, a sub carrier mapping portion 34 connected to the S/P conversion portion 32, an IFFT portion 36 connected to the sub carrier mapping portion 34, and a GI addition portion 38 connected to the IFFT portion 36.

The series/parallel conversion portion (S/P) 32 converts series signal sequences to parallel signal sequences.

The sub carrier mapping portion 34 allocates to each sub carrier each signal which is converted to the parallel signal sequence in the series/parallel conversion portion 32. For example, the sub carrier mapping portion 34 allocates discrete sub carriers to each user as shown in FIG. 5A in order to obtain a frequency diversity effect. In addition, the sub carrier mapping portion 34 allocates consecutive sub carriers to each user as shown in FIG. 5B.

The fast inverse Fourier (IFFT) portion 36 performs the fast inverse Fourier transformation on the input signal so as to perform modulation of the OFDM method.

The guard interval addition portion 38 adds guard intervals to a signal to be transmitted and generates a symbol of the OFDM method.

Patent-related Publication 1: Japanese Patent Application Laid-Open Publication No. 2004-297756.

Non-patent Publication 1: M. Schnell, I. Broeck, and U. Sorger, "A promising new wideband multiple-access scheme for future mobile communication," European Trans. on Telecommun. (ETT), vol. 10, no. 4, pp. 417-427, July/August 1999.

Non-patent Publication 2: R. Dinis, D. Falconer, C. T. Lam, and M. Sabbaghian, "A Multiple Access Scheme for the Uplink of Broadband Wireless Systems," in Proc. Globecom 2004, December 2004.

DISCLOSURE OF INVENTION

Problem to be Solved by the Invention

However, the aforementioned related art has the following drawbacks.

The single-carrier method is accompanied with degradation of reception quality due to multi-pass interference especially when signals are transmitted at higher speed since symbols used are short.

In addition, the multi-carrier method, which requires a larger back-off since peak power becomes high regarding a terminal consumption power, is accompanied by a problem of lower power efficiency.

The present invention is directed to providing a transmission apparatus, a reception apparatus, a mobile communications system, and a transmission method where the single-carrier radio access method and the multi-carrier radio access method are switchable.

Means for Solving the Problem

In order to solve the above disadvantages, a transmission apparatus usable in a communications system of a single-carrier method and a communications system of a multi-carrier system, according to an embodiment of the present invention, comprises a switching portion that switches radio access methods, a frequency domain signal generation portion that allocates a radio resource to a spread chip sequence on which one of a fast Fourier transformation and a series/parallel conversion is performed in accordance with the switched radio accessed method, so as to generate a signal in a frequency domain; and a transmission signal generation portion that performs a fast inverse Fourier transformation on the signal in the frequency domain so as to generate a transmission signal.

With such a configuration, the single-carrier-based communications method and the multi-carrier-based communications method are realized in a common module and communications are performed by both access methods.

In addition, a reception apparatus according to an embodiment of the present invention comprises a radio access method determination portion that determines a radio access method used by a transmission apparatus; and an imparting portion that imparts the determined radio access method.

With such a configuration, the radio access method used by the transmission apparatus is determined and imparted.

Moreover, a mobile communications system including a reception apparatus and a transmission apparatus usable in a communications system of a single-carrier method and a communications system of a multi-carrier system, according to an embodiment of the present invention comprises: a radio access method determination portion that determines a radio access method used by the transmission apparatus; an imparting portion that imparts information indicating the determined radio access method; a switching portion that switches radio access methods; a frequency domain signal generation portion that allocates a radio resource to a spread chip sequence on which one of a fast Fourier transformation and a series/parallel conversion is performed in accordance with the switched radio access method so as to generate a signal in a frequency domain; and a transmission signal generation portion that performs a fast inverse Fourier transformation on the signal in the frequency domain so as to generate a transmission signal.

With such a configuration, the single-carrier-based communications method and the multi-carrier-based communications method are realized in a common module and communications are performed by both access methods.

Furthermore, a transmission control method according to an embodiment of the present invention comprises a step in which a reception apparatus determines a radio access method to be used; a step in which the reception apparatus imparts information indicating the determined radio access method; a step in which a transmission apparatus receives information indicating the radio access method; a step in which the transmission apparatus switches radio access methods in accordance with the information indicating the radio access method; a step in which the transmission apparatus allocates a radio resource to a spread chip sequence on which one of a fast Fourier transformation and a series/parallel conversion is performed so as to generate a signal in a frequency domain; and a step in which the transmission apparatus performs a fast inverse Fourier transformation on the signal in the frequency domain so as to generate a transmission signal.

With such a method, communications are made by the single-carrier-based communications method and the multi-carrier-based communications method in accordance with the determined radio access method.

Advantage of the Invention

According to embodiments of the present invention, a transmission apparatus, a reception apparatus, a mobile communications system, and a transmission method where the single-carrier radio access method and the multi-carrier radio access method are provided are switchable.

BRIEF DESCRIPTION OF DRAWINGS

FIG. 3 is a block diagram illustrating a transmission apparatus that performs a single-carrier transmission;

FIG. 9 is an explanatory view illustrating switching between a single-carrier method and a multi-carrier method;

FIG. 10 is an explanatory view illustrating switching between a single-carrier method and a multi-carrier method;

FIG. 11 is an explanatory view illustrating a method of transmitting up-link channel conditions;

FIG. 12A is an explanatory view illustrating notification of a requested maximum transmission bandwidth of a data channel and a pilot signal;

FIG. 12B is an explanatory view illustrating an expected received SINR of a channel conditions measurement signal when transmission is made at the maximum transmission power;

FIG. 18 is an explanatory view illustrating shared channel data channel scheduling;

FIG. 23A is an explanatory view illustrating received SINR measurement of a pilot signal transmitted by each mobile station, in a reception apparatus according to an example of the present invention;

FIG. 23B is an explanatory view illustrating received SINR measurement of a pilot signal transmitted by each mobile station, in a reception apparatus according to an example of the present invention;

FIG. 25A is an explanatory view illustrating frequency allocation for data channel transmission to a mobile station, in a reception apparatus according to an example of the present invention;

FIG. 25B is an explanatory view illustrating frequency allocation for data channel transmission to a mobile station, in a reception apparatus according to an example of the present invention;

FIG. 26 is an explanatory view illustrating re-allocation of a frequency band;

FIG. 29 is an explanatory view illustrating MCS assignment at the time of data channel transmission to a mobile station that is allowed to perform transmission;

FIG. 36 is a flowchart illustrating operations of a transmission apparatus according to an example of the present invention;

FIG. 37 is a flowchart illustrating operations of a reception apparatus according to an example of the present invention; and FIG. 38 is a flowchart illustrating operations of a mobile communications system according to an example of the present invention.

LIST OF REFERENCE SYMBOLS

Figure 1:
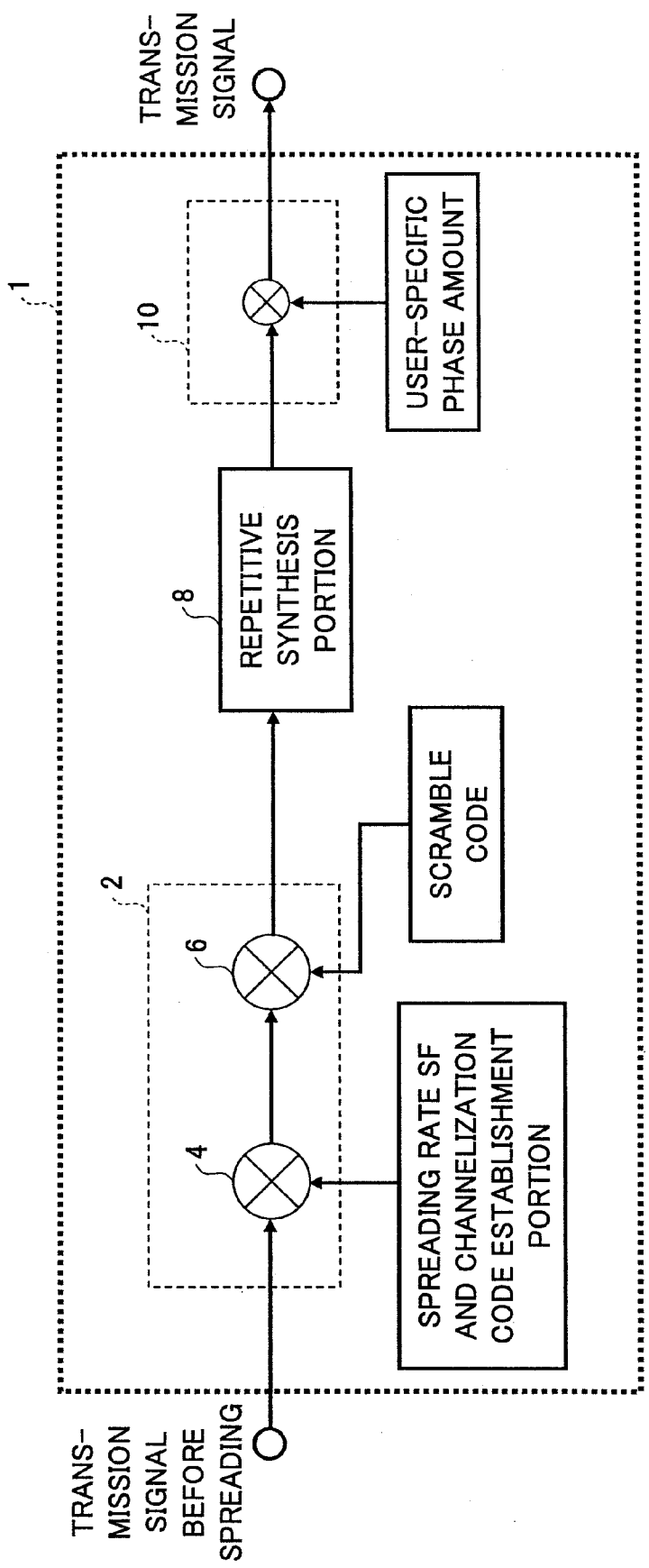
FIG. 1 is a block diagram indicating a spreading portion used in a VACRF-CDMA-based transmission apparatus.

1: spreading portion
2: code multiplication portion
3: phase shift portion
30, 40, 100: transmission apparatus
200, $200_1$, $200_2$, $200_3$, $200_4$, $200_5$, $200_6$: base station
300: mobile station
400: reception apparatus

BEST MODE FOR CARRYING OUT THE INVENTION

Referring to the accompanying drawings, a best mode for carrying out the invention will be described based on the following examples.

By the way, in all the drawings for describing the examples, like reference marks are given to members or components having like functions and unnecessary repetition of the description is omitted.

A mobile communications system according to an example of the present invention includes a mobile station and a base station capable of radio-communicating with the mobile station.

A transmission apparatus according to an example of the present invention is described.

The transmission apparatus is provided, for example, in the mobile station and transmits through an up-link channel.

The transmission apparatus according to this example is used in a cellular environment and a local area environment.

Figure 6A:
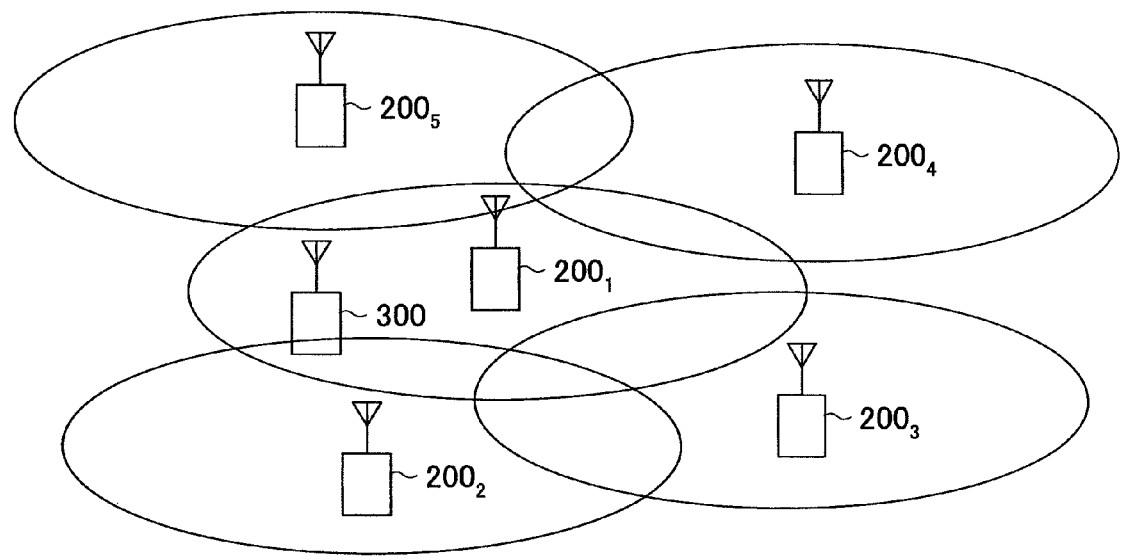
FIG. 6A is an explanatory view illustrating a cellular environment.
Figure 6B:
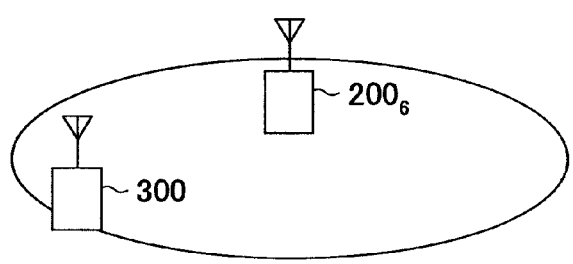
FIG. 6B is an explanatory view illustrating a local area environment.

As shown in FIG. 6A, the cellular environment includes base stations that cover cells (sectors), for example, base stations $200_1$, $200_2$, $200_3$, $200_4$, and $200_5$, and a mobile station 300 capable of radio-communicating with the base station $200_1$. The cellular environment has a larger cell radius and a higher transmission power of the mobile station than the local area environment. However, a feasible data rate is lower in the cellular environment due to interference from neighboring cells.

Therefore, the single-carrier method is more advantageous than the multi-carrier method as a up-link radio access method in the cellular environment.

On the other hand, the local area environment such as an indoor environment or a hotspot environment includes a base station that covers a cell (sector), for example, a base station $200_6$ and a mobile station 300 capable of radio-communicating with the base station $200_6$. The local area environment has a smaller cell radius and a lower consumption power of the mobile station than the cellular environment. However, the feasible data rate is relatively higher in the local area environment.

Therefore, the multi-carrier method is more advantageous than the single-carrier method as the up-link radio access method in the local area environment.

Figure 7:
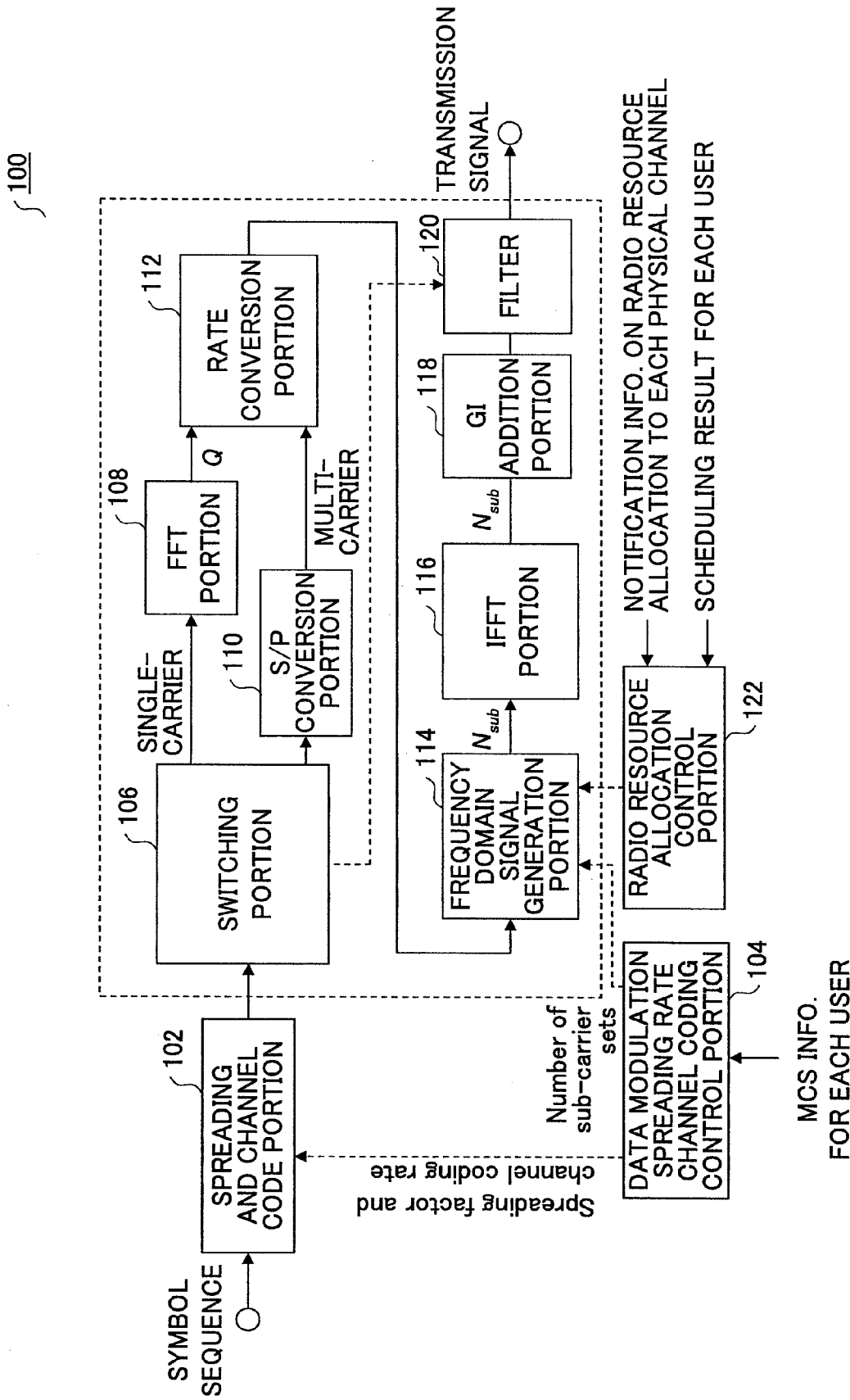
FIG. 7 is a partial block diagram illustrating a transmission apparatus according to one example of the present invention.

Next, referring to FIG. 7, the transmission apparatus according to this example is described.

A transmission apparatus 100 includes a spreading and channel code portion 102 to which symbol sequences are input, a switching portion 106 connected to the spreading and channel code portion 102, a fast Fourier transformation (FFT) portion 108 and a series/parallel (S/P) conversion portion 110 connected to the switching portion 106, and a rate conversion portion 112 connected to the FFT portion 108 and the S/P conversion portion 110.

In addition, the transmission apparatus 100 according to this example includes a frequency domain signal generation portion 114 connected to the rate conversion portion 112, a fast inverse Fourier transformation (IFFT) portion 116 connected to the frequency domain signal generation portion 114, a guard interval (GI) addition portion 118 connected to the IFFT portion 116, and a filter 120 connected to the GI addition portion 118.

Moreover, the transmission portion 100 according to this example includes a data modulation/spreading rate/channel coding control portion 104 connected to the spreading and channel code portion 102 and the frequency domain signal generation portion 114, and a radio resource allocation control portion 122 connected to the frequency domain signal generation portion 114. The switching portion 106 is connected to the filter 120.

To the data modulation/spreading rate/channel coding control portion 104 is input MCS (Modulation and Coding Scheme) information for each user. To the radio resource allocation control portion 122 is input notification information indicating radio resource allocation to each physical channel and information indicating a scheduling result for each user.

The data modulation/spreading rate/channel coding control portion 104 determines a spreading rate of orthogonal codes employed in the spreading and channel code portion 102 and outputs the orthogonal codes of the determined spreading rate and a cell-specific scramble code as well as the input MCS information for each user to the spreading and channel code portion 102.

For example, in the cellular environment, the data modulation/spreading rate/channel coding control portion 104 determines an orthogonal code of a spreading rate corresponding to the cellular environment and the cell-specific scramble code. On the other hand, in a local area environment, the data modulation/spreading rate/channel coding control portion 104 determines an orthogonal code of a spreading rate corresponding to the local area environment and the cell-specific scramble code. In addition, the data modulation/spreading rate/channel coding control portion 104 outputs the number of sub carrier sets to the frequency domain signal generation portion 114.

The spreading and channel code portion 102 performs channel coding by applying an error correction code such as a turbo code or a convolution code to the input binary information sequence in accordance with the input MCS information, and thus modulates the channel-coded data. In addition, the spreading and channel code portion 102 generates a spread chip sequence by performing a spreading process using the input orthogonal codes of the spreading rate and the cell-specific scramble code, and thus outputs the spread chip sequence to the switching portion 106.

The switching portion 106 determines whether the information, which is provided by the base station 200 and indicates the radio access methods, shows the single-carrier method or the multi-carrier method. When the switching portion 106 determines that the imparted information indicating the radio access method shows the single-carrier method, the switching portion 106 outputs the input spread chip sequence to the FFT portion 108. When the switching portion 106 determines that the imparted information indicating the radio access method shows the multi-carrier method, the switching portion 106 determines that the imparted information indicating the radio access method shows the multi-carrier method, the switching portion 106 outputs the input spread chip sequence to the S/P conversion portion 110. In addition, the switching portion 106 outputs the imparted information indicating the radio access method to the filter 120.

Figure 8:
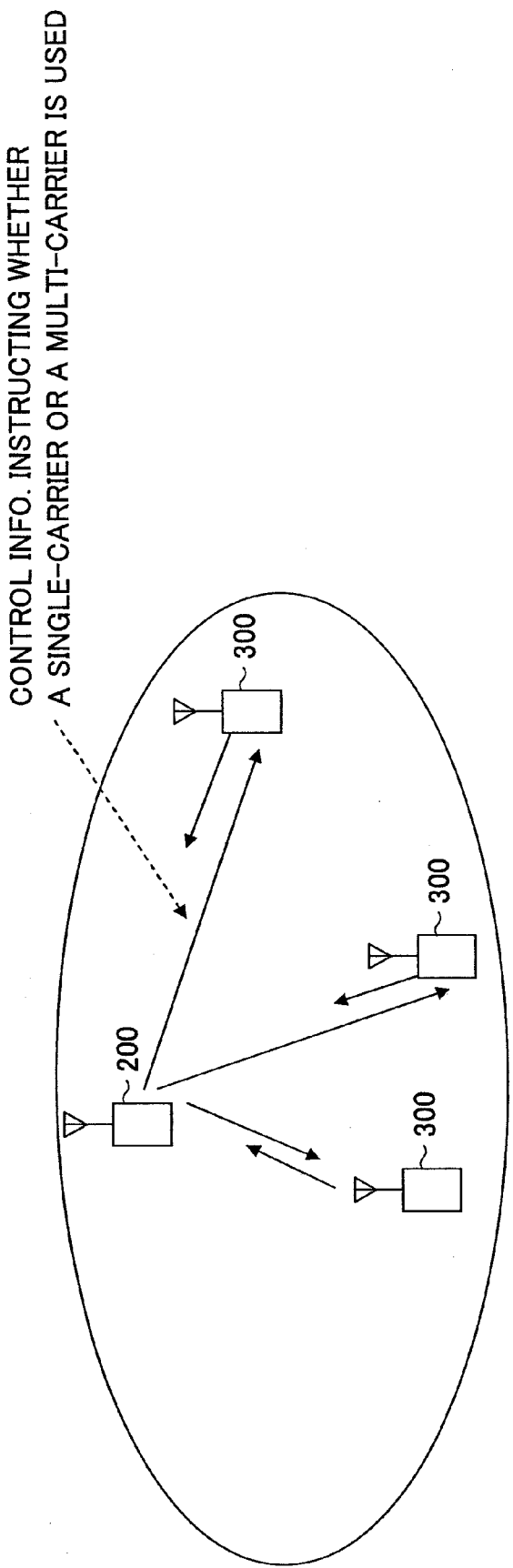
FIG. 8 is an explanatory view illustrating switching between a single-carrier method and a multi-carrier method.

For example, the switching portion 106 determines a radio access method in accordance with the notification information from the base station 200. In this case, the base station 200 determines in a radio access method determination portion 402 (described later) whether the single-carrier method or the multi-carrier method is allowed to be used by each user (mobile station), and imparts control information indicating the determined radio access method to the mobile stations 300 as shown in FIG. 8.

In addition, the switching portion 106 may determine the single-carrier method or the multi-carrier method in accordance with the radio access method determined for each cell, for example. In this case, the radio access method determination portion 402 of the reception apparatus provided in the base station 200 steadily determines in advance the up-link radio access method for each base station in accordance with the cell configuration.

For example, when the base station 200 is installed, the radio access method determination portion 402 determines the radio access method used in accordance with the cell configuration, for example, a cell radius, the presence or the absence of neighboring cells, or the like. For example, the single-carrier method is used when the cell radius is large, whereas the multi-carrier method is used when the cell radius is small. The radio access method determination portion 402 imparts information indicating the determined access method, as common control information for all the users, to the mobile stations 300, as shown in FIG. 9.

According to the above, the radio access method is determined when the base station is installed, which leads to simplified configuration and control.

In addition, the switching portion 106 may determine the single-carrier method or the multi-carrier method in accordance with the radio access method determined for each user (mobile station), for example. In this case, the access methods may be switched in accordance with the distance between each user and the base station, or the transmission power margin in each user.

For example, when the access methods are switched in accordance with the distance between each user and the base station 200, the path-loss may be used, for example, as a quantity corresponding to the distance between a user and the base station 200. In this case, the mobile station 300 measures the path-loss in a down-link using the reception power of the down-link pilot signal, and thus reports information indicating the measured path-loss to the base station 200 through the up-link.

The radio access method determination portion 402 of the reception apparatus provided in the base station 200 determines that the distance between the base station 200 and the mobile station 300 is large when the received path-loss value is greater than a predetermined threshold, and determines use of a single-carrier method. Then, the radio access method determination portion 402 imparts the use of a single-carrier method to the mobile stations 300 as common control information dedicated to a user, as shown in FIG. 10.

The radio access method determination portion 402 of the reception apparatus provided in the base station 200 determines that the distance between the base station 200 and the mobile station 300 is small when the received path-loss value is smaller than a predetermined threshold, and determines use of a single-carrier method. Then, the radio access method determination portion 402 imparts the use of a single-carrier method to the mobile stations 300 as common control information dedicated to a user, as shown in FIG. 10.

In such a manner, the radio access methods are controlled for each mobile station in accordance with the distance between the base station and the corresponding mobile station.

In addition, the mobile stations may determine the use of the single-carrier method or the multi-carrier method in accordance with the measured path-loss and report the determined result to the base station 200.

In addition, when the access methods are switched in accordance with the transmission power margin in each user, "(the maximum allowance transmission power)−(the current transmission power)" may be used, for example, as an indicator of the transmission power margin in each user. In this case, each of the mobile stations reports a value indicating "(the maximum allowance transmission power)−(the current transmission power)" to the base station.

The radio access method determination portion 402 of the reception apparatus provided in the base station 200 determines that the margin in the transmission power is small when the value indicating "(the maximum allowance transmission power)−(the current transmission power)" is smaller than a predetermined threshold, and determines the use of the single-carrier method. Thus, the radio access method determination portion 402 imparts the information to the mobile stations 300, as shown in FIG. 10.

On the other hand, the radio access method determination portion 402 of the reception apparatus provided in the base station 200 determines that the transmission power margin is large when the value indicating "(the maximum allowance transmission power)−(the current transmission power)" is greater than a predetermined threshold, and determines use of the multi-carrier method. Then, the radio access method determination portion 402 imparts the use of the multi-carrier method to the mobile stations 300, as shown in FIG. 10.

According to the above, the access methods are controlled in accordance with the performance of each mobile station.

In addition, the mobile stations 300 may transmit information indicating the maximum allowance transmission power and information indicating the current transmission power. Then, the radio access method determination portion 402 of the reception apparatus provided in the base station 200 may calculate "the maximum allowance transmission power−the current transmission power" and control the radio access methods in accordance with the calculated value.

Moreover, the mobile stations may determine use of the single-carrier method or the multi-carrier method in accordance with the transmission power margin and thus report the determined result to the base station 200.

Furthermore, the switching portion 106 may transmit a channel conditions measurement signal, for example, a pilot signal, using a predetermined frequency band requested to be allocated, in accordance with the radio access method determined for each user (mobile station), as shown in FIG. 11. For example, the switching portion 106 transmits the channel conditions measurement signal using only an assigned frequency band among the frequency bands allocated to the system. Specifically, when the frequency band of, for example, 20 MHz is allocated for the system, the mobile stations (transmission apparatus) are categorized into classes of the mobile stations that can use 20 MHz, 10 MHz, and 5 MHz. In this case, the switching portion 106 transmits the channel conditions measurement signal using only the frequency band corresponding to a class of the mobile stations (transmission apparatus) in accordance with the radio access method determined for the user (mobile station).

A radio resource allocation determination portion 404 of the reception apparatus 400 allocates a frequency band to the mobile station (transmission apparatus) to which the channel conditions measurement signal is transmitted, in accordance with the frequency band used to transmit the channel conditions measurement signal.

Namely, each mobile station (transmission apparatus) transmits the pilot signal, and the base station (reception apparatus) measures the pilot signals and thus the channel conditions between the base station and the mobile stations, thereby performing allocation of the frequency bands. The mobile stations do not have to transmit the pilot signals using the entire frequency band allocated to the system. But the mobile stations may transmit the pilot signals using the predetermined bands. The base station receives the pilot signal from each user and allocates the frequency bands if there is a band to be allocated in the range of the frequency bands. Then, the base station transmits the information indicating the determined frequency bands to the transmission apparatus.

In addition, the reception apparatus 400 may determine in the radio access method determination portion 402 the frequency bands for use in transmitting the channel conditions measurement signal and thus transmit the information indicating the frequency bands.

In addition, the switching portion 106 may include a pilot signal generation portion, which transmits to the base station at least one of information indicating a requested (maximum) transmission bandwidth of a data channel, information indicating a quantity of data to be transmitted, and information indicating a data rate, in accordance with the access method determined for each user (mobile station) when the determined radio access method is the single-carrier method. Additionally, the pilot signal generation portion may transmit information indicating a requested (maximum) transmission bandwidth of the pilot signal to the base station.

For example, the pilot signal generation portion transmits to the base station at least one of information indicating the requested (maximum) transmission bandwidth of the pilot signal, information indicating the requested (maximum) transmission bandwidth of the data channel, information indicating the quantity of the data to be transmitted, and information indicating the data rate, through a contention-based channel. For example, the maximum transmission bandwidth is 5 MHz and the requested transmission bandwidth is narrower than 5 MHz.

As shown in FIG. 12A, it is assumed that W_able is the maximum bandwidth that can be used by the mobile station; Wp_req is the requested maximum transmission bandwidth of the pilot signal; and Wd_req is the requested (maximum) transmission bandwidth of the data channel. The pilot signal generation portion determines Wd_req within a range of Wd_req=<W_able in accordance with the quantity of data to be transmitted and the data rate. In addition, the pilot signal generation portion determines Wp_req within a range of Wd_req=<Wp_req=<W_able.

The switching portion 106 may determine that the transmission bandwidth of the channel conditions measurement signal is an integral multiple of the minimum transmission bandwidth determined in the system or $2^n$ times the minimum transmission bandwidth determined in the system.

In this case, the switching portion 106 performs transmission using a maximum transmission bandwidth where a received SINR expected when transmitting with the maximum transmission power or "the maximum transmission power–delta P" can exceed a required received SINR. For example, the switching portion 106 calculates the expected received SINR in accordance with an average interference power in the base station and an average path-loss between the base station (reception apparatus) and the mobile station (transmission apparatus).

For example, when the maximum transmission bandwidth is 5 MHz and the minimum transmission bandwidth is 1.25 MHz as shown in FIG. 12B, a transmission bandwidth that satisfies the required received SINR of the channel conditions measurement signal is 1.25 MHz and 2.5 MHz among the transmission bandwidths, namely, 1.25 MHz, 2.5 MHz, and 3.75 MHz. Therefore, the maximum transmission bandwidth that can exceed the required received SINR is 2.5 MHz.

In this case, even when the required received SINR is not expected to be realized in the case of transmission using the minimum transmission bandwidth, the transmission bandwidth used does not become narrower than the minimum transmission bandwidth and transmission is performed using the minimum transmission bandwidth.

The required received SINR of the channel conditions measurement signal is imparted through the broadcast channel throughout the cell.

Moreover, the switching portion 106 may set a different required quality for the channel conditions measurement signal, separately from the required quality for the data channel, for example, the required received SINR.

In this case, each required quality is imparted from a base station apparatus through the broadcast channel to the mobile stations administered by a sector concerned. For example, the base station apparatus imparts the required quality for the data channel using a dedicated control channel.

Figure 12C:
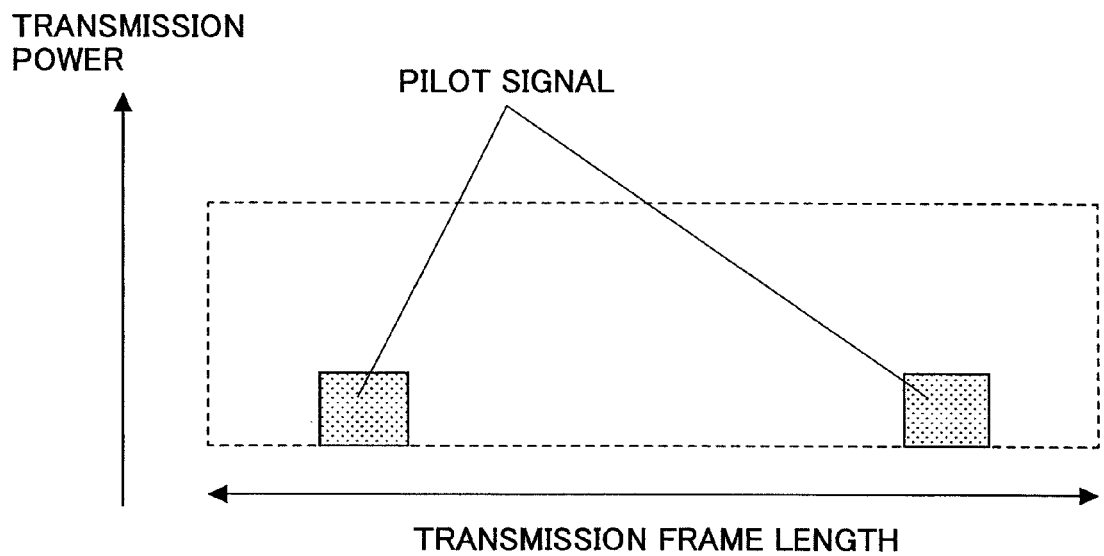
FIG. 12C is an explanatory view illustrating transmission power control when no data channel is allocated and only a channel conditions measurement signal is transmitted.

The switching portion 106 performs transmission power control based on the required quality for the channel conditions measurement signal when no data channel is allocated and only the channel conditions measurement signal is transmitted. For example, the switching portion 106 performs transmission with a transmission power determined by the transmission power control in accordance with the required quality when transmitting the pilot signal. For example, the switching portion 106 sets a low required quality necessary and sufficient for the measurement of the channel conditions, as shown in FIG. 12C. With this, interference by the pilot signals is reduced, thereby improving the throughput as a whole.

Figure 12D:
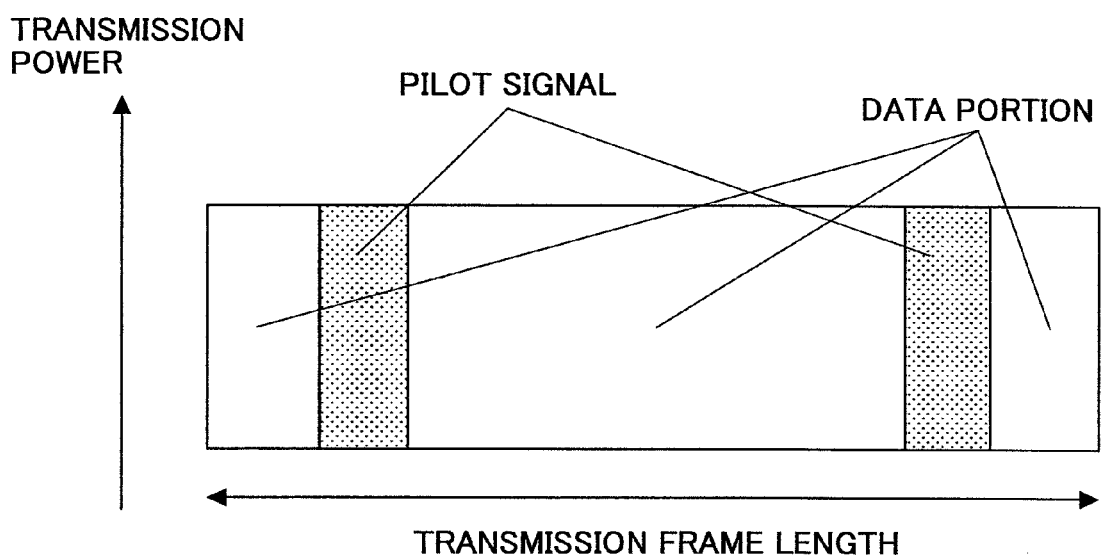
FIG. 12D is an explanatory view illustrating transmission power control when a data channel is allocated.
Figure 12E:
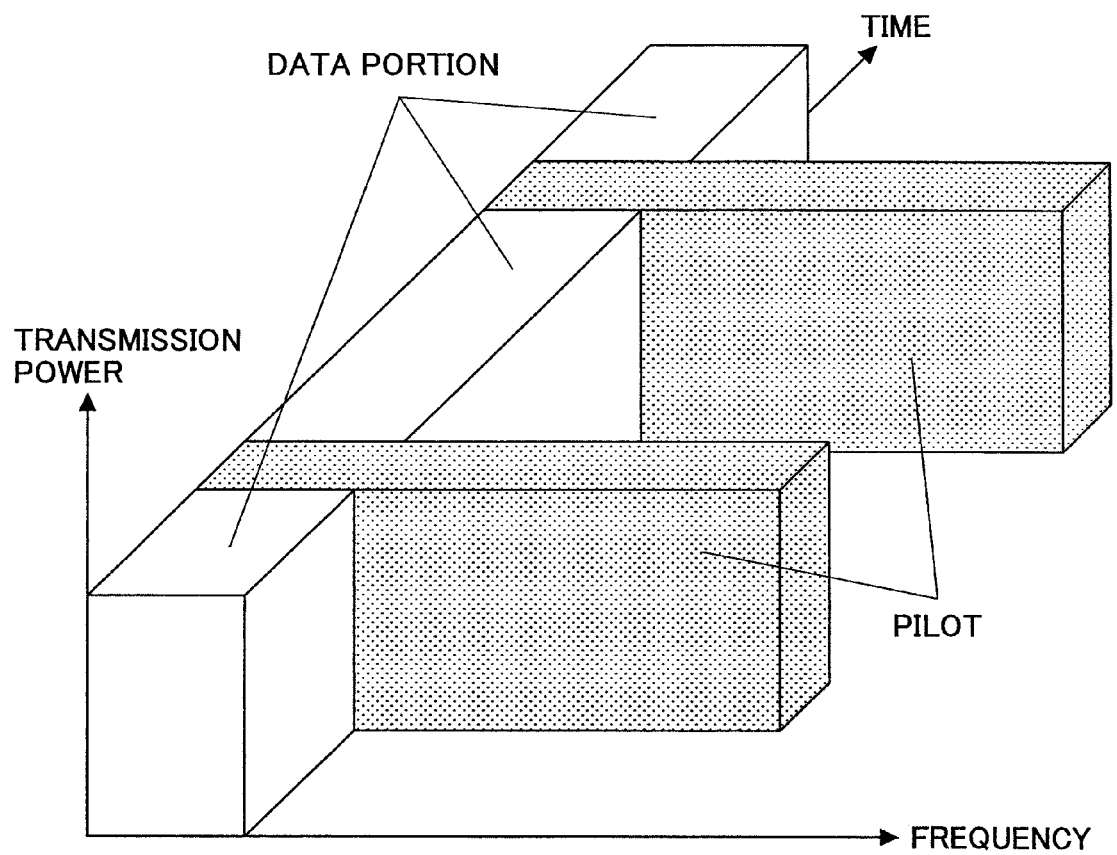
FIG. 12E is an explanatory view illustrating one example of transmission power control of a channel conditions measurement signal when a data channel is allocated.

The switching portion 106 performs the transmission power control for both a data portion and the channel conditions measurement signal portion in accordance with the required quality for the data channel when the data channel is allocated. For example, the switching portion 106 performs transmission with the same power as the data portion when the data channel is allocated, as shown in FIG. 12D. In this case, a higher required quality is set for the data portion since a highly efficient modulation method and/or coding rate is used. The switching portion 106 transmits the pilot signal with a higher transmission power since a highly accurate channel estimation is required.

Specifically, when the data channel is allocated and an allocation bandwidth for the data channel is narrower than the transmission bandwidth for the channel conditions measurement signal, the switching portion 106 controls the transmission power of the channel conditions measurement signal to be a transmission power that satisfies the required quality of the data channel, for example, the required received SINR in the transmission bandwidth for the channel conditions measurement signal, as shown in 12E.

Figure 12F:
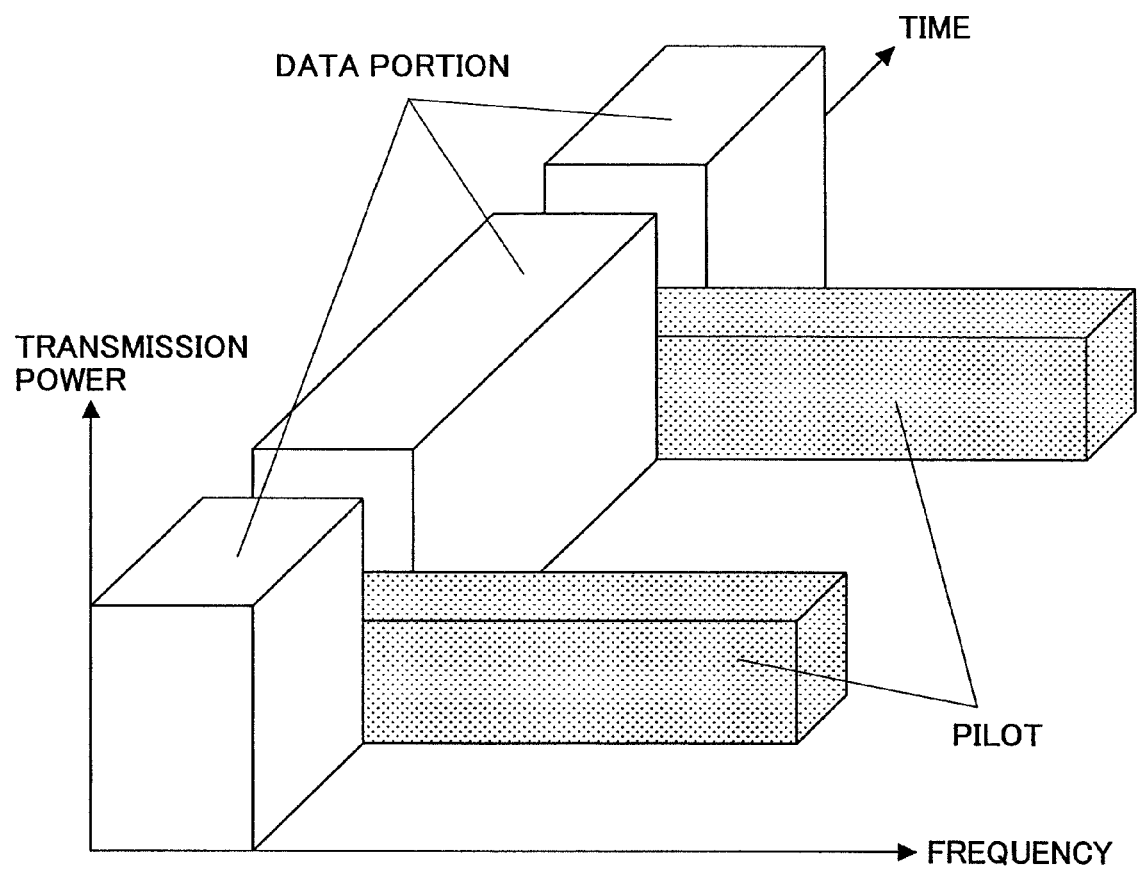
FIG. 12F is an explanatory view illustrating one example of transmission power control of a channel conditions measurement signal when a data channel is allocated.

When there is not a sufficient margin in the transmission power and the required quality is not satisfied, the switching portion 106 adjusts the transmission power to the maximum, as shown in FIG. 12F.

The base station 200 determines a center frequency and a transmission frequency bandwidth (transmission bandwidth) of the pilot signal transmitted by the mobile station in accordance with the information transmitted by the mobile station, for example, the requested (maximum) transmission bandwidth of the pilot signal, and thus imparts information indicating the determined center frequency and information indicating the determined transmission bandwidth of the pilot signal to the mobile stations.

The pilot signal generation portion transmits the pilot signal in accordance with the imparted information indicating center frequency and the imparted information indicating the transmission bandwidth of the pilot signal. In addition, when a frequency block ID is imparted, the pilot signal generation portion transmits the pilot signal in accordance with the transmission bandwidth and center frequency designated by the imparted frequency block ID. In this case, the pilot signal generation portion may transmit the pilot signal by a frequency hopping method. Moreover, the pilot signal generation portion may transmit the pilot signal through the frequency hopping by changing bands for use in transmission for each assigned band.

The FFT portion 108 divides the spread data sequence every Q chips into blocks, performs the fast Fourier transformation so as to transform the divided sequence into the frequency domain, and outputs the transformed divided sequence to the rate conversion portion 112. As a result, the Q counts of the single-carrier signals are obtained in the frequency domain.

The series/parallel conversion portion (S/P) 110 converts the Q signal sequences (stream) in series into plural parallel signal sequences, and thus outputs the parallel signal sequences to the rate conversion portion 112.

The rate conversion portion 112 repeats a predetermined number of times, for example, CRF times the Q single-carrier signals output from the FFT portion 108. As a result, the number of the single-carrier signals generated is $N_{sub}=Q \times CRF$. In addition, the rate conversion portion 112 outputs the Q parallel signal sequences which have been output from the series/parallel conversion portion (S/P) 110 to the frequency domain signal generation portion 114.

On the other hand, the radio resource allocation control portion 122 controls time and frequency blocks allocated to each physical channel in accordance with notification information indicating radio resource allocation to each physical channel imparted by the base station 200 and information indicating a scheduling result for each user.

In addition, the radio resource allocation control portion 122 controls allocation the radio resources for a certain period based on the time-scale of Transmission Time Interval (TTI) length of plural frequency blocks when the frequency blocks and the time are allocated to each physical channel.

Figure 13:
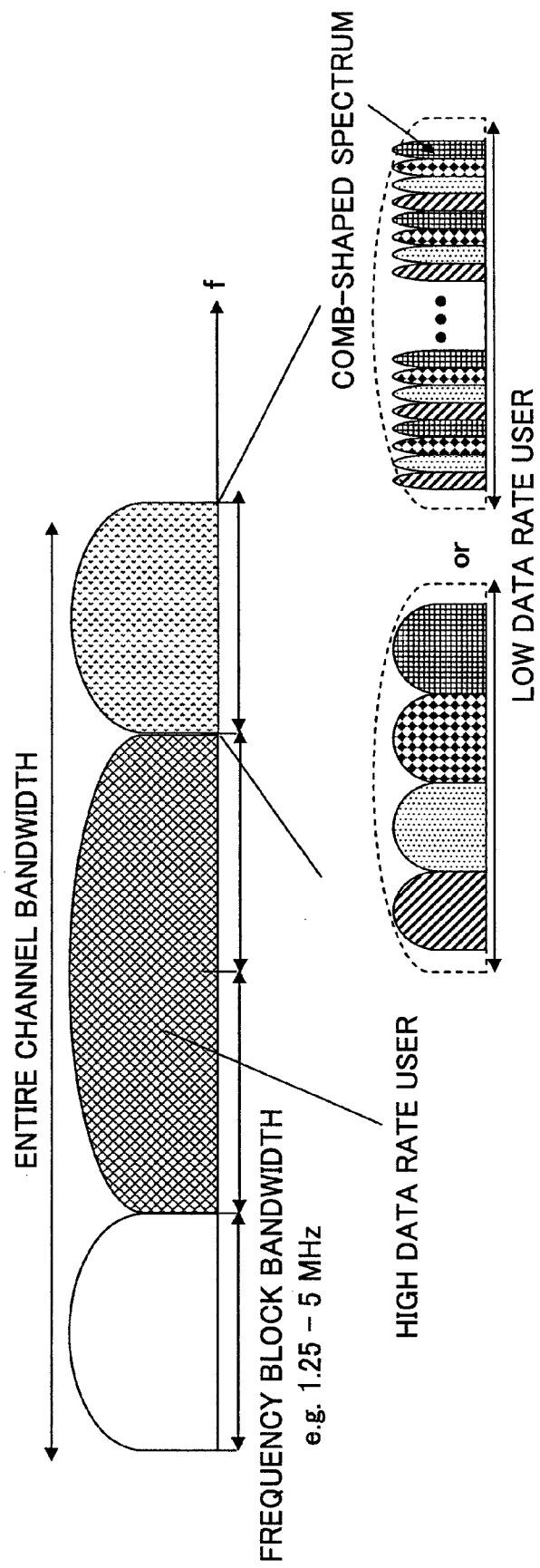
FIG. 13 is an explanatory view illustrating shared channel data channel scheduling.
Figure 14:
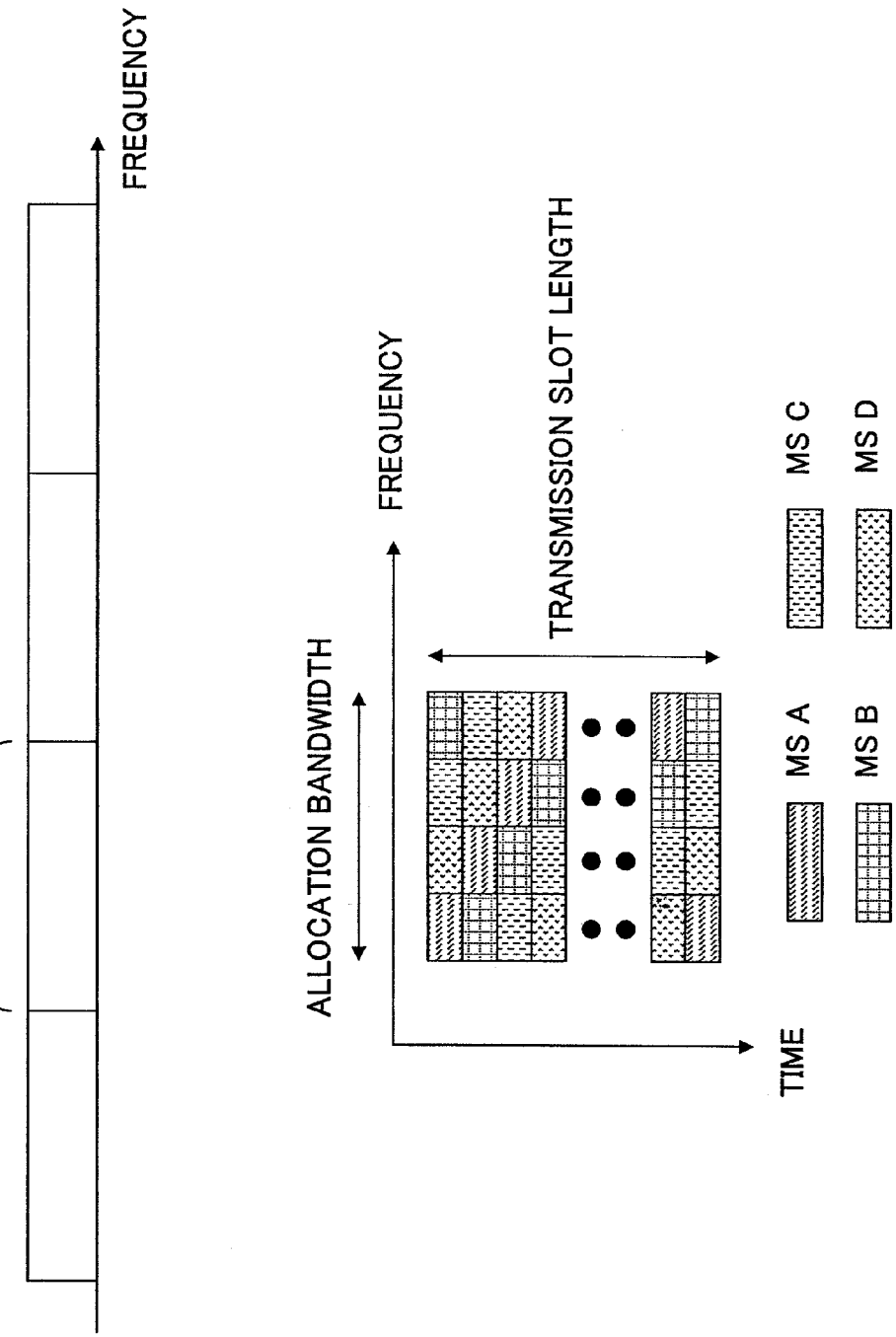
FIG. 14 is an explanatory view illustrating shared channel data channel scheduling.

Next, referring to FIGS. 13 and 14, shared data channel scheduling is explained. The shared data channel is allocated in accordance with the scheduling in the base station 200 as described later.

The frequency blocks are allocated in accordance with scheduling control information in the time domain in the frequency division multiplexing access where the frequency is steadily allocated, as shown in FIG. 13. In this case, plural frequency blocks are allocated to high data rate users, which allows each user to use only the frequency blocks allocated in advance. Thus, the transmission apparatus 100 does not have to transmit in advance pilot channels in other frequency blocks that are transmitted in order that the reception apparatus 400 is capable of measuring a channel quality indicator (CQI).

An optimal bandwidth of the frequency block is 1.25 to 5 MHz, for example. By widening the bandwidth of the frequency block, the multi user diversity effect can be enhanced in the frequency block.

When the single-carrier transmission is performed, the bandwidth allocated to each user may be variable in accordance with the data rate.

In addition, when the traffic size of a certain user is larger than the payload size of the frequency block, one frequency block may be exclusively used by one user.

Figure 2A:
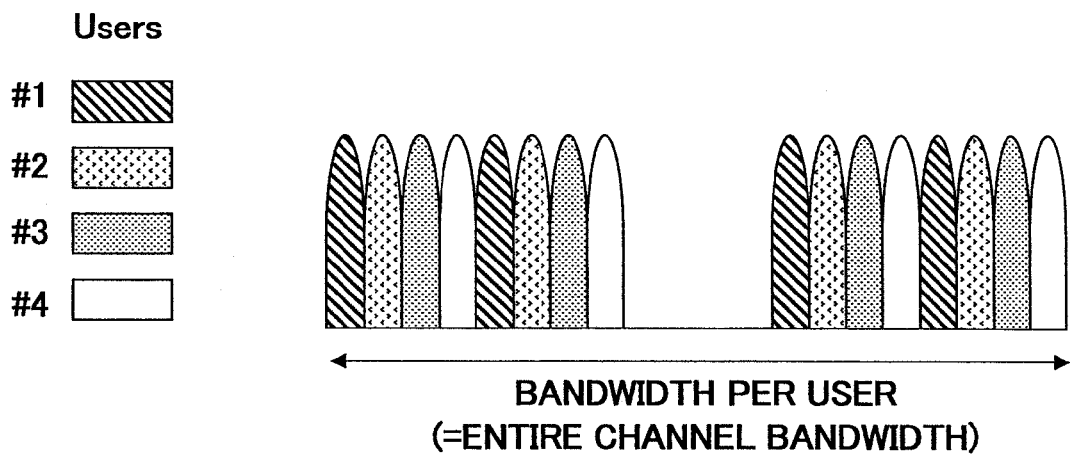
FIG. 2A illustrates an example of a frequency spectrum of a transmission signal of a mobile station.
Figure 2B:
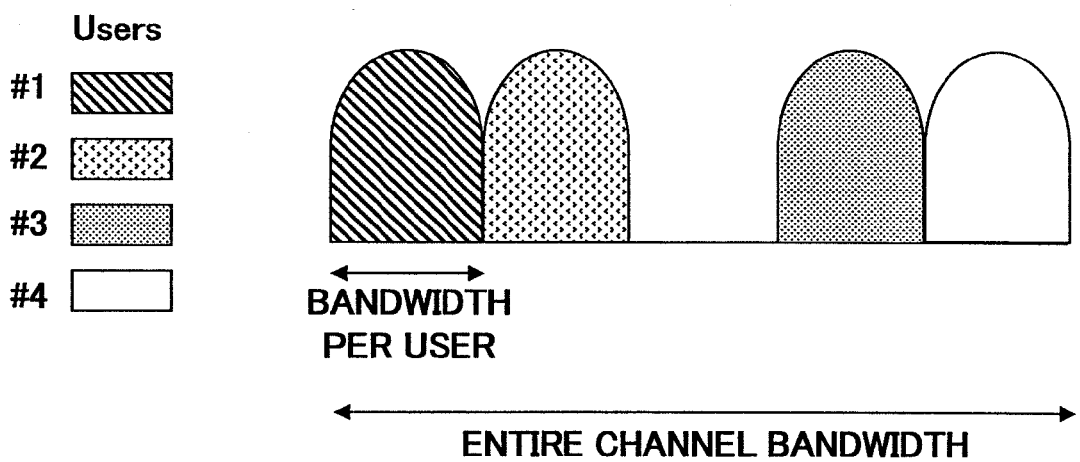
FIG. 2B illustrates an example of a frequency spectrum of a transmission signal of a mobile station.
Figure 4:
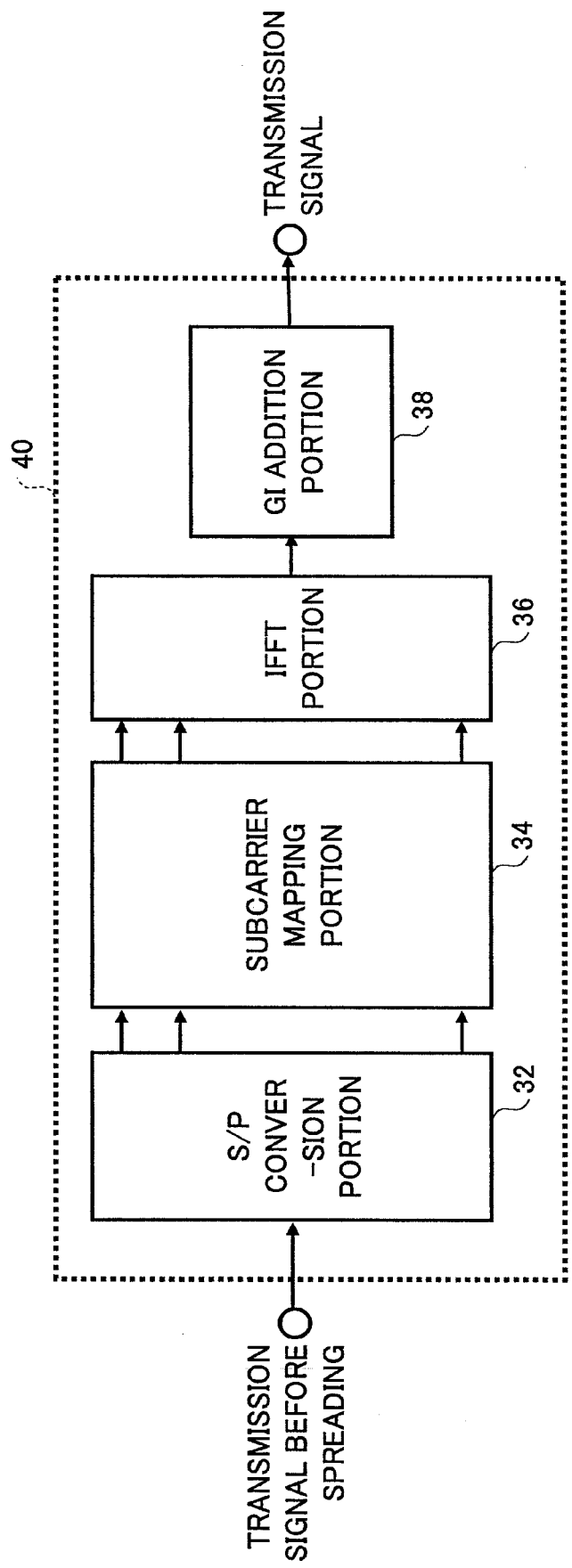
FIG. 4 is a block diagram illustrating a transmission apparatus that performs a single-carrier transmission.
Figure 5A:
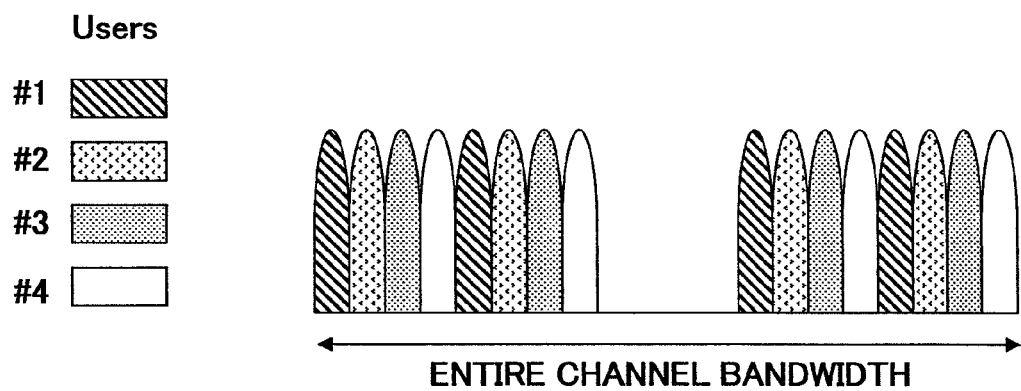
FIG. 5A illustrates an example of a frequency spectrum of a transmission signal of a mobile station.
Figure 5B:
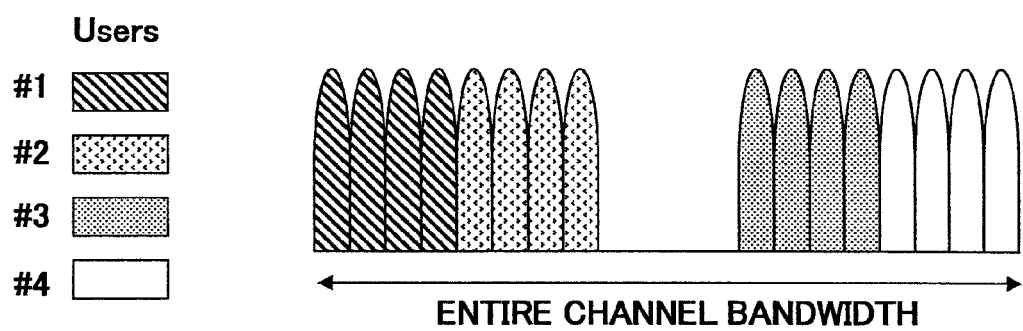
FIG. 5B illustrates another example of a frequency spectrum of a transmission signal of a mobile station.

A localized FDMA, which is a narrower FDMA arranged over the frequency block, is used by plural low data rate users. Namely, the spectrum utilized by each user is arranged over the block as described with reference to FIGS. 2A and 2B. In addition, the comb-shaped frequency spectrum utilized by each user may be distributed over the entire band. Other users use the comb-shaped spectrum. The localized FDMA may be mainly used in the shared data channel.

Moreover, one band, for example, a frequency block may be allocated to plural users, as shown in FIG. 14. In this case, frequency multiplexing using the comb-shaped frequency spectrum is used. Alternatively, plural users are multiplexed into one frame in a manner described as follows. Chip information by a certain unit is time-divisionally stored in TTI. This chip information is used as a unit so as to change the frequency used for the transmission. As stated, plural users are allocated to a certain band and transmission is performed using the frequency hopping. By allocating a certain frequency band to plural users, the interference from other cells (sectors) is averaged out. Therefore, fluctuations of the interference from other cells (sectors) can be reduced compared to a situation where users are changed in a certain frequency band so as to perform transmission.

Figure 15:
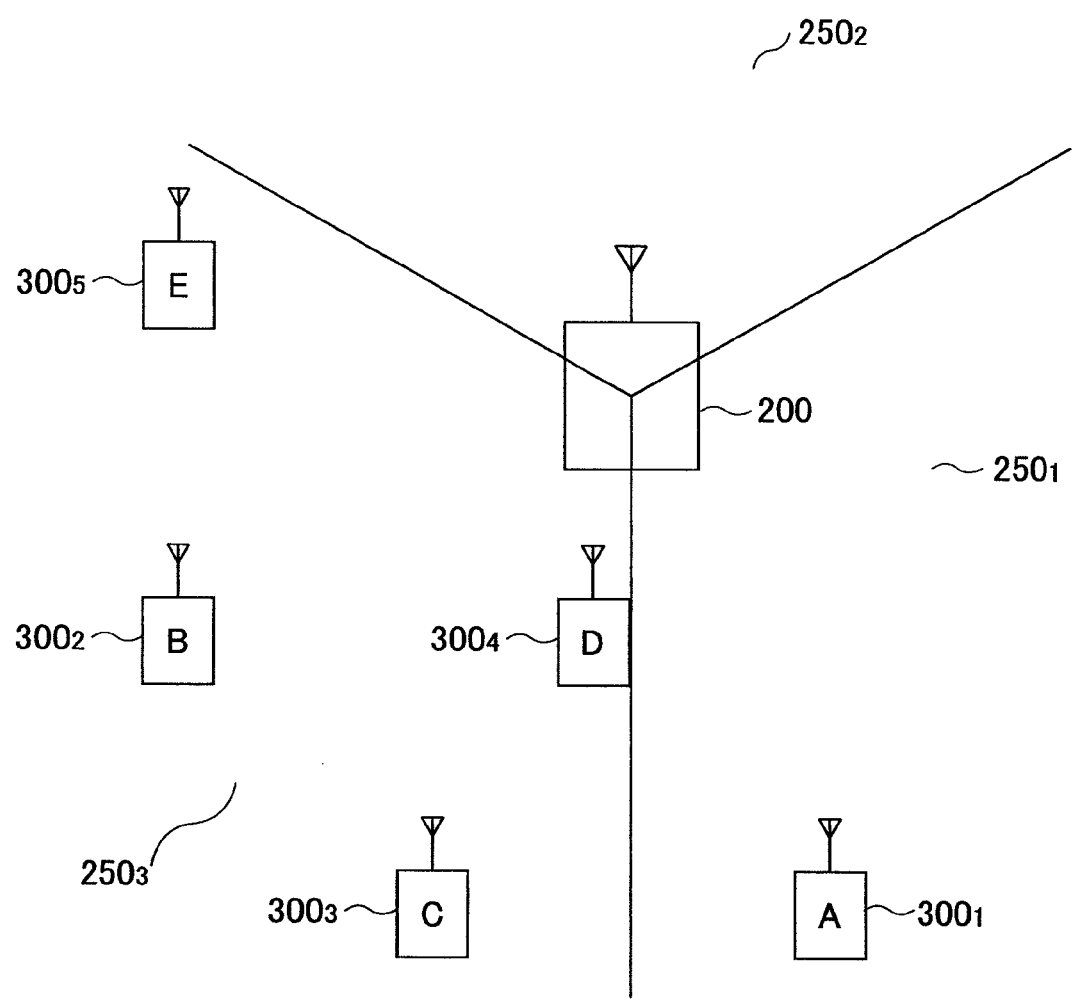
FIG. 15 is an explanatory view illustrating interference from other mobile stations.

Next, the following explanation is based on a situation where a coverage area covered by the base station 200 is composed of three sectors $250_1$, $250_2$, $250_3$; a mobile station $A300_1$ exists in the sector $250_1$; and a mobile station $B300_2$, a mobile station $C300_3$, a mobile station $D300_4$, and a mobile station $E300_5$ exist in the sector $250_3$, for example, as shown in FIG. 15.

When frequency blocks are allocated to each user, if another mobile station in a neighboring sector exists near the mobile station concerned, the interference power becomes larger, whereas the interference power becomes lower if the other mobile station exists far away.

Figure 16A:
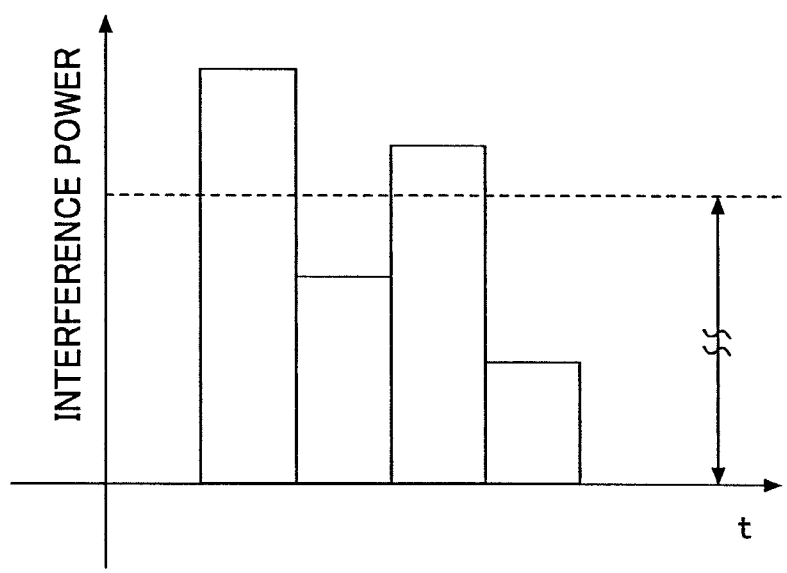
FIG. 16A is an explanatory view illustrating interference power fluctuations.

For example, the mobile station $A300_1$ existing in the sector $250_1$ is largely influenced by the interference power from the mobile station $D300_4$ that exists in the neighboring sector $250_3$ and is located near the mobile station $A300_1$, but not largely influenced by the interference power from the mobile station $E300_5$ existing far away. Therefore, the interference power varies with time as shown in FIG. 16A.

Figure 16B:
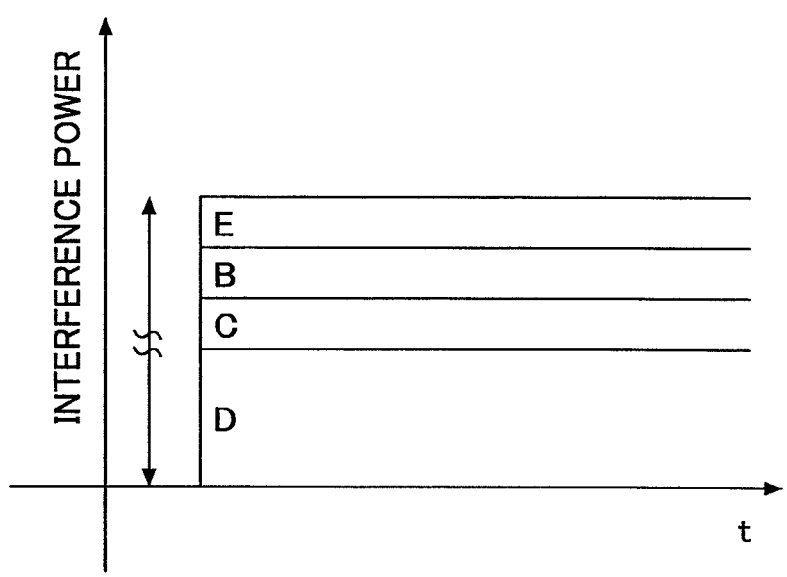
FIG. 16B is an explanatory view illustrating interference power fluctuations.

On the other hand, when the frequency hopping and the frequency division multiplexing access using the comb-shaped frequency spectrum are performed, the interference power is averaged out as a whole and becomes substantially constant, as shown in FIG. 16B, which reduces time-wise variations of the interference power. In this case, although the transmission power per user is reduced, efficiency per user remains unchanged by performing continuous allocation over plural time slots, thereby reducing variations of the interference from other cells (sectors).

Figure 17:
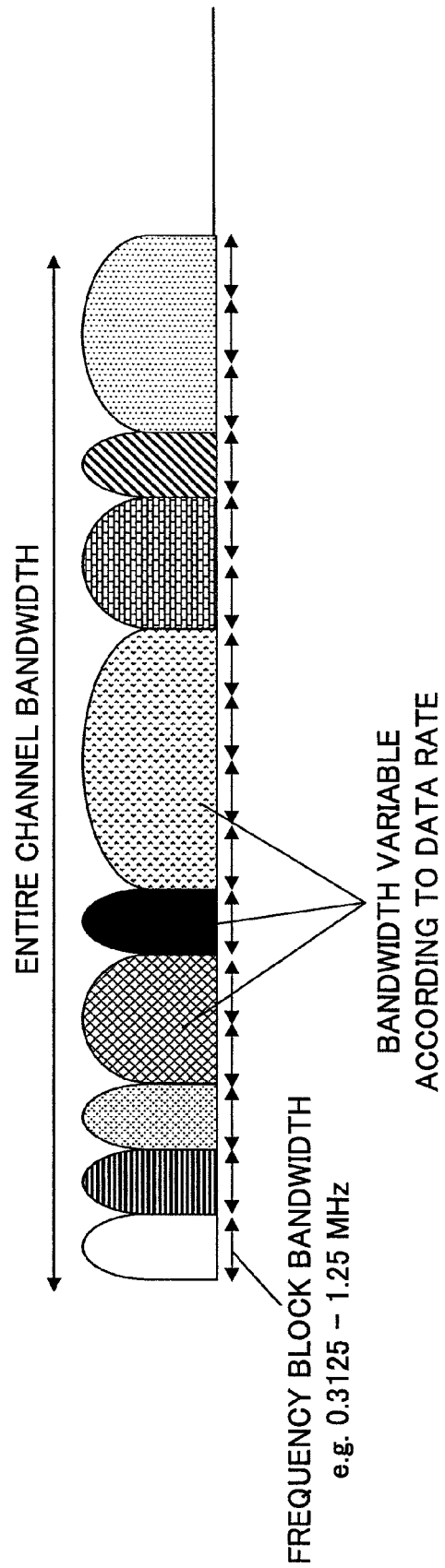
FIG. 17 is an explanatory view illustrating shared channel data channel scheduling.

In addition, the frequency blocks may be allocated in accordance with control information on the scheduling in the time domain and the frequency domain, as shown in FIG. 17.

In this case, the pilot channel which is transmitted in order that the reception apparatus 400 measures the channel quality indicator (CQI) is transmitted over all the frequency blocks, namely, over all the channel bandwidths.

In addition, when a traffic size of a certain user is larger than a payload size of the frequency block, one frequency block may be exclusively used by one user.

When there are plural low data rate users, one frequency block is used by plural users. In this case, orthogonal frequency spectra, namely, the narrower FDMA (localized FDMA) which is arranged over the frequency block, or the comb-shaped spectrum (distributed FDMA) is applied to the same frequency block. Namely, as described with reference to FIGS. 2A and 2B, the spectrum utilized by each user is arranged over the block within the frequency block. In addition, the frequency spectrum utilized by each user may be distributed and arranged in the shape of a comb over the frequency block, which reduces multi user interference.

An optimal bandwidth of the frequency block is 0.3125 to 1.25 MHz, for example. By narrowing the bandwidth of the frequency block and scheduling the channel in the frequency domain, the multi user diversity effect can be enhanced.

When the single-carrier transmission is performed, the bandwidth allocated to each user may be variable in accordance with the data rate.

The narrower FDMA (localized FDMA) arranged over the frequency block is used by plural low data rate users.

In addition, when the scheduling is performed in the time domain and the frequency domain, the frequency blocks may be grouped, which reduces an overhead of the pilot channel.

Additionally, the bandwidth may be changed in accordance with the channel conditions, as shown in FIG. 18. For example, the frequency band allocated to the system is divided into plural frequency blocks so as to perform allocation. In this case, when the channel conditions are good, plural frequency blocks, for example, two frequency blocks are allocated (users A, B, and C), and when the channel conditions are not good, fewer frequency blocks than the frequency blocks allocated when the channel conditions are good are allocated (user D). The single-carrier transmission is performed in the frequency band so allocated, which improves efficiency as a whole.

Figure 19A:
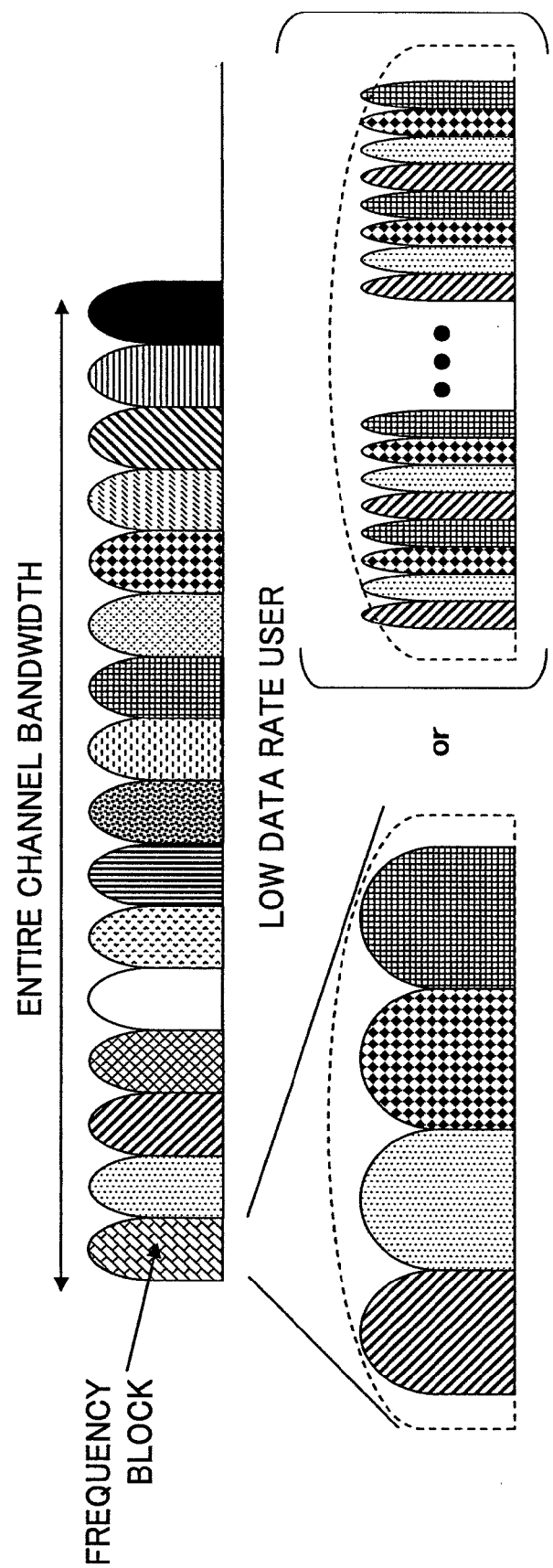
FIG. 19A is an explanatory view illustrating shared channel data channel scheduling.
Figure 19B:
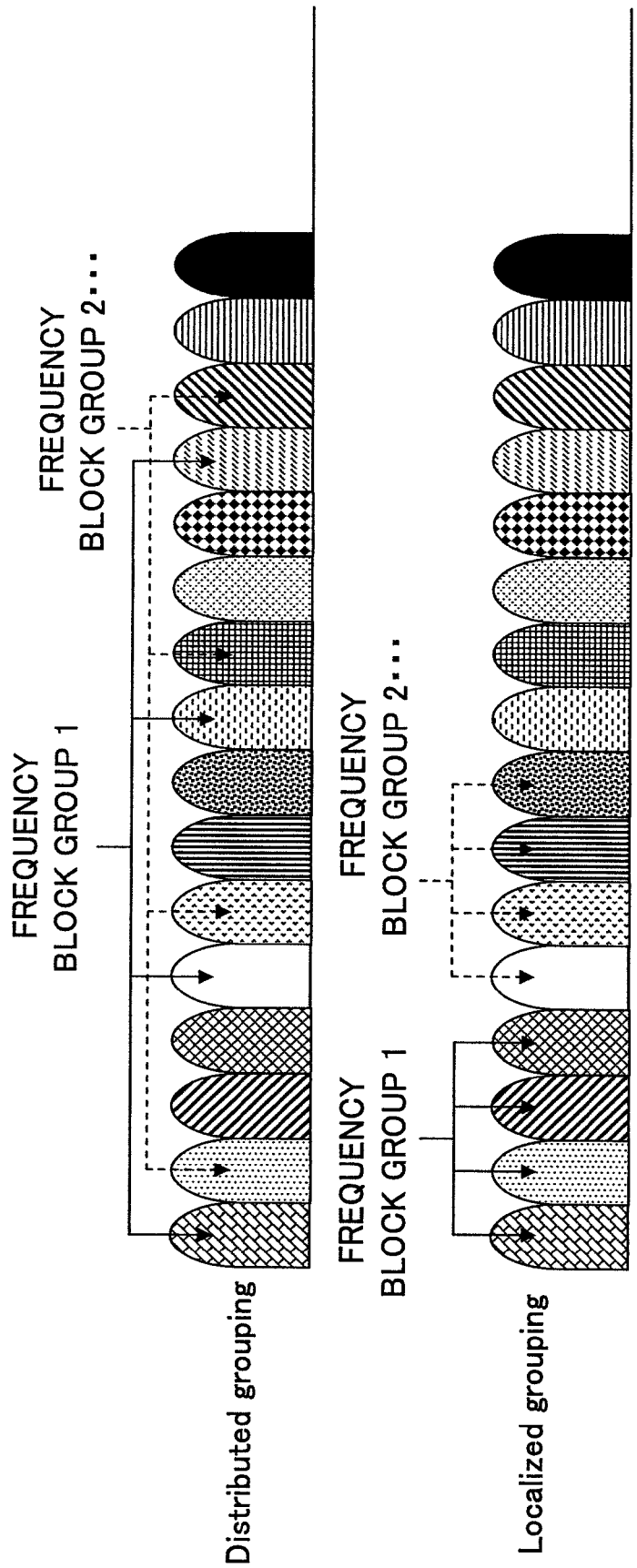
FIG. 19B is an explanatory view illustrating shared channel data channel scheduling.

Referring to FIGS. 19A and 19B, frequency block grouping is explained.

When the frequency block grouping is not performed, the narrower FDMA (localized FDMA) which is arranged over the frequency block, or the comb-shaped spectra is used by plural low data rate users as shown in FIG. 19A.

As the frequency block grouping, there are distributed grouping where discrete frequency blocks form a group and a localized grouping where consecutive frequency blocks form a group, as shown in FIG. 19B.

As stated above, overhead of the pilot channel for use in CQI measurement can be reduced by grouping the frequency blocks in advance so as to perform scheduling in the frequency domain.

For example, the radio resource allocation determination portion 404 of the reception apparatus provided in the base station 200 determines the time and frequency allocated to a contention-based channel, for example, a random access channel or reserve packet channel in accordance with a channel load or the like, and thus imparts the corresponding allocation to each mobile station through the down-link broadcast channel. For example, the radio resource allocation determination portion 404 determines to allocate the radio resources so that at least one portion of the allocated frequency band is utilized, when the signal to be transmitted is the contention-based channel.

In addition, the radio resource allocation determination portion 404 of the reception apparatus provided in the base station 200 performs scheduling depending on the channel conditions and determines the time and frequency allocated for a scheduling-base channel, for example, the shared data channel or the like, and thus imparts to each mobile station through the down-link broadcast channel. Traffic data and layer 3 control messages are transmitted through the shared data channel. In addition, when communicating through the shared data channel, H-ARQ (hybrid automatic repeat request) may be employed.

In addition, the radio resource allocation determination portion 404 of the reception apparatus provided in the base station 200 performs scheduling, determines the time and frequency allocated for the scheduling-based channel, for example, a channel through which control information (referred to as a shared control channel) is transmitted, and imparts the corresponding allocation to each mobile station through the down-link broadcast channel.

Figure 20A:
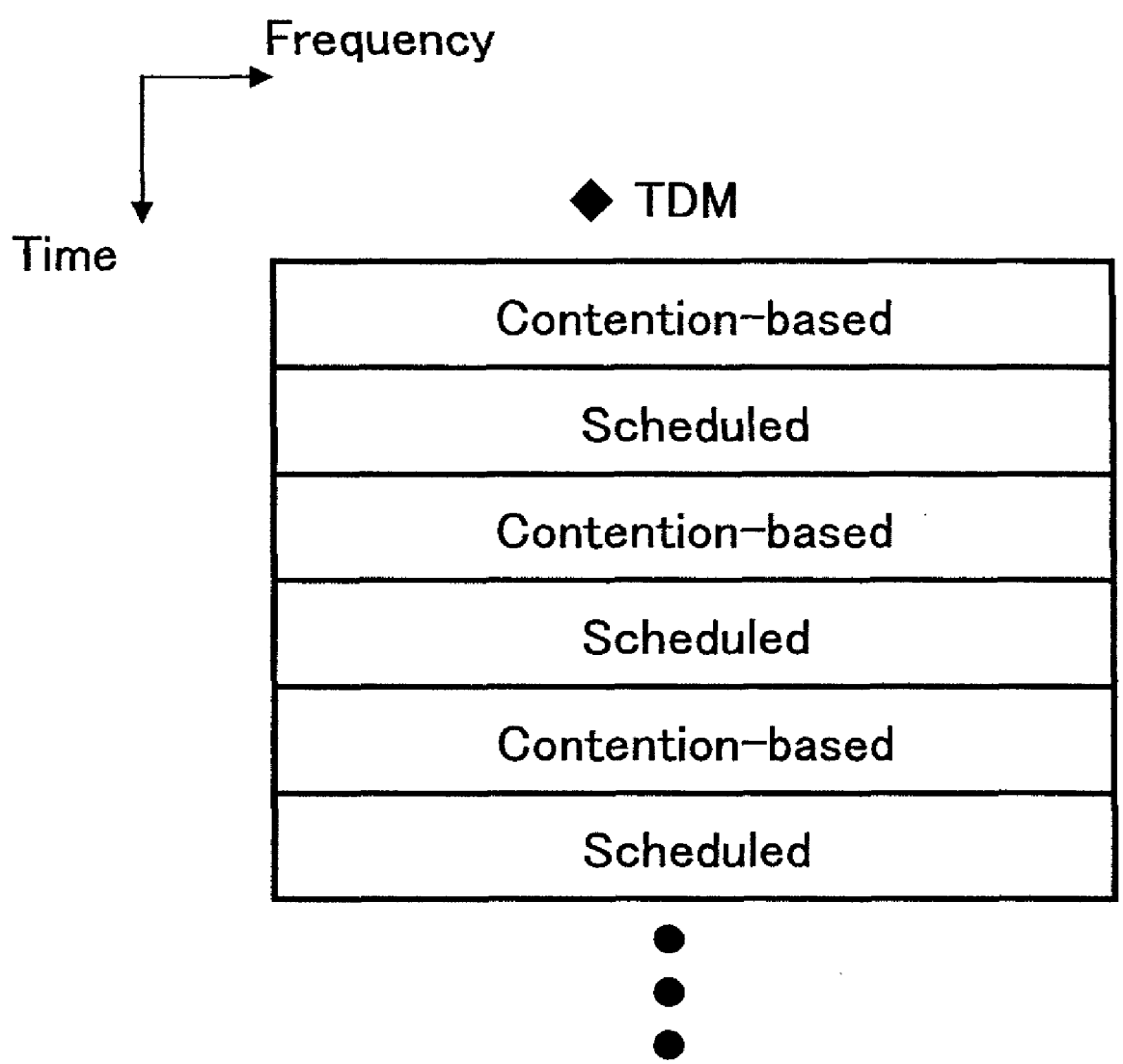
FIG. 20A is an explanatory view illustrating radio resource allocation in a transmission apparatus according to an example of the present invention.

The radio resource allocation control portion 122 controls so that the contention-based channel and the scheduled channel are multiplexed. For example, the radio resource allocation control portion 122 controls so that the contention-based channel and the scheduling-base channel are time-multiplexed, as shown in FIG. 20A. In this case, the radio resource allocation control portion 122 may perform an adaptive TTI length control and set the TTI length longer, which reduces the ratio of the shared control channel occupied in the entire length of the TTI, thereby reducing the overhead of the shared control channel.

Figure 20B:
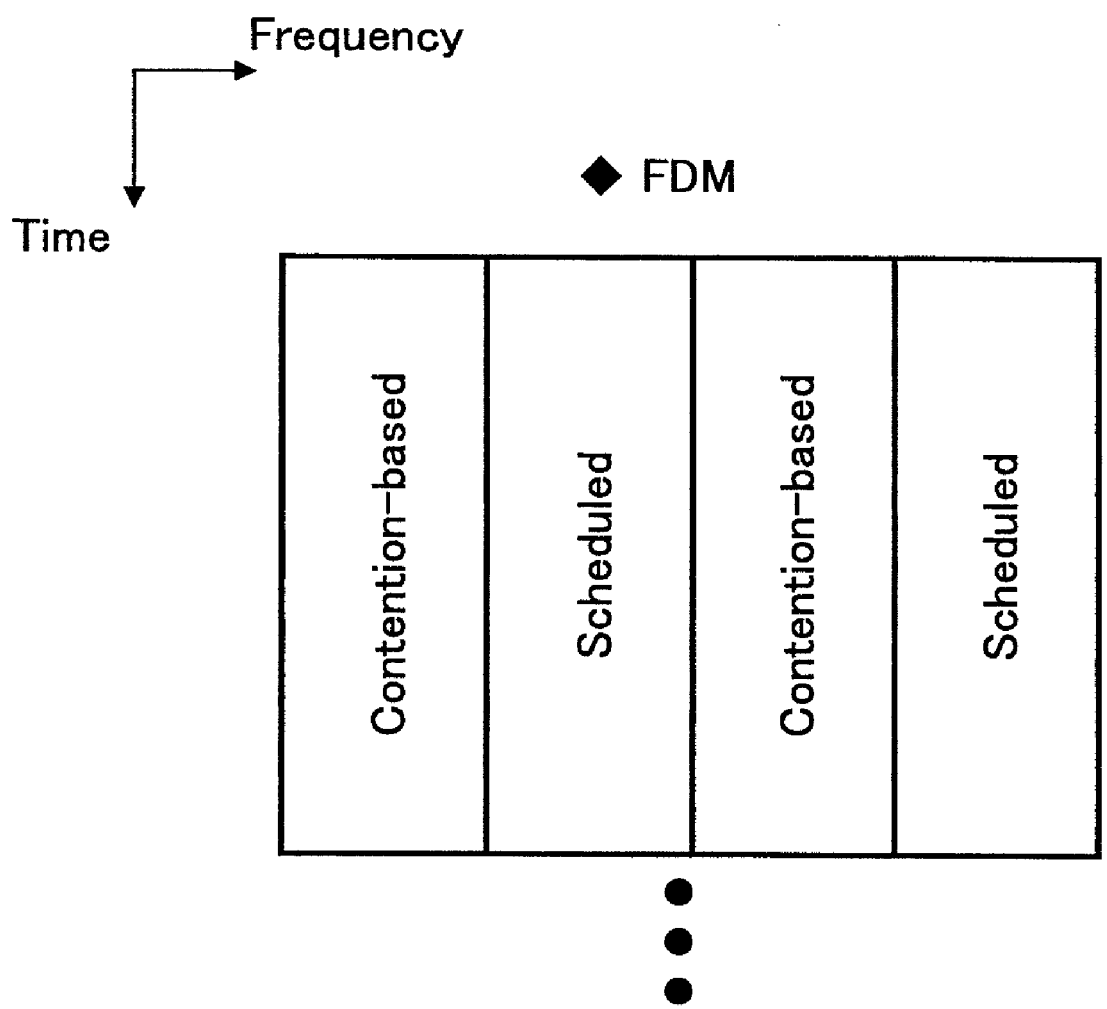
FIG. 20B is an explanatory view illustrating radio resource allocation in a transmission apparatus according to an example of the present invention.
Figure 20C:
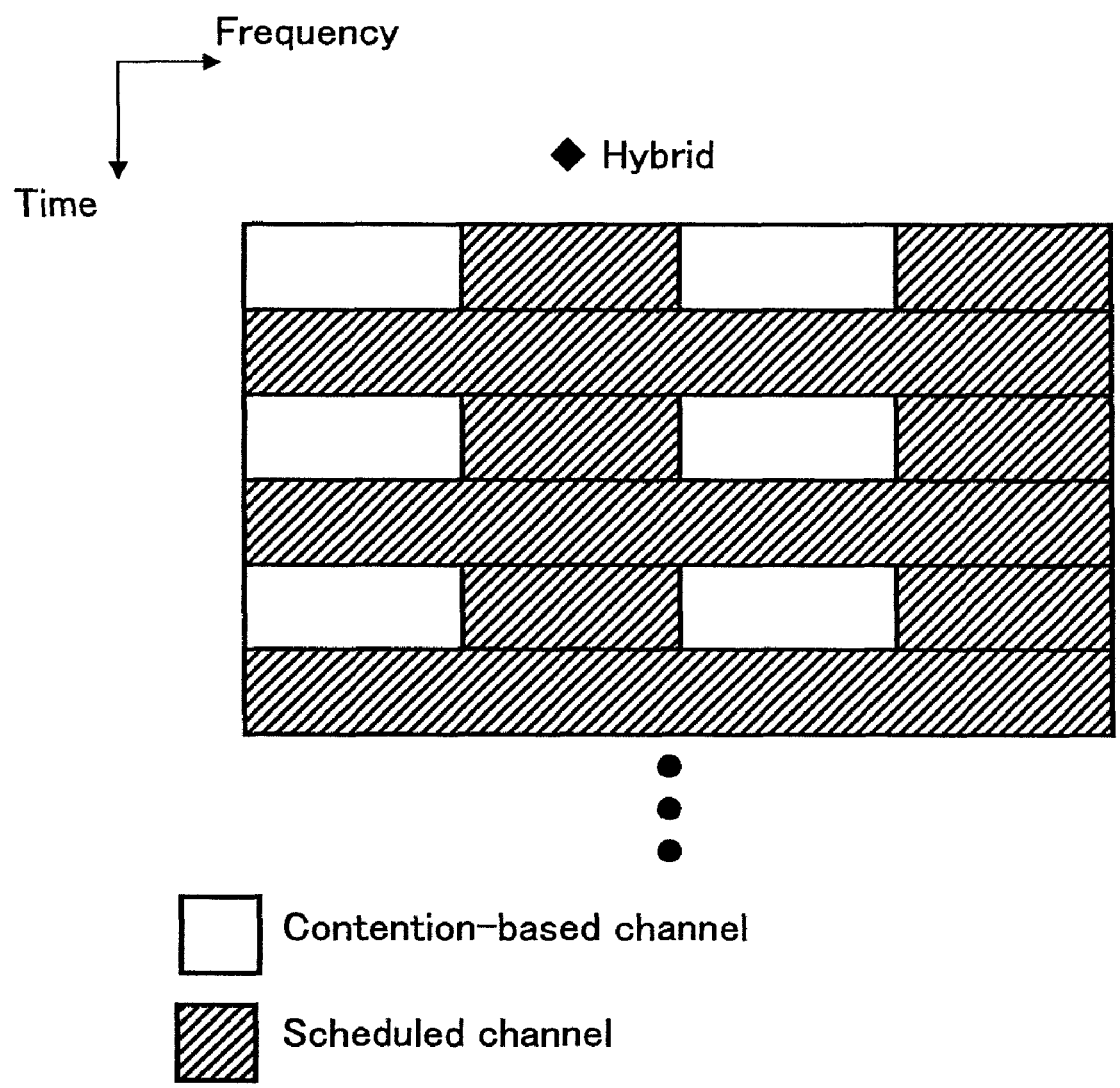
FIG. 20C is an explanatory view illustrating radio resource allocation in a transmission apparatus according to an example of the present invention.

In addition, the radio resource allocation control portion 122 may control so that the contention-based channel and the scheduling-base channel are frequency-multiplexed, for example, as shown in FIG. 20B.

Moreover, the radio resource allocation control portion 122 may control so that the contention-based channel and the scheduling-based channel are time-multiplexed and frequency-multiplexed in a mixed manner. In this case, the radio resource allocation control portion 122 may perform the adaptive TTI length control and set the TTI length longer, which reduces the ratio of the shared control channel occupied in the entire length of the TTI, thereby reducing the overhead of the shared control channel.

The frequency domain signal generation portion 114 shifts each single-carrier signal on the frequency axis so that the spectrum becomes comb-shaped. For example, when a process corresponding to CRF=4 is carried out, three zeros are arranged for every single-carrier signal or signal sequence. In addition, the frequency domain signal generation portion 114 allocates a radio resource to each physical channel according to the input radio resource allocation information and depending on the physical channel. When the single-carrier method is employed in such a manner, the CRF value and the offset value that shifts each single-carrier signal are changed, and the number of users is changed.

The frequency domain signal generation portion 114 performs mapping on each of the number Q of the parallel signal sequences, arranges the signal sequence directly to the frequency component, and allocates the radio resources to every mapped signal.

The IFFT portion 116 performs the fast Fourier transformation on the comb-shaped spectrum obtained by shifting each single-carrier signal on the frequency axis, and thus generates a wave-shaped transmission spectrum of the single-carrier method.

In addition, the IFFT portion 116 performs the fast inverse Fourier transformation on the multi-carrier signal composed of plural sub-carriers and performs the OFDM-method-based modulation, thereby generating a wave-shaped transmission spectrum of the multi-carrier method.

The guard interval (GI) addition portion 118 adds guard intervals to signals to be transmitted and prepares a symbol of either one of the OFDM method and the multi-carrier method. The guard intervals are obtained by replicating a portion of the top or end of a symbol to be transmitted.

The filter performs a band limitation on the transmission signal. The band-limited signal is transmitted.

Figure 21:
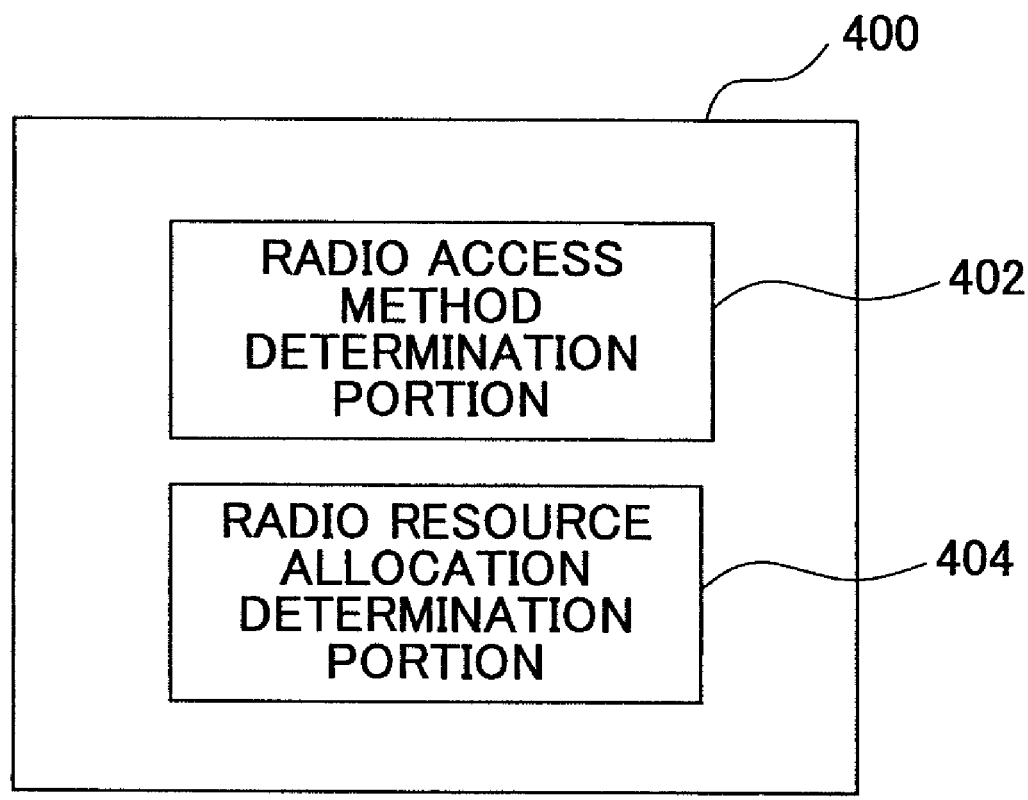
FIG. 21 is a partial block diagram illustrating a reception apparatus according to an example of the present invention.

Next, the reception apparatus 400 according to this example is explained referring to FIG. 21.

The reception apparatus 400 is provided in the base station, for example, and transmits the down-link channel.

The reception apparatus 400 according to this example is employed in the aforementioned cellular environment and local area environment.

The reception apparatus 400 according to this example is capable of receiving a signal transmitted in accordance with the signal carrier method and the multi-carrier method. In addition, the reception apparatus 400 includes the radio access method determination portion 402 and the radio resource allocation determination portion 404.

The radio access method determination portion 402 determines a radio access method that the mobile station 300 is allowed to use in accordance with the environment where the reception apparatus 400 is installed.

The radio access method determination portion 402 determines use of the single-carrier method, for example, when the reception apparatus 400 is installed in the cellular environment, and thus imparts to the mobile station 300 the use of single-carrier method. On the other hand, the radio access method determination portion 402 determines use of the multi-carrier method, for example, when the reception apparatus 400 is installed in the local area environment, and thus imparts to the mobile station 300 the use of the multi-carrier method.

For example, when the base station 200 is installed, the radio access method determination portion 402 determines the radio access method used in accordance with a cell configuration, for example, a cell radius, presence or absence of the neighboring cells, or the like. For example, the single-carrier method is used when the cell radius is large, whereas the multi-carrier method is used when the cell radius is small. The radio access method determination portion 402 imparts information indicating the determined access method to the mobile stations 300, as common control information for all the users.

In such a manner, the radio access method is determined when the base station is installed, which leads to a simplified configuration and control.

In addition, the access methods may be switched in accordance with a distance between each user and the base station, or a transmission power margin in each user.

For example, when the access methods are switched in accordance with the distance between each user and the base station 200, a path-loss may be used, for example, as a quantity corresponding to the distance between each user and the base station 200. In this case, the mobile station 300 measures the path-loss in the down-link using a reception power of the down-link pilot signal, and thus imparts information indicating the measured path-loss to the base station 200 over the up-link.

The radio access method determination portion 402 determines that a distance between the base station 200 and the mobile station 300 is large when the received path-loss value is greater than a predetermined threshold, determines use of single-carrier method, and thus imparts the information to the mobile stations 300.

The radio access method determination portion 402 determines that a distance between the base station 200 and the mobile station 300 is small when the received path-loss value is smaller than a predetermined threshold, determines use of single-carrier method, and imparts the information to the mobile stations 300 as common control information for each user.

In such a manner, the radio access method is controlled for each mobile station in accordance with the distance between the base station and the mobile stations.

In addition, when the access methods are switched in accordance with the transmission power margin in each user, "(the maximum allowance transmission power)−(the current transmission power)" may be used, for example, as an indicator of the margin in the transmission power of each user. In this case, the mobile stations impart a value indicating "the maximum allowance transmission power−the current transmission power" to the base station.

The radio access method determination portion 402 determines that the transmission power margin is small when the value indicating "the maximum allowance transmission power−the current transmission power" is smaller than a predetermined threshold, and determines use of the single-carrier method, which in turn is imparted to the mobile stations 300.

On the other hand, the radio access method determination portion 402 determines that the transmission power margin is large when the value indicating "(the maximum allowance transmission power)−(the current transmission power)" is greater than the predetermined threshold, and determines use of the multi-carrier method, which in turn is imparted to the mobile stations 300.

According to the above, the access methods are controlled in accordance with the performance of each mobile station.

In addition, the mobile stations 300 may transmit the information indicating the maximum allowance transmission power and the information indicating the current transmission power. Then, the radio access method determination portion 402 may calculate "the maximum allowance transmission power−the current transmission power" and control the radio access methods in accordance with the calculated value.

The radio resource allocation determination portion 404 determines allocation of the radio resource to each physical channel, which in turn is imparted to the mobile station 300.

In addition, the radio resource allocation determination portion 404 performs scheduling on each user, and thus reports the results to the mobile station 300.

The radio resource allocation determination portion 404 may allocate a radio resource for a certain time based on a time-scale of the transmission time interval (TTI) length of plural frequency blocks when allocating the time and frequency block to each physical channel.

In addition, the radio resource allocation determination portion 404 performs scheduling for the shared data channel.

The radio resource allocation determination portion 404 performs scheduling in the time domain in the frequency division multiplexing access, and generates control information, as shown in FIG. 13. In this case, plural frequency blocks are allocated to a fast data rate user, which allows each user to use only the frequency blocks allocated in advance. Therefore, the transmission apparatus 100 does not have to receive a pilot channel of other frequency blocks transmitted so as to allow the reception apparatus 400 to measure the channel quality indicator (CQI).

An optimal bandwidth of the frequency block is 1.25 to 5 MHz, for example. By widening the bandwidth of the frequency block, the multi user diversity effect can be enhanced in the frequency block.

When the single-carrier transmission is performed, the bandwidth allocated to each user may be variable in accordance with the data rate.

In addition, when a traffic size of a certain user is larger than a payload size of the frequency block, one frequency block may be exclusively used by one user.

Additionally, the bandwidth may be changed in accordance with the channel conditions, as shown in FIG. 17.

The narrower FDMA (localized FDMA) which is arranged over the frequency block may be used by plural low data rate users. Namely, the spectrum utilized by each user is arranged over the block as described with reference to FIGS. 2A and 2B. In addition, the comb-shaped frequency spectrum utilized by each user may be distributed over the entire band. Other users use the comb-shaped spectra. The localized FDMA may be mainly used for the shared data channel.

In addition, the radio resource allocation determination portion 404 may perform scheduling in the time domain and the frequency domain, and generate control information.

In this case, the pilot channel to be transmitted in order to measure the channel quality indicator (CQI) is transmitted over all the frequency blocks, namely, over all the channel bandwidths.

In addition, when a traffic size of a certain user is larger than a payload size of the frequency block, one frequency block may be exclusively used by one user.

When there are plural low data rate users, one frequency block is used by plural users. In this case, orthogonal frequency spectra, namely, the narrower FDMA (localized FDMA) which is arranged over the frequency block, or comb-shaped spectrum (distributed FDMA) is applied to the same frequency block. Namely, as described with reference to FIGS. 2A and 2B, the spectra utilized by each user are arranged over the block in the frequency block. In addition, the frequency spectrum utilized by each user may be distributed and arranged in a shape of comb over the frequency block, which reduces multi user interference.

An optimal bandwidth of the frequency block is 0.3125 to 1.25 MHz, for example. By narrowing the bandwidth of the frequency block and performing scheduling of the channel in the frequency domain, the multi user diversity effect can be enhanced in the frequency block.

When the single-carrier transmission is performed, the bandwidth allocated to each user may be variable in accordance with the data rate.

The narrower FDMA (localized FDMA) which is arranged over the frequency block may be used by plural low data rate users.

In this case, the frequency block may be grouped, which reduces the overhead of the pilot channel.

Moreover, one band, for example, a frequency block may be allocated to plural users, as shown in FIG. 14. In this case, frequency multiplexing using the comb-shaped frequency spectrum is used. Alternatively, plural users are multiplexed into one frame in a manner described as follows. Chip information by a certain unit is time-divisionally stored in TTI. This chip information is used as a unit so as to change the frequency used for the transmission. As stated, plural users are allocated to a certain band and transmission is performed using the frequency hopping. By allocating plural users to a certain frequency band, the interference from other cells (sectors) can be averaged out. Therefore, fluctuations of the interference from other cells (sectors) can be reduced in a time-wise manner compared to a situation where users are changed in a certain frequency band so as to perform transmission.

Referring to FIG. 19, the frequency block grouping is explained.

When the frequency block grouping is not performed, the narrower FDMA (localized FDMA) which is narrowly arranged over the frequency block, or comb-shaped spectra is used by plural low data rate users.

As the frequency block grouping, there are a distributed grouping where discrete frequency blocks form a group and a localized grouping where consecutive frequency blocks form a grouped.

As stated above, the overhead of the pilot channel for use in CQI measurement can be reduced by grouping the frequency blocks in advance so as to perform scheduling in the frequency domain.

For example, the radio resource allocation determination portion 404 determines the time and frequency allocated for the contention-based channel, for example, a random access channel or a reserve packet channel in accordance with a channel load or the like, and thus imparts the corresponding allocation to each mobile station through the down-link broadcast channel. For example, the radio resource allocation determination portion 404 determines the allocation of the radio resource so that at least one portion of the allocated frequency band is utilized, when the signal to be transmitted is the contention-based channel.

In addition, the radio resource allocation determination portion 404 performs scheduling depending on the channel conditions and determines the time and frequency allocated to a scheduled channel, for example, the shared data channel or the like, which in turn is imparted to each mobile station through the down-link broadcast channel. Traffic data and layer 3 control message are transmitted through the shared data channel.

For example, the radio resource allocation determination portion 404 groups channels in accordance with the channel conditions, for example, the CQI measurement result so as to perform allocation, which can reduce the overhead of the pilot channel.

In addition, when communications are made through the shared data channel, an H-ARQ (hybrid automatic repeat request) may be employed.

In addition, the radio resource allocation determination portion 404 performs scheduling, and determines the time and frequency allocated to the shared control channel, which in turn are imparted to each mobile station through the down-link broadcast channel.

Figure 22:
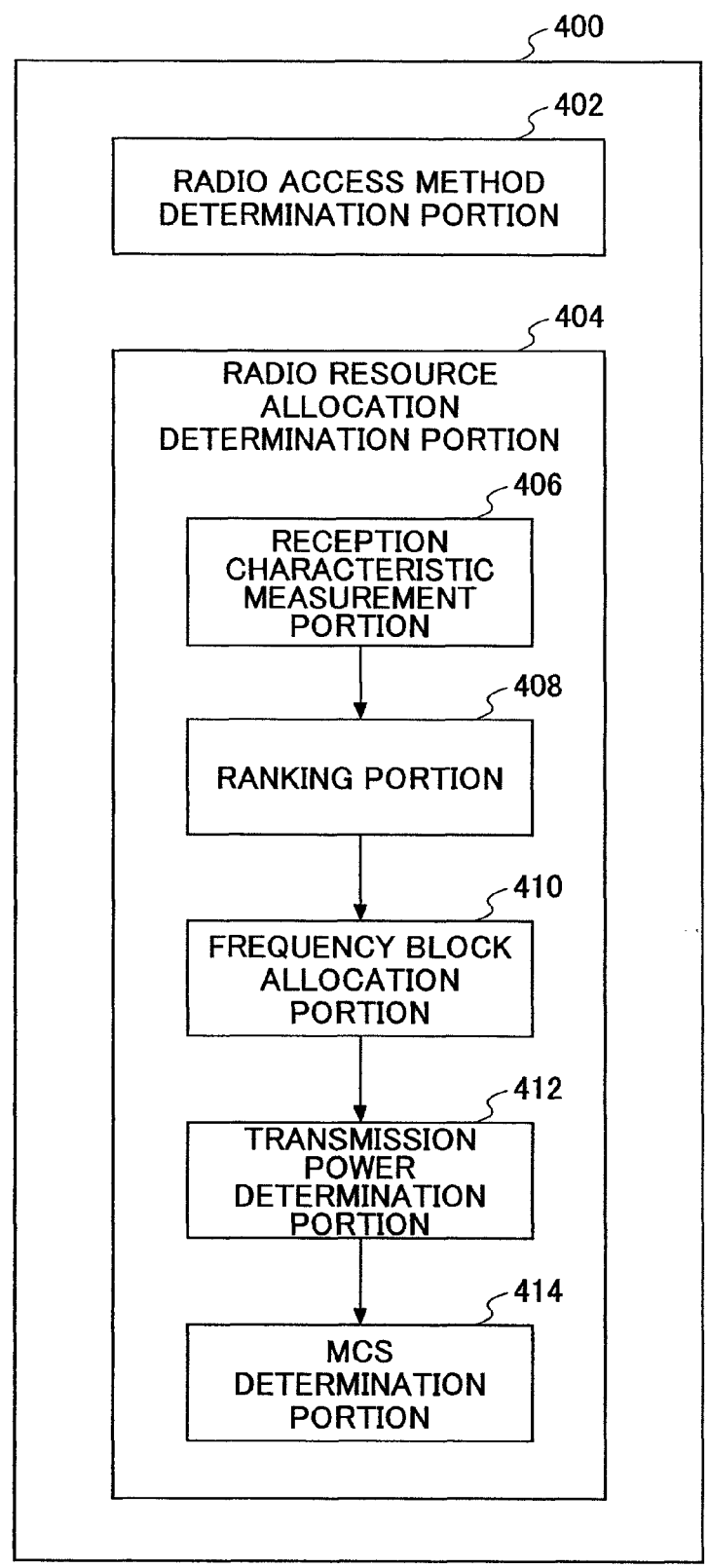
FIG. 22 is a partial block diagram illustrating a reception apparatus according to an example of the present invention.

Next, referring to FIG. 22, a configuration of the receiver that changes bands in accordance with the channel conditions so as to perform allocation is explained.

A receiver 400 has the same configuration as the reception apparatus explained with reference to FIG. 21.

The radio resource allocation determination portion 404 of the receiver 400 comprises a reception characteristic measurement portion 406, a ranking portion 408 connected to the reception characteristic measurement portion 406, a frequency block allocation portion 410 connected to the ranking portion 408, a reception power determination portion 412 connected to the frequency block allocation portion 410, and an MCS determination portion 414 connected to the reception power determination portion 412.

The reception characteristic measurement portion 406 measures a reception characteristic, for example, the received SINR in each frequency block, for all users. All the users transmit pilot signals in the entire band. The reception characteristic measurement portion 406 measures the reception conditions, for example, the received SINR in each band. In addition, when the users transmit the pilot signals using a part of the frequency band in the entire frequency band (system bandwidth), the received SINR at each allocation unit in the frequency band determined in advance, for example, at each frequency block is measured, as shown in FIG. 23A. Namely, the reception characteristic measurement portion 406 measures the reception characteristics of the transmitted pilot signals using the allocation unit of the frequency band determined in advance as a measurement unit.

When the users transmit the pilot signals using a part of frequency band in the entire frequency band, the reception characteristic measurement portion 406 may measure the reception conditions in the part of the frequency band, as shown in FIG. 23B. Namely, the reception characteristic measurement portion 406 measures the reception characteristics of the transmitted pilot signals using the requested allocation unit, for example, the pilot signal transmission frequency as a measurement unit.

The ranking portion 408 determines priorities in accordance with the measured reception characteristic and ranks the priorities in a predetermined order, for example, in order of higher received SINR, so as to generate a ranking table. In addition, the ranking portion 408 may generate the ranking table in accordance with at least one of a reception condition of the pilot signal transmitted from each mobile station, the reception condition being measured in the base station, (in other words, a reception power measured in the reception apparatus about the channel condition measurement signal), a waiting time and a type of data to be transmitted from each mobile station, and the maximum transmission power of each mobile station. As a result, a mobile station to which a frequency band is to be allocated is determined for each frequency allocation unit.

The frequency block allocation portion 410 allocates a frequency block in accordance with the generated ranking table. For example, the frequency block allocation portion 410 performs tentative allocation of the frequency block to be allocated to a high priority user. In addition, the frequency block allocation portion 410 allocates the tentatively allocated block and the adjacent frequency blocks to the user of the highest priority. Moreover, the frequency block allocation portion 410 ranks the priorities in higher order, excluding the priorities corresponding to the user and the frequency blocks which have been already allocated, so as to re-rank the table and repeats the same procedures. In such a manner, continuous frequency bands are allocated to one apparatus in accordance with the reception characteristics for each transmission apparatus.

Figure 24A:
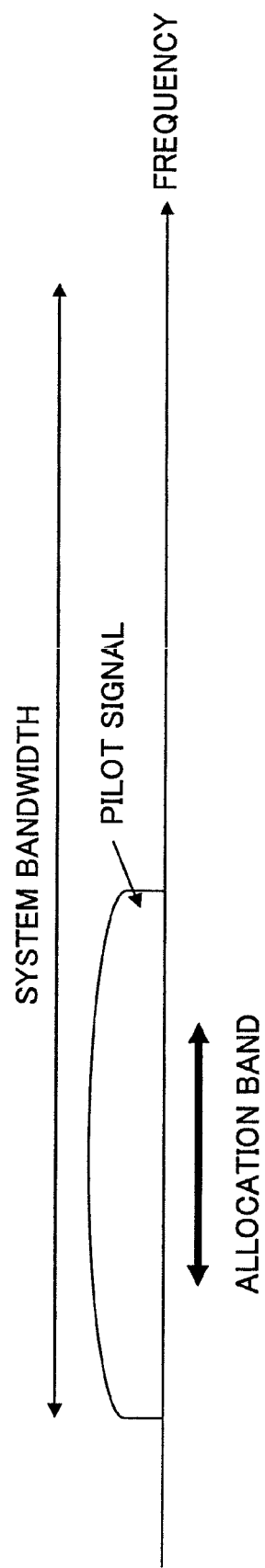
FIG. 24A is an explanatory view illustrating frequency allocation for data channel transmission to a mobile station, in a reception apparatus according to an example of the present invention.
Figure 24B:
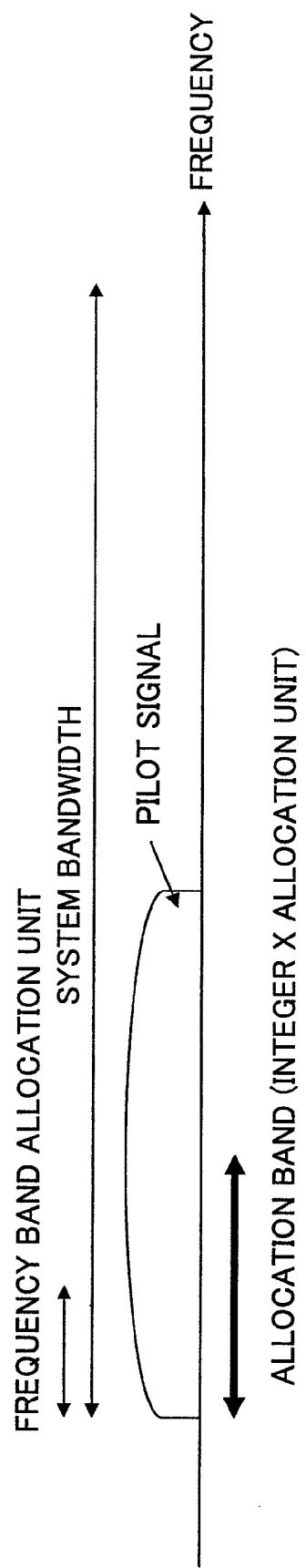
FIG. 24B is an explanatory view illustrating frequency allocation for data channel transmission to a mobile station, in a reception apparatus according to an example of the present invention.

In this case, the frequency block allocation portion 410 allocates a frequency band within a range of the transmission frequency of the pilot signal, as shown in FIG. 24A. Moreover, the frequency block allocation portion 410 may allocate a frequency band per allocation unit of, for example, an integral multiple of frequency bands, as shown in FIG. 24B.

Furthermore, when the mobile station transmits the pilot signal for every band allocation unit based on frequency hopping, the frequency block allocation portion 410 may perform scheduling on the band in which the pilot signal is transmitted, and allocate the data channels, as shown in FIG. 25A. In addition, the band in which the pilot signal is transmitted is assigned so as to deviate with time. In this case, the frequency block allocation portion 410 determines the data channel for each band where the pilot signal has been transmitted. In this case, the scheduling cycle becomes longer.

For example, at time t, all the mobile stations, for example, MS1, MS2, MS3, and MS4 transmit the pilot signals in the same band. The frequency block allocation portion 410 performs scheduling among the mobile stations that transmit the pilot signals in the same band. In this case, the scheduling is performed among the mobile stations MS1, MS2, MS3, and MS4, and the data channel is allocated to the mobile station MS3.

At time (t+1), the mobile stations MS1, MS2, MS3, and MS4 transmit the pilot signals in bands different from the bands in which the pilot signals have been transmitted at time t. For example, the mobile stations MS1, MS2, MS3, and MS4 transmit the pilot signals in the band adjacent to the bands in which the pilot signals have been transmitted at time t. The frequency block allocation portion 410 performs scheduling on the mobile stations that transmit the pilot signals in the same band. In this case, the scheduling is performed among the mobile stations MS1, MS2, MS3, and MS4, and the data channel is allocated to the mobile station MS2.

At time (t+2), the mobile stations MS1, MS2, MS3, and MS4 transmit the pilot signals in bands different from the bands in which the pilot signals have been transmitted at time (T+1). For example, the mobile stations MS1, MS2, MS3, and MS4 transmit the pilot signals in the bands adjacent to the bands in which the pilot signals have been transmitted at time (t+1). The frequency block allocation portion 410 performs scheduling on the mobile stations that transmit the pilot signals in the same band. In this case, the scheduling is performed on the mobile stations MS1, MS2, MS3, and MS4, and the data channel is allocated to the mobile station MS2. Then, the data channel allocation is repeated.

By the way, when each mobile station independently transmits the pilot signal based on frequency hopping, the frequency block allocation portion 410 may perform scheduling for every frequency allocation unit on the mobile stations that transmit the pilot signals in the bands, so as to allocate the data channel. For example, a band adjacent to the band that has been already allocated is allocated to a certain mobile station.

For example, at time t, the mobile stations, for example, MS3, MS4, MS5, and MS6 transmit the pilot signals in different bands; the mobile station MS1 transmits the pilot signal in the bands in which the mobile stations MS3 and MS4 transmit the pilot signals; and the mobile station MS2 transmits the pilot signal in the bands in which the mobile stations MS5 and MS6 transmit the pilot signals.

The frequency block allocation portion 410 performs scheduling on the mobile stations that transmit the pilot signals in corresponding bands. The frequency block allocation portion 410 performs scheduling for each band-allocation unit. For example, the frequency block allocation portion 410 performs scheduling on the mobile stations MS1 and MS3 and allocates the data channel to the mobile station MS1; performs scheduling on the mobile stations MS1 and MS2 and allocates the data channel to the mobile station MS4; performs scheduling on the mobile stations MS2 and MS5 and allocates the data channel to the mobile station MS5; and performs scheduling on the mobile stations MS2 and MS6 and allocates the data channel to the mobile station MS2.

At time (t+1), the mobile stations, for example, MS3, MS4, MS5, and MS6 transmit the pilot signals in different bands. For example, the pilot signals are transmitted in bands adjacent to the bands where the pilot signals were transmitted at time t. In addition, the mobile stations, for example, MS1 and MS2 transmit the pilot signals in different bands. For example, the pilot signals are transmitted in bands adjacent to the bands in which the pilot signals have been transmitted at time t.

The frequency block allocation portion 410 performs scheduling on the mobile stations that transmit the pilot signals in corresponding bands. The frequency block allocation portion 410 performs scheduling for each band-allocation unit. For example, the frequency block allocation portion 410 performs scheduling on the mobile stations MS2 and MS6 and allocates the data channel to the mobile station MS2; performs scheduling on the mobile stations MS2 and MS3 and allocates the data channel to the mobile station MS2; performs scheduling on the mobile stations MS1 and MS4 and allocates the data channel to the mobile station MS4; and performs scheduling on the mobile stations MS1 and MS5 and allocates the data channel to the mobile station MS5.

At time (t+2), the mobile stations, for example, MS3, MS4, MS5, and MS6 transmit the pilot signals in different bands. For example, the pilot signals are transmitted in bands adjacent to the bands in which the pilot signals have been transmitted at time (t+1). In addition, the mobile stations M1 and M2 transmit the pilot signals in different bands. For example, the pilot signals are transmitted in bands adjacent to the bands where the pilot signals have been transmitted at time (t+1).

The frequency block allocation portion 410 performs scheduling on the mobile stations that transmit the pilot signals in each band. The frequency block allocation portion 410 performs scheduling for each band-allocation unit. For example, the frequency block allocation portion 410 performs scheduling on the mobile stations MS1 and MS5 and allocates the data channel to the mobile station MS5; performs scheduling on the mobile stations MS1 and MS6 and allocates the data channel to the mobile station MS6; performs scheduling on the mobile stations MS2 and MS3 and allocates the data channel to the mobile station MS2; and performs scheduling on the mobile stations MS2 and MS4 and allocates the data channel to the mobile station MS4.

Figure 25C:
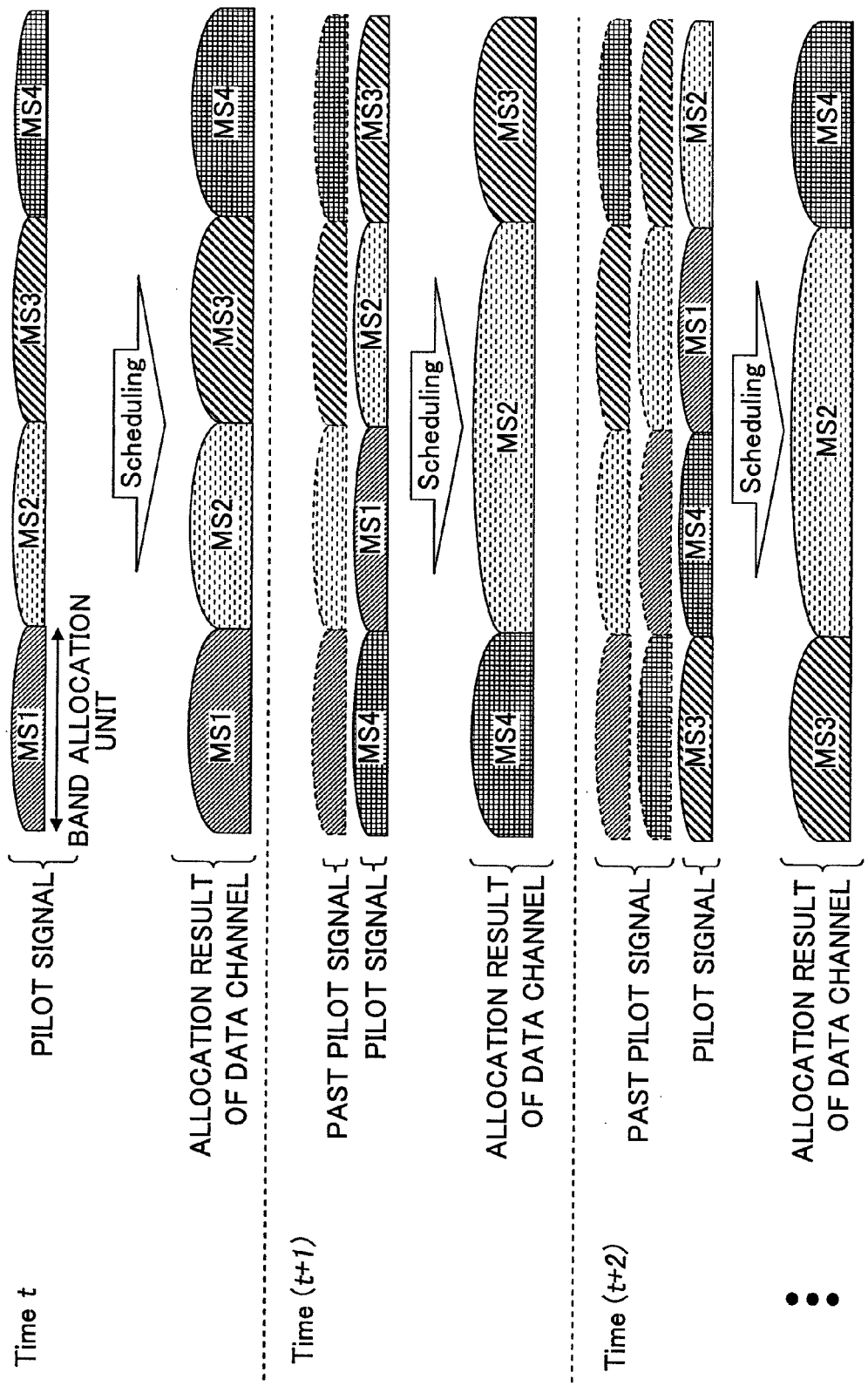
FIG. 25C is an explanatory view illustrating frequency allocation for data channel transmission to a mobile station, in a reception apparatus according to an example of the present invention.

Furthermore, when each mobile station independently transmits the pilot signal based on frequency hopping, the frequency block allocation portion 410 may allocate the data channel in each band-allocation unit using the past reception quality as the reception characteristic (reception quality) in the case of the band in which the pilot signals are not transmitted, shown in FIG. 25C. In this case, there may be plural mobile stations that transmit the pilot signals in the same frequency band.

For example, at time t, the mobile stations, for example, MS1, MS2, MS3, and MS4 transmit the pilot signals in different bands.

The frequency block allocation portion 410 performs scheduling on the mobile stations that transmit the pilot signals in corresponding band. The frequency block allocation portion 410 performs scheduling for each band-allocation unit.

At time (t+1), the mobile stations, for example, MS1, MS2, MS3, and MS4 transmit the pilot signals in different bands. For example, the pilot signals are transmitted in bands adjacent to the bands in which the pilot signals have been transmitted at time t.

The frequency block allocation portion 410 performs scheduling among the mobile stations that transmit the pilot signals in corresponding bands. The frequency block allocation portion 410 performs scheduling for each band-allocation unit using the past reception quality as the reception characteristic (reception quality) in the case of the band in which the pilot signals are not transmitted.

At time (t+2), the mobile stations, for example, MS1, MS2, MS3, and MS4 transmit the pilot signals in different bands. For example, the pilot signals are transmitted in bands adjacent to the band in which the pilot signals have been transmitted at time (t+1).

The frequency block allocation portion 410 performs scheduling on the mobile stations that transmit the pilot signals in corresponding bands. The frequency block allocation portion 410 performs scheduling for each band-allocation unit using the past reception quality as the reception characteristic (reception quality) in the case of the band in which the pilot signals are not transmitted.

When it is assumed that there are small fluctuations in the channel conditions and the band in which the pilot signal is transmitted is not changed, if the channel conditions of the band are impaired, the reception characteristic of the band remains impaired. Therefore, by changing the bands in which the pilot signals are transmitted, the reception characteristic can be improved.

Furthermore, when the data channel is allocated to the frequency allocation band, the band that has once been allocated is not changed as long as the reception conditions change to a certain degree, as shown FIG. 26. Namely, once the frequency block allocation portion 410 allocates a frequency band, the frequency block allocation portion 410 continues to allocate continuously the frequency band until the reception power of the channel conditions measurement signal in the frequency band in the reception apparatus exceeds a threshold determined in advance. For example, when the channel conditions in the allocated band change to exceed the predetermined threshold, the band is released and reallocation is performed taking account of the channel conditions of each mobile station. With this, the interference from other cells (sectors) can be reduced. The receiver 400 changes modulation methods depending on the reception conditions before applying AMC. Changes in the conditions after the modulation method or the like is determined impair normal reception. Namely, the reception conditions in the up-link are interfered with by other cells (sectors), especially other close-by users. For example, when the mobile station $A300_1$ is transmitting while the mobile station $D300_4$ that exists in the adjacent sector $250_3$ in FIG. 15 is transmitting, the mobile station $A300_1$ is influenced by the interference from the mobile station $D300_4$.

When the mobile station $A300_1$ is transmitting while the mobile station $B300_2$ that exists in the adjacent sector $250_3$ is transmitting, the mobile station $A300_1$ is interfered by the mobile station $B300_2$. The mobile station $A300_1$ determines a modulation method depending on a ratio of the requested radiowaves over the interference radiowaves. When the frequency band allocated to the mobile station $B300_2$ is switched to the mobile station $C300_4$, the quantity of the interference is increased. While the mobile station $A300_1$ determines the MCS taking account of the interference signals from the mobile station $B300_2$, if the frequency allocation is suddenly performed so that the frequency band is switched to the $C300_4$, the quantity of the interference from the adjacent sectors is increased, which makes it impossible for the reception station to perform reception by the firstly determined modulation method.

In order to avoid such situation, the band that has once been allocated cannot be changed as long as changes in the reception conditions do not become a certain level or more. When the reception conditions become a certain level or more, for example, a certain threshold, the band is released and reallocation is performed in accordance with the channel conditions of each mobile station.

Figure 27A:
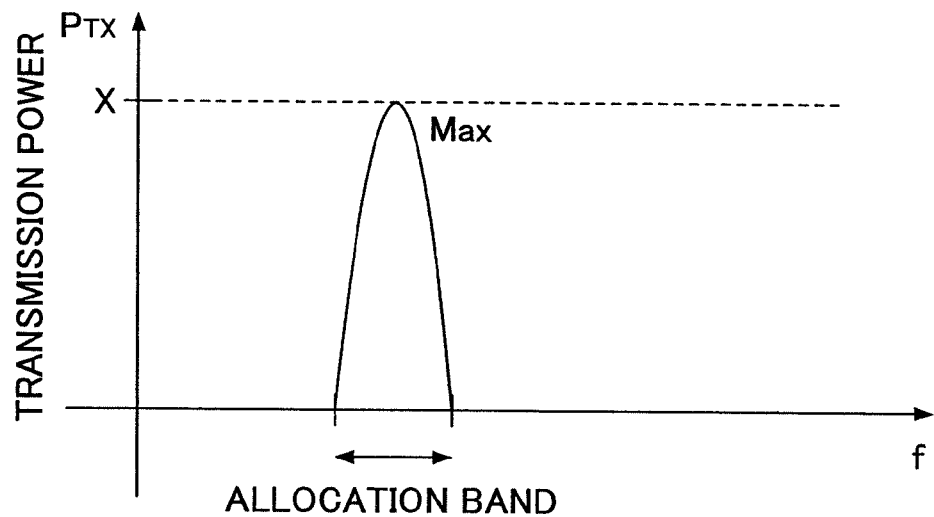
FIG. 27A is an explanatory view illustrating transmission power determination.
Figure 27B:
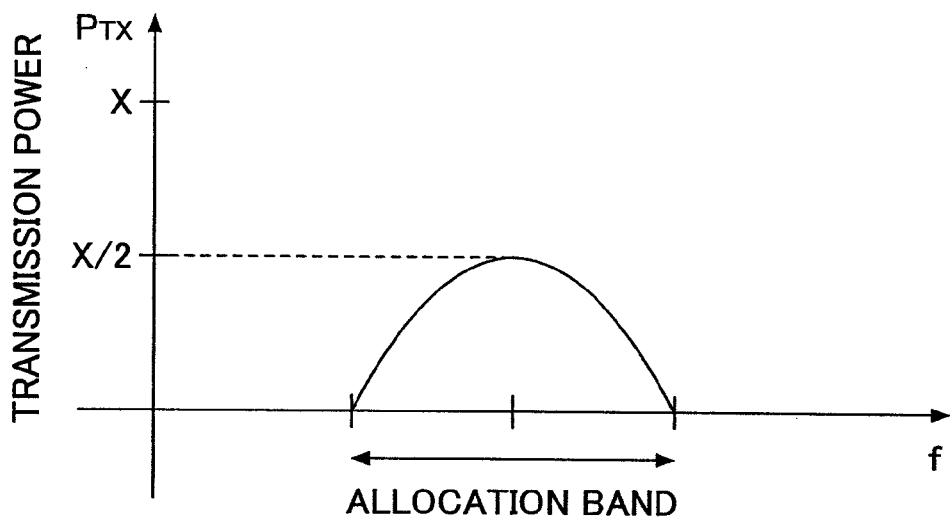
FIG. 27B is an explanatory view illustrating transmission power determination.

The reception power determination portion 412 assigns the up-link transmission power to the mobile station to which the frequency band is allocated. In this case, the up-link transmission power is assigned to the mobile station (transmitter) to which the frequency band is allocated in accordance with the allocated frequency bandwidth. For example, the maximum power with which the mobile station (transmitter) can transmit has been determined. There is described in the following a situation where the transmission power for the allocated band is, for example, X as shown in FIG. 27A. If the allocated band is broadened, for example, doubled, the transmission power is halved to be X/2, as shown in FIG. 27B. The transmission power is determined in accordance with the allocated bandwidth in such a manner. The reception power determination portion 412 transmits the scheduling result and information indicating the transmission power to the transmitter. This set of information is input to the radio resource allocation control portion 122.

For example, when the transmission power for a certain allocation band has a maximum value at X, if the allocated band is broadened, for example, doubled, the peak of the transmission power is halved to be X/2.

The reception power determination portion 412 transmits the scheduling result and information indicating the transmission power to the transmitter. This set of information is input to the radio resource allocation control portion 122. As a result, the mobile station performs the up-link transmission with the maximum transmission power in the allocated frequency band.

By converging the power in a certain band as stated above, the power of the requested radiowaves can be increased. Especially, when the power is converged in a certain band so as to perform transmission by a mobile station existing far away from the base station (reception apparatus), the base station can receive a signal with a higher power, thereby improving the reception quality.

The reception power determination portion 412 may measure the interference power in the band to be allocated and assign the transmission power using the interference power so that the ratio of the requested radiowaves power over the interference power becomes a predetermined value.

In this case, the transmission power that yields the intended ratio of the requested radiowaves power over the interference power may become the transmission power or more which the mobile station can output. In this case, the transmission power which the mobile station can output is assigned. On the other hand, when the transmission power that yields the intended ratio of the requested radiowaves power over the interference power is lower than or equal to the transmission power with which the mobile station can transmit, the transmission power that yields the intended ratio of the requested radiowaves power over the interference power is assigned.

In such a manner, the transmission power can be controlled in accordance with the reception quality in the base station.

In addition, the mobile station performs the up-link signal transmission with the maximum transmission power in the allocated frequency band. The base station can perform reception of a higher power signal, thereby improving the reception quality.

Figure 28A:
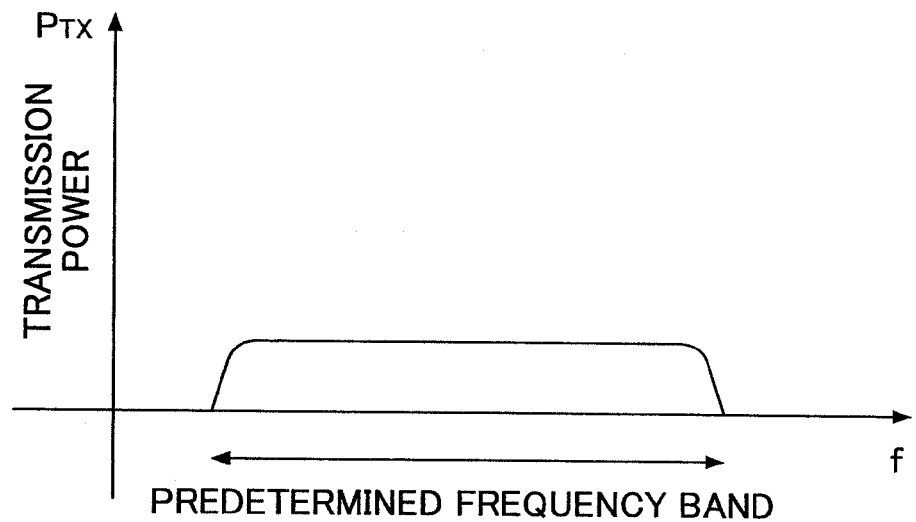
FIG. 28A is an explanatory view illustrating transmission power determination.
Figure 28B:
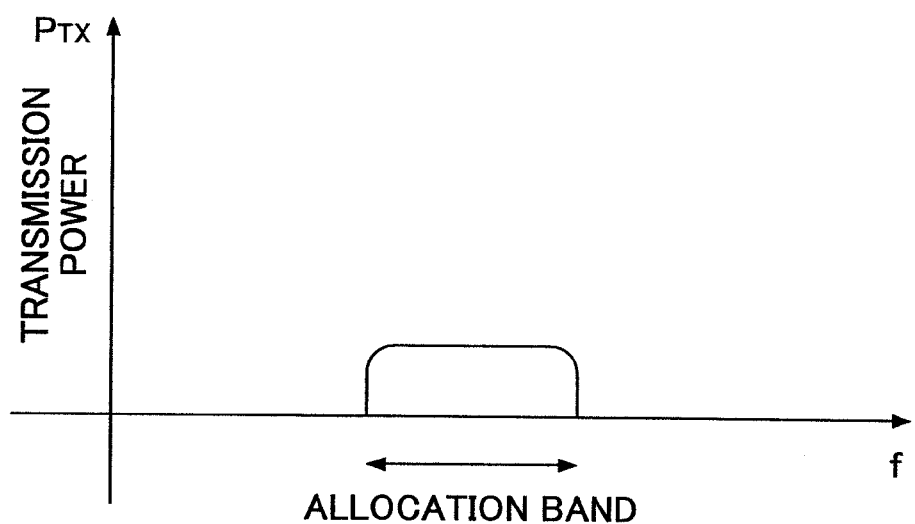
FIG. 28B is an explanatory view illustrating transmission power determination.

In addition, regarding the transmission power, the mobile station may perform the up-link transmission with a constant transmission power density regardless of the allocated frequency bandwidth. For example, the radio resource allocation control portion 122 performs transmission with the transmission power in accordance with a predetermined frequency bandwidth, even when a frequency band narrower than the predetermined frequency band is allocated, as shown in FIGS. 28A and 28B. Since transmission is performed at a constant transmission power per band as stated above, the interference with other cells (sectors) can be less influential.

The transmission power may be changed depending on the position of the mobile station. Namely, it may be determined whether the up-link transmission is performed with the maximum transmission power in the allocated frequency band, or with a constant transmission power density regardless of the allocated frequency band. Then, the transmission power may be determined by the determined method and information indicating the transmission power may be imparted.

The base station may assign a modulation method and an error correction code rate in the up-link transmission to the mobile station to which the frequency band is allocated.

The modulation method and the error correction code rate may be determined in accordance with the ratio of the requested radiowaves power over the interference power in the MCS determination portion 414 of the base station. Here, an instantaneous value or an average value of the requested radiowaves power and the interference may be used. For example, when the transmission apparatus to which the frequency band is allocated transmits a signal in accordance with the assigned transmission power and the reception power of the channel conditions measurement signal, either the instantaneous value or the average value is used in accordance with the reception power and the interference power in the reception apparatus that receives the signal that the transmission apparatus transmits, the reception power and the interference power being estimated in the allocated frequency. Then, the modulation method and the error correction code rate are determined in accordance with the ratio of the reception power over the interference power.

There is described a situation where the mobile station performs the up-link transmission with the maximum transmission power in the allocated frequency band, for example. The interference power fluctuates largely in the up-link. When the modulation method is determined in accordance with the instantaneous reception power, the interference power level fluctuates depending on the time required to start transmitting. Therefore, when such transmission is performed, average values of the reception power, the requested radiowaves, and the interference power are used.

Then, there is described a situation where the up-link transmission is performed with a constant transmission density regardless of the allocated frequency bandwidth. When control is performed under such a situation where the interference power fluctuations are small, the instantaneous values of the reception power, the requested radiowaves, and the interference power are used.

When the MCS determination portion 414 assigns the MCS when the mobile station allowed to perform transmission transmits the data channel, the MCS determination portion 414 may assign the MCS in accordance with the reception quality of the pilot signal measured for each frequency allocation unit in the allocated band when the received SINR is measured for each frequency allocation unit by the reception characteristic measurement portion 406, as shown in FIG. 29. For example, the received SINR measured for each allocation unit is used and thus the MCS is assigned in accordance with at least one of the average SINR, the highest SINR, and the lowest SINR.

Figure 30:
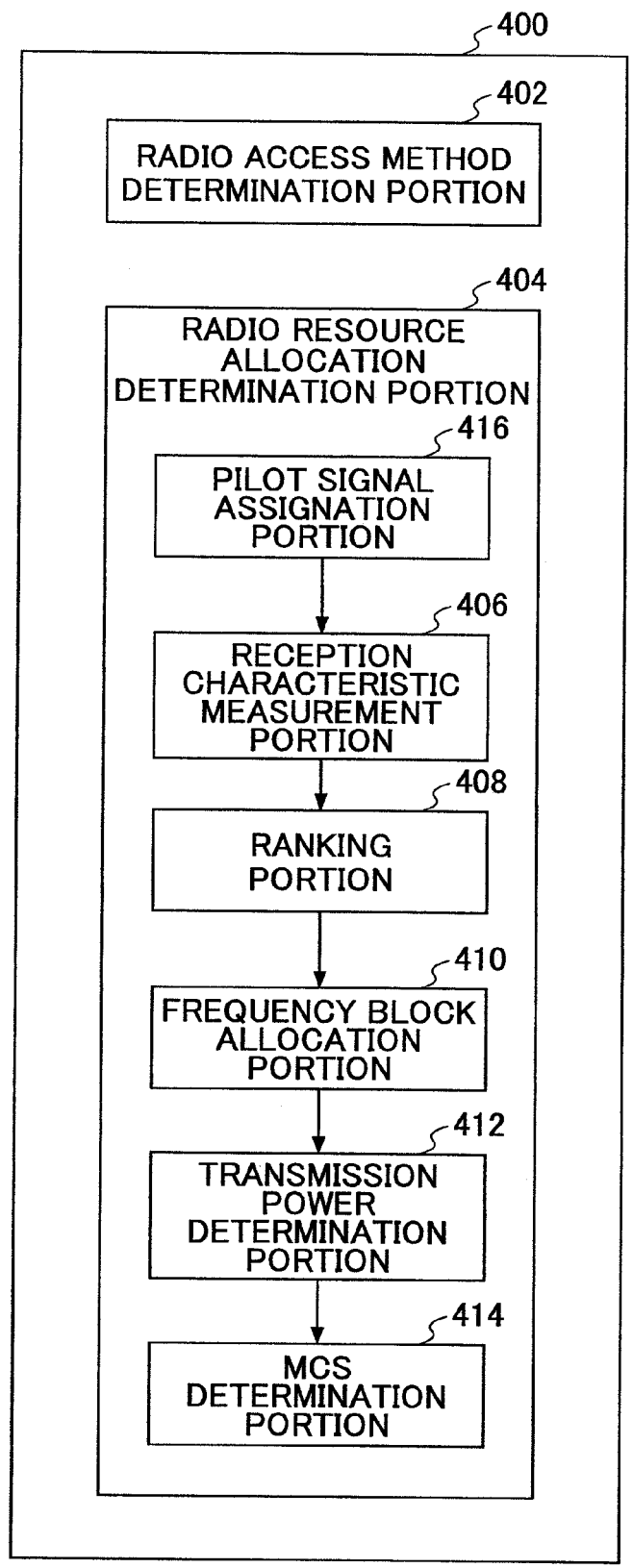
FIG. 30 is a partial block diagram illustrating a reception apparatus according to an example of the present invention.
Figure 31:
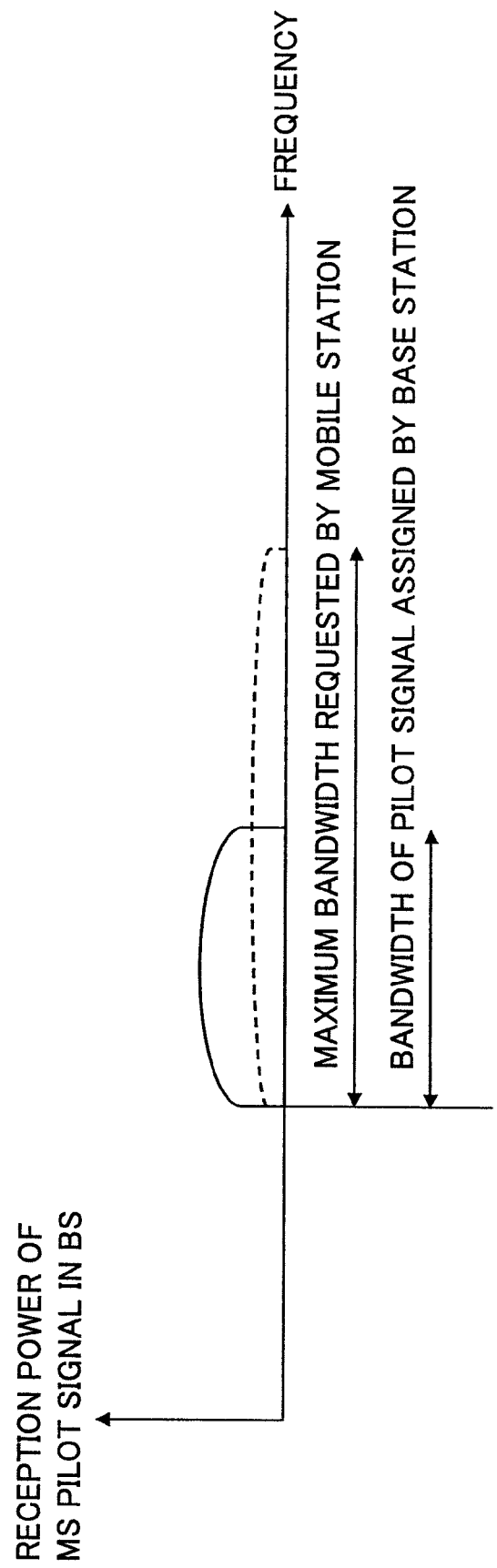
FIG. 31 is an explanatory view illustrating assignment of a bandwidth and center frequency of a pilot signal of each mobile station, in a reception apparatus according to an example of the present invention.

In addition, a receiver that performs allocation so as to change a bandwidth in accordance with the channel conditions may be configured as shown in FIG. 30.

A receiver 400 has substantially the same configuration as the receiver explained with reference to FIG. 21 and is different from the receiver explained with reference to FIG. 2 in that a pilot signal assignation portion 416 connected to the reception characteristic measurement portion 406 is provided.

The pilot signal assignation portion 416 receives at least one of information indicating the requested (maximum) transmission frequency bandwidth of the data channel transmitted from a mobile station, information indicating the quantity of data to be transmitted, and information indicating data rate. In addition, the pilot signal assignation portion 416 receives the information indicating the requested (maximum) transmission bandwidth of the pilot signal from the mobile station. The pilot signal assignation portion 416 assigns a transmission bandwidth of the pilot signal to the mobile station. For example, the pilot signal assignation portion 416 determines the transmission bandwidth and center frequency of the pilot signal in accordance with the information indicating the requested (maximum) transmission bandwidth of the pilot signal for each mobile station, and transmits information indicating the determined transmission bandwidth and center frequency of the pilot signal to the corresponding mobile stations. In addition, the pilot signal assignation portion 416 may impart information indicating the determined transmission bandwidth and center frequency of the pilot signal to the corresponding transmission apparatuses by transmitting the frequency block ID. In this case, the pilot signal assignation portion 416 may assign plural frequency blocks.

For example, the pilot signal assignation portion 416 assigns a narrower bandwidth than the maximum bandwidth requested by the mobile station (requested (maximum) bandwidth) when determining that the reception quality of the pilot signal is insufficient even when the mobile station transmits the pilot signal in the requested (maximum) bandwidth, because of a large distance to the base station. For example, the pilot signal assignation portion 416 assigns the transmission bandwidth of the pilot signal in accordance with the maximum transmission power of each mobile station and a path-loss between the base station and each mobile station.

Figure 32:
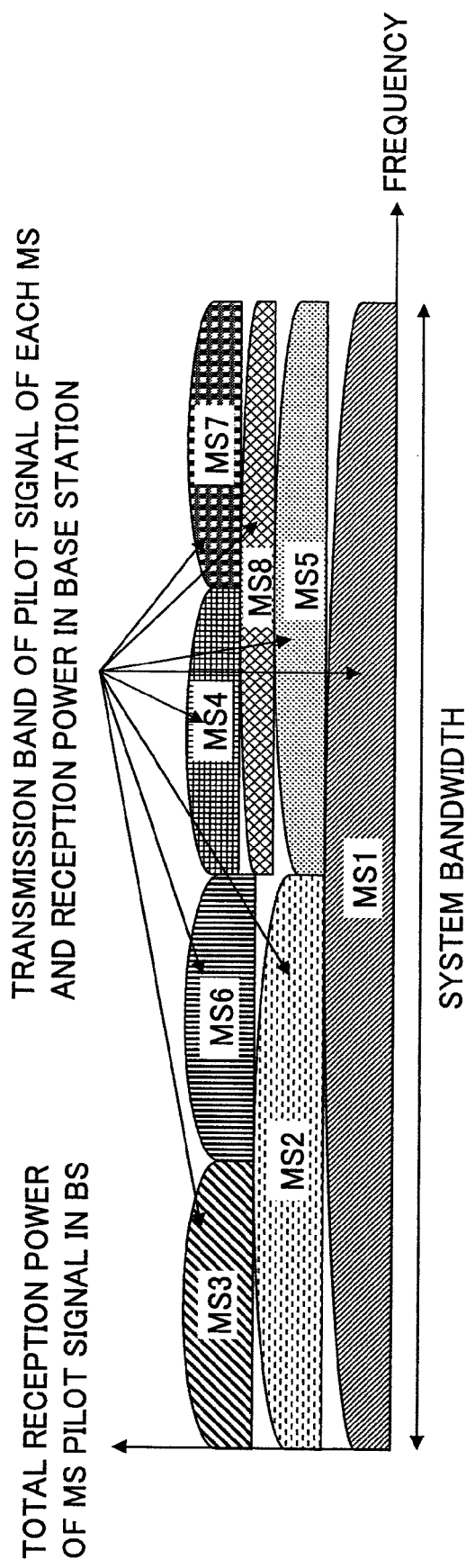
FIG. 32 is an explanatory view illustrating assignment of a bandwidth and center frequency of a pilot signal of each mobile station, in a reception apparatus according to an example of the present invention.

Moreover, the pilot signal assignation portion 416 assigns the transmission bandwidth and center frequency of the pilot signal of each mobile station so that deviation of the reception power of the pilot signal measured in the frequency domain in the base station is reduced or not caused, when assigning the transmission bandwidth and center frequency of the pilot signal of each mobile station, as shown in FIG. 32. For example, the pilot signal assignation portion 416 determines in advance a reference value indicating the deviation of the reception power of each pilot signal and determines the transmission bandwidth and center frequency of the pilot signal so that the deviation is kept at the reference value or below. In this case, the pilot signal assignation portion 416 calculates a total reception power of the pilot signals of the mobile stations in the up-link in the base station, and assigns the transmission bandwidth and center frequency of the pilot signal of each mobile station so that the deviation of the transmission bandwidth becomes smaller in the frequency domain.

Figure 33A:
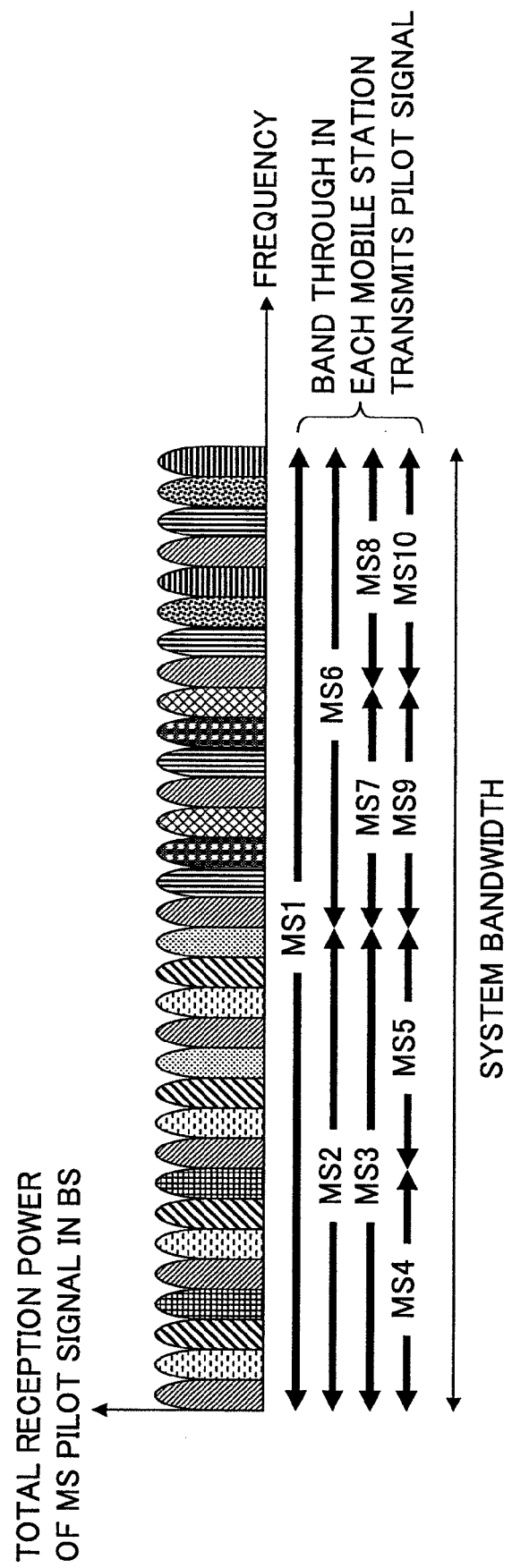
FIG. 33A is an explanatory view illustrating assignment of a bandwidth and center frequency of a pilot signal of each mobile station, in a reception apparatus according to an example of the present invention.

Moreover, when the pilot signal assignation portion 416 allows the mobile stations to transmit the pilot signal based on the IFDMA method, the pilot signal assignation portion 416 determines the frequency bandwidth and a repetition factor of the pilot signal of each mobile station so that each frequency component is used without excess or deficiency, as shown in FIG. 33A. Namely, an amount of frequency shift is determined and transmission is performed based on the frequency division multiplexing method. In this case, a frequency offset is given so that there is no band shared by the same user. For example, the pilot signal assignation portion 416 assigns the transmission bandwidth and center frequency of the pilot signal transmitted by each mobile station in accordance with a remaining number of the repetition factor. In this case, the pilot signal assignation portion 416 assigns and imparts the repetition factor, the frequency bandwidth, and the center frequency of the pilot signal.

Furthermore, the pilot signal assignation portion 416 assigns the transmission band of the channel conditions measurement signal so that the number of the mobile stations that transmit the channel measurement signal does not vary in each frequency band. For example, the pilot signal assignation portion 416 allocates the transmission band of the channel measurement signal to every mobile station, starting from the mobile stations having a broader transmission band. In this case, the transmission bandwidth is, for example, $2^n$ times the minimum transmission bandwidth.

There is explained a situation where the numbers of mobile stations having transmission bandwidths of 5 MHz, 2.5 MHz, and 1.25 MHz are $N_5$, $N_{2.5}$, and $N_{1.25}$ in the system bandwidth of 10 MHz, for example. In this case, the minimum transmission bandwidth, for example, the frequency block bandwidth is assumed to be 1.25 MHz.

(1) Random numbers are given to variables $\Phi_{5MHz}$, $\Phi_{2.5MHz}$, and $\Phi_{1.25MHz}$. Here, the random numbers are integers.

(2) The frequency block ID and 4 blocks (=5/1.25 blocks from $((\Phi_{5MHz}+n_5) \bmod (10/5) \times (10/5))$ are allocated to $n_5$-th mobile station having the transmission bandwidth of 5 MHz.

(3) The frequency block ID and 2 blocks (=2.5/1.25 blocks from $((\Phi_{5MHz}+N_5+n_{2.5}) \bmod (10/5) \times (10/5) + (\Phi_{5MHz}+n_{2.5}) \bmod (5/2.5) \times (5/2.5))$ are allocated to $n_{2.5}$-th mobile station having the transmission bandwidth of 2.5 MHz.

(4) The frequency block ID and 1 block (=1.25/1.25 block from $((\Phi_{5MHz}+N_5+N_{2.5}+n_{1.25}) \bmod (10/5) \times (10/5) + (\Phi_{2.5MHz}+N_{2.5}+n_{1.25}) \bmod (5/2.5) \times (5/2) + (\Phi_{1.25MHz}+N_{2.5}+n_{1.25}) \bmod (2.5/1.25) \times (2.5/1.25))$ are allocated to $n_{25}$-th mobile station having the transmission bandwidth of 2.5 MHz.

Figure 33B:
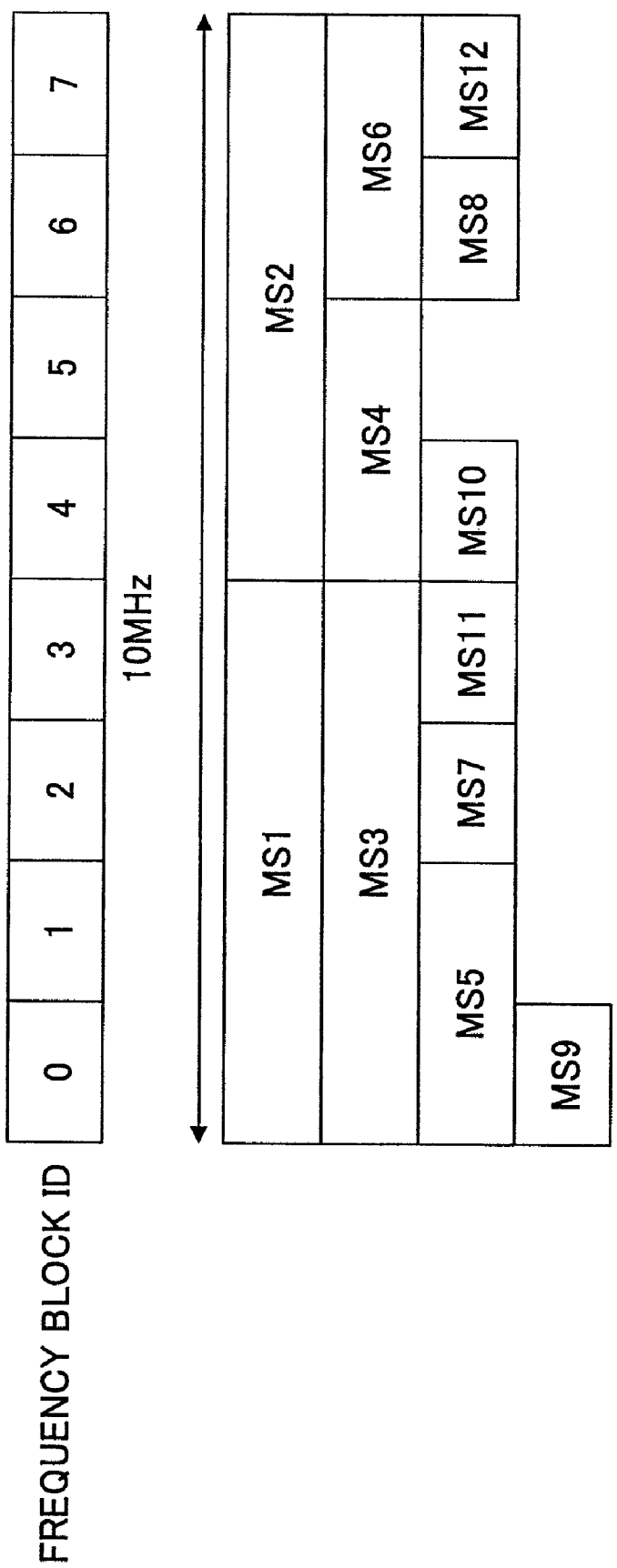
FIG. 33B is an explanatory view illustrating assignment of a bandwidth and center frequency of a pilot signal of each mobile station, in a reception apparatus according to an example of the present invention.

For example, in the case of $N_5=3$, $N_{25}=3$, $N_{1.25}=4$, $\Phi_{5MHz}$, $\Phi_{2.5MHz}$, and $\Phi_{1.25MHz}=0$, the band allocation in a sector is performed on a mobile station by mobile station basis, from the mobile stations having a broader transmission bandwidth, as shown in FIG. 33B.

The pilot signal assignation portion 416 performs the aforementioned allocation at a predetermined cycle since the transmission bandwidth and the number of the mobile stations in the sector change because of a path-loss change due to movement of a mobile station and/or handover.

Figure 34:
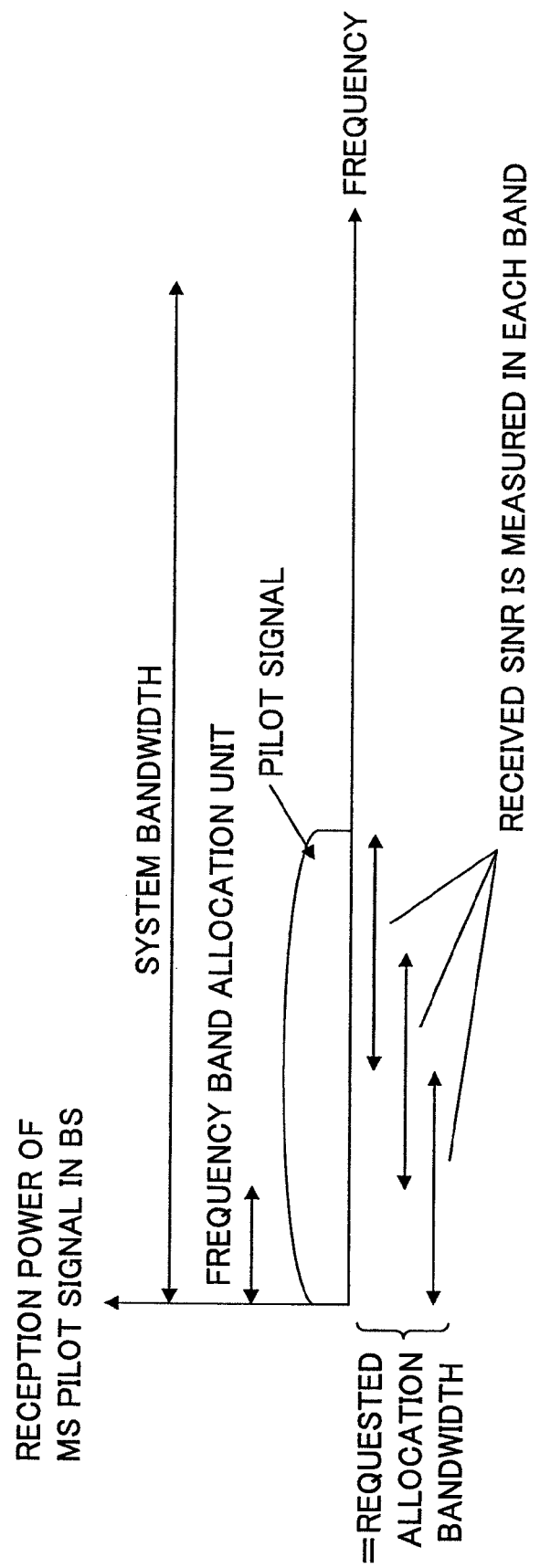
FIG. 34 is an explanatory view illustrating received SINR of a pilot signal transmitted from each mobile station, in a reception apparatus according to an example of the present invention.

When the mobile station is transmitting the pilot signal using the requested (maximum) transmission frequency bandwidth, the reception characteristic measurement portion 406 measures the received SINR using the requested frequency bandwidth (requested allocation bandwidth) of the data channel as a measurement unit, as shown in FIG. 34.

The frequency block allocation portion 410 allocates the frequency bands to each mobile station within a range of the transmission band of the pilot signal in accordance with information indicating the measured received SINR, the transmission band of the pilot signal, and the desired frequency bandwidth of the data channel. In this case, the frequency block allocation portion 410 may perform allocation using the frequency allocation unit determined in advance, for example, the frequency block as a unit.

Figure 35:
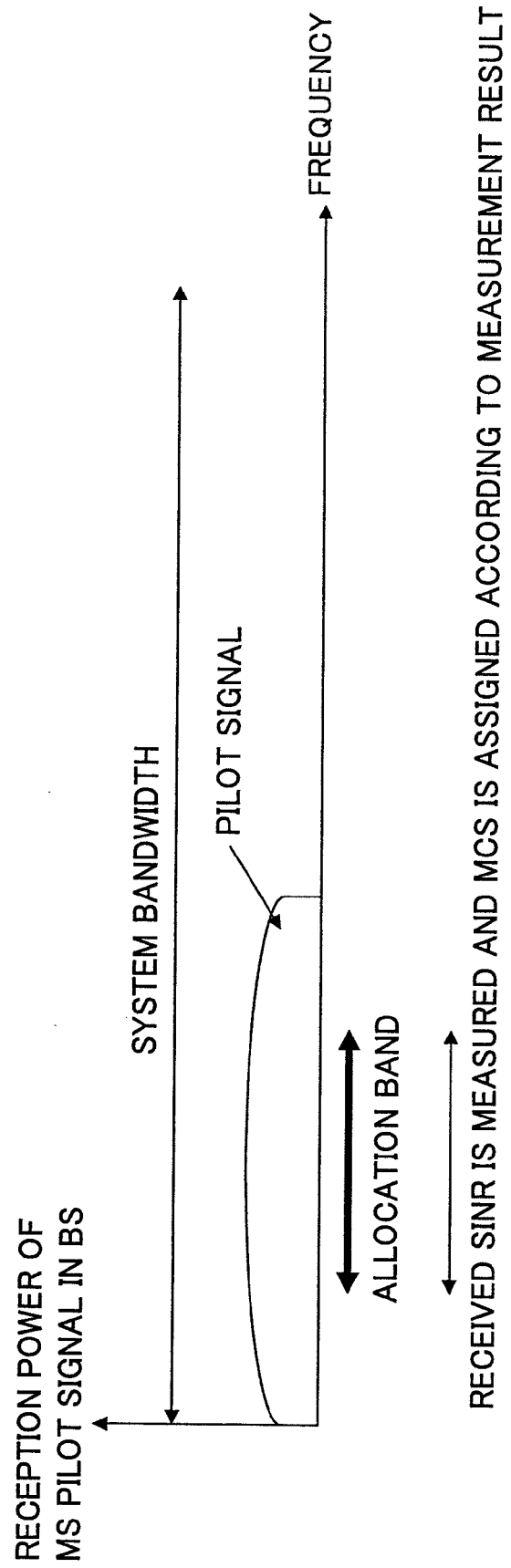
FIG. 35 is an explanatory view illustrating MCS allocation at the time of data channel transmission to a mobile station that is allowed to perform transmission, in a reception apparatus according to an example of the present invention.

The MCS determination portion 414 assigns the MCS to the mobile station that is allowed for transmission in accordance with the reception quality of the pilot signal in the allocated band, as shown in FIG. 35.

Next, referring to FIG. 36, operations of the transmission apparatus 100 according to this example are explained.

The base station 200 determines the radio access method used by the mobile station 300 and imparts the method to the mobile station 300.

First, information indicating the radio access method is received (step S1302).

Next, the switching portion 106 determines whether the information indicating the radio access method indicates the single-carrier method (step S1304).

When the received information indicating the radio access method indicates the single-carrier method (step S1304: YES), the switching portion 106 switches to the single-carrier method. Namely, the switching portion 106 outputs the input spread chip sequence to the FFT portion 108.

Next, the frequency domain signal generation portion 114 determines whether the transmission data is assigned to a contention-based channel (step S1308).

When the transmission data is assigned to the contention-based channel (step S1308: YES), the frequency domain signal generation portion 114 allocates a radio resource to the contention-based channel in accordance with the input radio resource allocation information. The transmission data to which the radio resource are allocated is transmitted (step S1310).

On the other hand, when the transmission data is not the contention-based channel, or the scheduling-based channel (step S1308: NO), the frequency domain signal generation portion 114 allocates the radio resource to the scheduling-based channel in accordance with the input radio resource allocation information. The transmission data to which the radio resource is allocated are transmitted (step S1312).

When the received information indicating the radio access method indicates the multi-carrier method (step S1304: NO), the switching portion 106 switches to the multi-carrier method. Namely, the switching portion 106 outputs the input spread chip sequence to the S/P conversion portion 110 (step S1314).

Next, the frequency domain signal generation portion 114 determines whether the transmission data is assigned to a contention-based channel (step S1316).

When the transmission data is assigned to the contention-based channel (step S1316: YES), the frequency domain signal generation portion 114 allocates the radio resource to the contention-based channel in accordance with the input radio resource allocation information. The transmission data to which the radio resource are allocated is transmitted (step S1318).

On the other hand, when the transmission data are not assigned to the contention-based channel, or the scheduling-based channel (step S1316: NO), the frequency domain signal generation portion 114 allocates the radio resource to the scheduling-based channel in accordance with the input radio resource allocation information. The transmission data to which the radio resource is allocated are transmitted (step S1320).

Next, referring to FIG. 37, operations of the reception apparatus 400 according to this example are explained.

First, the radio access method determination portion 402 determines the radio access method used by the mobile station 300.

Next, there is explained a situation where the radio access method determination portion 402 determines the single-carrier method as the radio access method used by the mobile station 300.

The reception characteristic measurement portion 406 measures priority in each frequency block, for example, the received SINR for all users (step S2602). The priorities corresponding to the number of frequency blocks are obtained for each user.

Next, the ranking portion 408 ranks priorities of "(the number of the users)×(the number of the frequency blocks)" in higher order, and associates the users with the frequency blocks, so as to generate a ranking table (step S2604).

When all the users transmit the pilot channels using the entire band, the number of ranks in the ranking table is equal to the number of the users times the number of the frequency blocks. When the users transmit the pilot channels using different frequency bands, there is no rank corresponding to the frequency block in which the users do not transmit the pilot channels. For example, when a certain user transmits the pilot channel using 5 frequency blocks out of 8 frequency blocks, there are no ranks corresponding to the remaining 3 frequency blocks in the ranking table.

Next, the frequency block allocation portion 410 performs tentative allocation of the frequency blocks to the users, on a user-by-user basis according to higher order of priorities (step S2606).

The frequency block allocation portion 410 refers to the ranking table and allocates the frequency blocks corresponding to the users in higher order of priorities. For example, the user A is ranked number 1 and the frequency block corresponding to the user A is 4, according to the ranking table. In this case, "A1" indicating the user A and the rank #1 is written into the frequency block 4. Similarly, "A2" indicating the user A and the rank #2 is written into the frequency block 5. The same procedures being repeated, the tentative allocation is performed.

Next, the frequency block allocation portion 410 performs allocation of the continuous frequency blocks among the frequency blocks tentatively allocated to the highest priority user (step S2608).

The frequency blocks 3 through 5 and the frequency block 8 are allocated to the user A. However, the band including the highest rank frequency block is allocated because of the single-carrier method. In other words, the frequency blocks 3 through 5 are allocated.

Next, the frequency block allocation portion 410 determines whether all the frequency blocks are allocated, or whether all the users are allocated (step S2610).

When all the frequency blocks are allocated or all the users are allocated (step S2610: YES), the transmission power and the MCS are determined for all the users to which the frequency blocks are allocated (step S2614).

On the other hand, when all the frequency blocks or all the users are not allocated (step S2610: NO), the frequency block allocation portion 410 ranks in higher order of priorities the priorities except for the priority of the user(s) to which the frequency blocks are allocated (step S2612), and returns to step S2606.

In this case, since the frequency blocks 3 through 5 have been allocated to the user A, the above procedures are repeated excluding the frequency blocks 3 through 5.

In such a manner, the bands having good channel conditions are allocated to each user. Not discrete frequency blocks but continuous frequency blocks can be allocated to each user.

Next, referring to FIG. 38, operations of another reception apparatus 400 according to this example are explained. Specifically, the operations of the reception apparatus 400 explained with reference to FIG. 30 is explained. As stated above, the reception apparatus 400 is included in the base station and the transmission apparatus 100 is included in the mobile station.

First, the radio access method determination portion 402 determines a radio access method used by the mobile station 300.

In the following, there is explained a situation where the radio access method determination portion 402 determines the single-carrier method as the radio access method used by the mobile station 300.

The pilot channel generation portion transmits to a mobile station at least one of information indicating the requested (maximum) transmission frequency bandwidth of the data channel to the base station, information indicating a quantity of data to be transmitted, and information indicating a data rate. In addition, the pilot channel generation portion imparts information indicating the requested maximum transmission bandwidth of the pilot signal (step S3802).

The pilot signal assignation portion 416 determines the frequency bandwidth and center frequency of the pilot signal transmitted by the mobile station in accordance with the information indicating the requested maximum transmission bandwidth of the pilot signal (step S3804), and imparts information indicating the determined frequency bandwidth and center frequency of the pilot signal to the mobile station (step S3806). In addition, the pilot signal assignation portion 416 may impart information indicating the determined center frequency and transmission bandwidth of the pilot signal to corresponding transmission apparatuses by transmitting a frequency block ID. In this case, the pilot signal assignation portion 416 may assign plural frequency blocks. For example, the pilot signal assignation portion 416 assigns the transmission bandwidth in accordance with the maximum transmission power of each mobile station and a path-loss between the base station and each mobile station.

The pilot channel generation portion transmits the pilot signal in accordance with the information indicating the imparted center frequency and the frequency bandwidth (step S3808). In this case, the pilot signal generation portion may transmit the pilot signal based on the frequency hopping.

The reception characteristic measurement portion 406 measures the received SINR of the pilot signal. In addition, the frequency block allocation portion 410 determines a mobile station to which a frequency band is allocated in accordance with the received SINR of the pilot signal. Moreover, the MCS determination portion 414 determines the MCS for the mobile station to which is allocated the frequency band and which is allowed to perform transmission (step S3810). Here, the transmission power determination portion 412 may determine the transmission power for the mobile station to which is allocated the frequency band and which is allowed to perform transmission.

The radio resource allocation determination portion 404 imparts to the mobile station that is allowed to perform transmission information indicating the data channel allocation band (chunk, frequency blocks) and the MCS to be used (step S3812).

The information indicating the data channel allocation band, which is transmitted from the base station, is input to the radio resource allocation control portion 122, and the MCS information is input to the spreading and channel code portion 102.

The spreading and channel code portion 102 performs channel coding by applying the error correction code such as the turbo code or the convolution code to the input binary information sequence in accordance with the input MCS information, and thus modulates the channel-coded data.

The frequency domain signal generation portion 114 determines the data size in accordance with the allocated bandwidth. The information indicating the user ID, MCS, discriminator of new/retransmission, and data size is multiplexed onto the control channel. As a result, the transmission frame is generated (step S3814).

Next, the mobile station transmits the data channel (step S3816).

The data channel transmitted from the mobile station is demodulated and decoded in the base station (step S3818).

The base station transmits ACK/NACK in accordance with data channel demodulating and decoding result.

This international patent application is based on Japanese Priority Applications No. 2005-105492, No. 2005-174394, No. 2005-241899, No. 2005-317567, No. 2006-031749, filed on Mar. 31, 2005, filed on Jun. 14, 2005, filed on Aug. 23, 2005, filed on Oct. 31, 2005, filed on Feb. 8, 2006, respectively, with the Japanese Patent Office, the entire contents of which are hereby incorporated by reference.

INDUSTRIAL APPLICABILITY

A transmission apparatus, a reception apparatus, a mobile communications system and a transmission control method according to an embodiment of the present invention are applicable to a mobile communications system in which packet communications are performed.

The invention claimed is:

1. A transmission apparatus usable in a communications system of a single-carrier method and a communications system of a multi-carrier system, the transmission apparatus comprising:
a switching portion that switches radio access methods;
a frequency domain signal generation portion that allocates a radio resource to a spread chip sequence on which one of a fast Fourier transformation and a series/parallel conversion is performed in accordance with a switched-to radio access method, so as to generate a signal in a frequency domain; and
a transmission signal generation portion that performs a fast inverse Fourier transformation on the signal in the frequency domain so as to generate a transmission signal,
wherein the switching portion transmits a channel conditions measurement signal using a predetermined frequency band requested to be allocated when switching to the radio access method of the single-carrier method.

2. A transmission apparatus usable in a communications system of a single-carrier method and a communications system of a multi-carrier system, the transmission apparatus comprising:
a switching portion that switches radio access methods;
a frequency domain signal generation portion that allocates a radio resource to a spread chip sequence on which one of a fast Fourier transformation and a series/parallel conversion is performed in accordance with a switched-to radio access method, so as to generate a signal in a frequency domain;
a transmission signal generation portion that performs a fast inverse Fourier transformation on the signal in the frequency domain so as to generate a transmission signal; and
a pilot signal generation portion that imparts information indicating at least one of a requested frequency bandwidth of a data channel, an amount of transmission data, and a data rate, when switching to the radio access method of the single-carrier method.

3. The transmission apparatus as recited in claim 2, wherein the pilot signal generation portion imparts information indicating a requested maximum transmission bandwidth of a pilot signal.

4. The transmission apparatus as recited in claim 3, wherein the pilot signal generation portion transmits the pilot signal in accordance with a frequency bandwidth and center frequency assigned based on information indicating the requested maximum transmission bandwidth of the pilot signal.

5. The transmission apparatus as recited in claim 4, wherein the pilot signal generation portion transmits the pilot signal by a frequency hopping method.

6. The transmission apparatus as recited in claim 5, wherein the pilot signal generation portion transmits the pilot signal in each assigned frequency bandwidth by the frequency hopping method.

7. A transmission apparatus usable in a communications system of a single-carrier method and a communications system of a multi-carrier system, the transmission apparatus comprising:
a switching portion that switches radio access methods;
a frequency domain signal generation portion that allocates a radio resource to a spread chip sequence on which one of a fast Fourier transformation and a series/parallel conversion is performed in accordance with a switched-to radio access method, so as to generate a signal in a frequency domain; and
a transmission signal generation portion that performs a fast inverse Fourier transformation on the signal in the frequency domain so as to generate a transmission signal,
wherein the frequency domain signal generation portion repeats a predetermined number of times the spread chip sequence on which the fast Fourier transformation is performed, and shifts each chip sequence repeated the predetermined number of times so as to generate a predetermined chip pattern.

8. A transmission apparatus usable in a communications system of a single-carrier method and a communications system of a multi-carrier system, the transmission apparatus comprising:
a switching portion that switches radio access methods;
a frequency domain signal generation portion that allocates a radio resource to a spread chip sequence on which one of a fast Fourier transformation and a series/parallel conversion is performed in accordance with a switched-to radio access method, so as to generate a signal in a frequency domain;
a transmission signal generation portion that performs a fast inverse Fourier transformation on the signal in the frequency domain so as to generate a transmission signal,
wherein the frequency domain signal generation portion allocates the radio resource depending on types of physical channels, and
wherein the frequency domain signal generation portion allocates the radio resource on a time-scale of transmission time interval length of a frequency block when allocating the frequency block to the physical channel.

9. The transmission apparatus as recited in claim 8, wherein the frequency domain signal generation portion allocates the radio resource so that at least a partial band of an allocated frequency band used to transmit a signal is a contention-based channel.

10. The transmission apparatus as recited in claim 8, wherein the frequency domain signal generation portion allocates the radio resource in accordance with a scheduling result when the signal to be transmitted is assigned to a shared control channel.

11. The transmission apparatus as recited in claim 8, wherein the frequency domain signal generation portion allocates the radio resource in accordance with a scheduling result when the signal to be transmitted is assigned to a shared data channel.

12. The transmission apparatus as recited in claim 11, wherein the frequency domain signal generation portion allocates the radio resource in accordance with a scheduling result in a time domain in a frequency division multiplexing access method.

13. The transmission apparatus as recited in claim 12, wherein the frequency domain signal generation portion allocates plural frequency blocks in accordance with the data rate.

14. The transmission apparatus as recited in claim 11, wherein the frequency domain signal generation portion allocates the radio resource in accordance with a scheduling result in the time domain and the frequency domain.

15. The transmission apparatus as recited in claim 14, wherein the frequency domain signal generation portion groups frequency blocks so as to perform allocation.

16. A transmission apparatus usable in a communications system of a single-carrier method and a communications system of a multi-carrier system, the transmission apparatus comprising:
a switching portion that switches radio access methods;
a frequency domain signal generation portion that allocates a radio resource to a spread chip sequence on which one of a fast Fourier transformation and a series/parallel conversion is performed in accordance with a switched-to radio access method, so as to generate a signal in a frequency domain; and
a transmission signal generation portion that performs a fast inverse Fourier transformation on the signal in the frequency domain so as to generate a transmission signal,
wherein the frequency domain signal generation portion allocates the radio resource depending on types of physical channels,
wherein the frequency domain signal generation portion allocates the radio resource in accordance with a scheduling result when the signal to be transmitted is assigned to a shared data channel, and
wherein the frequency domain signal generation portion changes an allocated bandwidth in accordance with the data rate when the single-carrier transmission is performed.

* * * * *